US00RE44837E

(19) United States
(12) Reissued Patent
Dahlin et al.

(10) Patent Number: US RE44,837 E
(45) Date of Reissued Patent: Apr. 8, 2014

(54) METHOD AND SYSTEM FOR BACKGROUND REPLICATION OF DATA OBJECTS

(71) Applicant: Intellectual Ventures Holding 40 LLC, Las Vegas, NV (US)

(72) Inventors: Michael D. Dahlin, Bellevue, WA (US); Arunkumar Venkataramani, Austin, TX (US); Ravindranath Kokku, Bangalore (IN); Praveen Yalagandula, San Francisco, CA (US)

(73) Assignee: Intellectual Ventures Holding 40 LLC, Las Vegas, LA (US)

(21) Appl. No.: 13/686,853

(22) Filed: Nov. 27, 2012

Related U.S. Patent Documents

Reissue of:
(64) Patent No.: 8,099,492
Issued: Jan. 17, 2012
Appl. No.: 12/195,073
Filed: Aug. 20, 2008

U.S. Applications:
(63) Continuation of application No. 10/429,278, filed on May 2, 2003, now Pat. No. 7,418,494.

(60) Provisional application No. 60/398,488, filed on Jul. 25, 2002.

(51) Int. Cl.
*G06F 15/173* (2006.01)
*G06F 15/16* (2006.01)
*H04L 5/22* (2006.01)

(52) U.S. Cl.
USPC ..... 709/224; 709/223; 709/232; 709/233; 370/229; 370/230

(58) Field of Classification Search
USPC ..... 709/223–226, 230–235, 238–242; 370/229–235
See application file for complete search history.

(56) References Cited

U.S. PATENT DOCUMENTS

| | | | |
|---|---|---|---|
| 6,038,606 | A | 3/2000 | Brooks et al. |
| 6,076,114 | A | 6/2000 | Wesley |
| 6,397,258 | B1 | 5/2002 | Tsuji et al. |
| 6,700,876 | B1 | 3/2004 | DiNicola et al. |
| 6,757,255 | B1 | 6/2004 | Aoki et al. |
| 6,909,693 | B1 | 6/2005 | Firoiu et al. |
| 6,934,745 | B2 | 8/2005 | Krautkremer |
| 7,000,025 | B1 | 2/2006 | Wilson |

(Continued)

OTHER PUBLICATIONS

Office Action for U.S. Appl. No. 10/429,278, mailed Nov. 17, 2006, 15 pages.

(Continued)

*Primary Examiner* — Joshua Joo
(74) *Attorney, Agent, or Firm* — Schwabe, Williamson & Wyatt, P.C.

(57) ABSTRACT

In an embodiment, a system and method may manage network resources to provide a near zero-cost background replication of data. Such a system may be inhibited from causing interference with foreground data flows. Such a system may also utilize a large fraction of spare network bandwidth. A system configured to implement such a method may include one or more servers and at least one client in communication via a network. Additionally the system may include a hint server, a monitor and/or a front-end application between a demand server and the network.

38 Claims, 22 Drawing Sheets

(56) References Cited

U.S. PATENT DOCUMENTS

| | | | | |
|---|---|---|---|---|
| 7,035,214 | B1 | 4/2006 | Seddigh et al. | |
| 7,096,265 | B2 | 8/2006 | Simpson et al. | |
| 7,248,564 | B1 * | 7/2007 | Grosdidier et al. | 370/235 |
| 2002/0099854 | A1 | 7/2002 | Jorgensen | |
| 2002/0145976 | A1 | 10/2002 | Meyer et al. | |
| 2002/0150048 | A1 | 10/2002 | Ha et al. | |
| 2002/0154602 | A1 | 10/2002 | Garcia-Luna-Aceves et al. | |
| 2002/0184403 | A1 | 12/2002 | Dahlin et al. | |
| 2003/0074393 | A1 | 4/2003 | Peart | |
| 2003/0107512 | A1 | 6/2003 | McFarland et al. | |
| 2003/0128692 | A1 | 7/2003 | Mitsumori et al. | |
| 2003/0128711 | A1 | 7/2003 | Olariu et al. | |
| 2003/0223366 | A1 | 12/2003 | Jeffries et al. | |
| 2006/0129693 | A1 | 6/2006 | LeCroy et al. | |
| 2010/0202294 | A1 | 8/2010 | Mullendore et al. | |

OTHER PUBLICATIONS

Office Action for U.S. Appl. No. 10/429,278, mailed Aug. 10, 2007, 20 pages.
Notice of Allowance for U.S. Appl. No. 10/429,278, mailed Apr. 29, 2008, 7 pages.
"The Network Simulator—ns—2," retrieved from http://www.isi.edu/nsnam/ns/ on Mar. 23, 2011, 2 pages.
"WAN Optimization, Secure Web Gateway & Application Performance Monitoring," Blue Coat Systems 2010, retrieved from http://www.packeteer.com on Mar. 23, 2011, 1 page.
K. Ramakrishnan et al., "The Addition of Explicit Congestion Notification (ECN) to IP," The Internet Society, Sep. 1, 2001, 63 pages.
"Tivoli Data Exchange, Seamless Solution for Efficient and Secure Information Sharing," IBM Corp., 2001, 4 pages.
Home page of Akamai, Inc., Akamai Technologies 2007, retrieved from http://www.akamai.com on Mar. 23, 2011, 1 page.
Mark Crovella et al., "The Network Effects of Prefetching," Computer Science Department, Boston University, Jul. 10, 1997, 22 pages.
Mike Dahlin, "Technology Trends Data," 2000, retrieved from http://www.cs.utexas.edu/users/dahlin/techTrends/ on Mar. 23, 2011, 1 page.
R. Fielding et al., "Hypertext Transfer Protocol—HTTP/1.1," Standards Track, The Internet Society, Jun. 1999,129 pages.
James Griffioen et al., "Automatic Prefetching in a WAN," IEEE Workshop on Advances in Parallel and Distributed Systems, Oct. 1993, 5 pages.
R. Hugo Patterson et al., "Informed Prefetching and Caching," School of Computer Science, Carnegie Mellon University, Pittsburgh, PA, May 11, 1995, 26 pages.
Yang Richard Yang et al., "General AIMD Congestion Control," Department of Computer Sciences, the University of Texas at Austin, Austin TX, May 9, 2000, 34 pages.
Haifeng Yu et al., "The Costs and Limits of Availability for Replicated Services," Department of Computer Science, Duke University, Oct. 2001, 14 pages.
Odlyzko et al., "Internet growth: Myth and reality, use and abuse," Nov. 22, 2000, pp. 1-8.
Venkataramani et al., "TCP Nice: Self-tuning Network Support for Background Applications," 2007, 23 pages.
Wessels et al, "ICP and the Squid Web Cache," the National Science Foundation, Aug. 13, 1997, 25 pages.
Acharya et al., "A study of Internet Round-trip Delay*", Dec. 1996; 18 pages.
Aggarwal et al., "Understanding the Performance of TCP Pacing," Proc. of the IEEE INFOCOMM 2000 Conference on Computer Communications, Mar. 2000; pp. 1157-1165.
Anderson et al., "System Support for Bandwidth Management and Content Adaptation in Internet Applications," Proc. USENIX OSDI Conf., San Diego, CA, Oct. 2000.
Bansal et al., "Binomial Congestion Control Algorithms," IEEE INFOCOMM, 2001; pp. 1-10.
Bonald, Thomas, "Comparison of TCP Reno and TCP Vegas via Fluid Approximation," Nov. 1998, pp. 1-34.
Brakmo, Lawrence, End-to-End Congestion Detection and Avoidance in Wide Area Networks, Ph.D. Dissertation, University of Arizona Lawrence Sivert Brakmo 1996, pp. 1-78.
Belani et al., "The Crisis Wide Area Security Architecture," Proceedings of the Seventh Usenix Security Symposium, Jan. 1998; 14 pages.
Breslau et al., "Web Caching and zipf-like Distribution: Evidence and Implications," IEEE INFOCOMM, Mar. 1999; pp. 1-9.
Chandra, Web workloads influencing disconnected services access, Masters of Arts Thesis, May 2001; 80 pages.
Chandra et al., "End-to end Wan Service Availability," ACM SIGCOMM, Vancouver Canada, Sep. 1998; 12 pages.
Chandra et al., "Resource management for scalable disconnected access to web services," May 2001; 11 pages.
Cho et al., "Synchronizing a database to Improve Freshness," Oct. 25, 1999; pp. 1-30.
Chiu et al., "Analysis of Increase and Decrease Algorithms for Congestion Avoidance in Computer Networks," Computer Networks and ISDN Systems, 1989, vol. 17; pp. 1-14 (Elsevier Science Publishers, B.V., North-Holland).
Cleary et al., "Data Compression Using Adaptive Coding and Partial String Matching," IEEE Transactions on Communications, 1984, vol. Com.-32, No. 4; pp. 396-402.
Dahlin et al., "A Quantitative Analysis of Cache Policies for Scalable Network File Systems," Proceedings of the SIGMETRICS Conference on Measurement and Modeling of Computer Systems, May 1994; pp. 1-13.
Dahlin, "Interpreting Stale Load Information," IEEE Transaction on Parallel and Distributed Systems, vol. 11 Oct. 2001; pp. 1-34.
Dahlin, "Support for Data-intensive Applications in Large-scale Systems," NSF Workshop on New Challenges and Directions for Systems Research, Jul. 1997; 4 pages.
Dahlin et al., "Using Mobile Extensions to Support Disconnected Services," University of Texas Department of Computer Sciences (TR-2000-20) Jun. 2000; pp. 1-15.
Dahlin, "PRACTI replication for Large-Scale Systems," University of Texas at Technical Report, 04-28, Jun. 2004, pp. 1-17.
Duchamp, Dan, "Prefetching Hyperlinks," Proceedings of USITS' 99: The 2nd USENIX Symposium on Internet Technologies & Systems, Oct. 14, 1999, 13 pages.
Dykes et al., "A Viability Analysis of Cooperative Proxy Caching," IEEE, Apr. 2001; 10 pages.
Floyd et al., "Equation-Based Congestion Control for Unicast Applications: the Extended Version," SIGCOMM 2000, Aug. 2000, pp. 1-12.
Floyd et al., "Random Equation Detection Gateways for Congestion Avoidance," IEEE, Aug. 1993; pp. 1-22.
Goyal et al., "A Hierarchical CPU Scheduler for Multimedia Operating Systems," USENIX 2nd Symposium OS Design and Implementation (OSDI '96), 1996; 14 pages.
Gray et al., "Rules of Thumb in Data Engineering," IEEE, 2000; pp. 1-8.
Gwertzman et al., "The Case for Geographical Push-Caching," Proceedings of the Fifth Workshop on Hot Topics in Operating Systems (HotOS-V), 1995; pp. 1-4.
Hengartner et al., "TCP Vegas Revisited," Proceedings of IEEE INFOCOMM, Mar. 2000; 10 pages.
Howard et al., "Scale and Performance in a Distributed File System," ACM Transaction on Computer Systems, 1998, vol. 6, No. 1; pp. 51-81.
Jacobson et al., "Congestion Avoidance and Control," Nov. 1998; pp. 1-25.
Jain, "A Delay-based Approach for Congestion Avoidance in Interconnected Heterogeneous Computer Networks," Apr. 1989; pp. 1-16.
Korupolu et al., "Coordinated placement and Replacement for Large-Scale Distributed Caches," Proceedings of the 1999 Workshop on Internet Applications, Jun. 1999, 11 pages.
Kroeger et al., "Exploring the Bounds of Web Latency Reduction From Caching and Prefetching," USENIX Symposium on Internet Technologies and Systems, Dec. 1997; 11 pages.

(56) References Cited

OTHER PUBLICATIONS

Kumar, "Conformance Testing of Protocols Represented as Communicating finite State Machine," Bachelor of Technology Project Report, Apr. 2001; 42 pages.
Lumb et al., "Towards Higher Disk Head Utilization: Extracting Free Bandwidth From Busy Disk Drives," Appears in Proc. of the 4th Symposium on Operating Systems Design and Implementation, 2000; 16 pages.
Malzahn et al., "On Bandwidth Smoothing," 4th International Web Caching Workshop, 1999; 12 pages.
Markatos et al., "A top 10 Approach for Prefetching the Web," Proceedings of INET'98: Internet Global Summit, Jul. 1998; 20 pages.
Martin et al., "Small Byzantine Quorum Systems," Dependable Systems and networks (DSN02), Jun. 2002; 10 pages.
Morris, "TCP Behavior with Many Flows," Presented at the IEEE International Conference on Networks Protocols, Oct. 1997; pp. 1-7.
Padmanabhan et al, "Using Predictive Prefetching to Improve World Wide Web Latency," 1996, ACM Computer Communication Review, vol. 27, No. 3, 14 pages.
Paxon, "End to End Routing Behavior in the Internet," May 1996; pp. 1-26.
Popek et al., "Replication in Ficus Distributed File Systems," Proceedings of the Workshop on Management of Replicated Data, Nov. 1990, pp. 20-25.
Ramakrishnan et al., "Network Working Group: Standards Track," Sep. 2001; 63 pages.
Rejaie et al., "RAP: An End-to-end Rate-based Congestion Control Mechanism for Realtime Streams on the Internet," 1999; pp. 1-8.
Sanghi et al., "Experimental Assessment End-to-end Behavior on Internet," Computer Science Technical Report Series; vol. CS-TR-2909, 1992; 19 pages.
Shenoy et al., "Cello: A Disk Scheduling Framework for Next Generation Operating Systems," Proceedings of Sigmetrics, 1998; pp. 1-13.
Terry et al., "Managing Update Conflicts in Bayou, a Weakly Connected Replicated Storage System," SIGOPS, Dec. 1995; pp. 172-183.
Tewari et al., "Design Considerations for Distributed Caching on the Internet," Proceedings of the 19$^{th}$ the International Conference on Distributed Computing Systems, May 1999; pp. 1-13.
Vahdat et al., "Active Names: Flexible Location and Transport of Wide-Area Resources," Proceedings of the 1999 USENIX Symposium on Internet Technology and Systems (USITS99), Oct. 1999; 15 pages.
Vahdat et al., "WebOS: Operating System Services for Wide Area Applications," Seventh Symposium on High Performance Distributed Computing Systems, Jul. 1998; 12 pages.
Venkataramani et al., "System Support for Background Replication," Technical Report TR-02-03 Computer Sciences, UT Austin, May 2002; pp. 1-18.
Venkataramani et al., "Bandwidth Constrained Placement in a WAN," Proceedings of the twentieth annual ACM symposium on Principles of distributed computing 2001; 10 pages.
Venkataramani et al., "The Potential Costs and Benefits of Long-term Prefetching for Content Distribution," Technical Report 2001, University of Texas at Austin; pp. 1-9.
Wang et al., "A New Congestion Control Scheme: Slow Start and Search (TRI-S)," SIGCOMM, 1991; 7 pages.
Wang et al., "A dual-window model for flow and congestion control," Distrib. Sys. Engng. 1994, vol. 1, pp. 162-172. (UK).
Wang et al., "Experience with a Distributed File System Implementation," Technical Report, 1998; pp. 1-30.
Yalagandula et al., "Transparent Mobility with Minimal Infrastructure," Technical Report, University of Texas at Austin, Jul. 2001; pp. 1-14.
Yin et al., "Engineering Server-Driven Consistency in Large Scale Dynamic Web Services," Proceedings of the 10th International World Wide Web Conference (WWW10) May 2001; 13 pages.
Yin et al., "Volume Leases for Consistency in Large-Scale Systems," IEEE Transactions on Knowledge and Data Engineering Special issue on Web Technologies, 1999, vol. 11; pp. 1-23.
Yin et al., "Using Leases to Support Server-Driven Consistency in Large-Scale Systems," Proceedings of the 18th International Conference on Distributed Computing Systems, May 1998; 9 pages.
Yin et al., "Byzantine Fault-Tolerant Confidentiality," Future Directions in Distributed Computing Workshop, Jun. 2002; pp. 1-4.
Yin et al., "Hierarchical Cache Consistency in a WAN," Proceedings of the 1999 USENIX Symposium on Internet Technologies and Systems (USITS99), Oct. 1999; 11 pages.
Zhang et al., "The Stationarity of Internet Path Properties: Routing, Loss, and Throughput," May 2000; pp. 1-4.
Office Action for U.S. Appl. No. 12/195,073, dated Jan. 3, 2011.
Office Action for U.S. Appl. No. 12/195,073, dated Jun. 2, 2011.
Notice of Allowance for U.S. Appl. No. 12/195,073, dated Sep. 26, 2011.
Brakmo et al., "TCP vegas: New Techniques for Congestion Detection and Avoidance," ACM SIGCOMM Conference, 1994; 11 pages.
Odlyzko et al., "Internet growth: Myth and reality, use and abuse," Information Impacts Magazine, Nov. 2000, pp. 1-8.
Venkataramani et al., "TCP Nice: Self-tuning Network Support for Background Applications," Proceedings of the 5th Symposium on Operating Systems Design and Implementation (OSDI) 2002, Sponsored by USENIX, Boston, MA, Dec. 9-11, 2002, pp. 2-22.
Yalagandula et al., "C0PE: Consistent 0-Administration Personal Environment," IEEE 6th International Workshop on Object Oriented Real-Time Dependable Systems, Jan. 2001; pp. 1-7.
Acharya et al., "A Study of Internet Round-trip Delay", Dec. 1996; 18 pages.

* cited by examiner

```
<HTML> <HEAD> <! -- existing header goes here -- >
<SCRIPT LANGUAGE="JavaScript">
function pageOnLoad() {
     myiframe.getPFlist(document.referrer);
} </SCRIPT> </HEAD> <BODY>

<! -- existing body goes here -- >
if(null == window.onload) {
  window.onload = pageOnLoad();}
else {
  var origfn = window.onload;
  window.onload = function(){origfn();pageOnLoad();};}

<IFRAME SRC="pfalways.html" name="myiframe"
        width=0 height=0 frameborder=0>
</IFRAME> </HTML> <\BODY>
```

FIG. 29

```
<HTML> <HEAD> <SCRIPT LANGUAGE="JavaScript">
function getPFList(var prevref) {
  document.location="hint-server/pflist.html+PCOOKIE="+
           document.referrer + "+" + prevref + TURN=1;
  document.close();
} </SCRIPT> </HEAD> </HTML>
```

FIG. 30

```
<HTML> <HEAD> <SCRIPT LANGUAGE="JavaScript">

function myOnLoad() {
   preload("demand-server/c.html");
   getMore() ;
}
function getMore() {
  document.location="hint-server/pflist.html+PCOOKIE="+
                      document.referrer + "+" + prevref+
                     "+" + "TURN=2";
  document.close();
}

var myfiles=new Array()
function preload(){
    for (i=0;i<preload.arguments.length;i++){
        myfiles[i]=new Image()
        myfiles[i].src=preload.arguments[i]
    }
} </SCRIPT> </HEAD>

<BODY onload="myOnLoad()"><SCRIPT LANGUAGE="JavaScript">
preload("prefetch-server/a.jpg",
        "prefetch-server/b.jpg",
        "prefetch-server/c.html");
</script> </HTML>
```

FIG. 31

METHOD AND SYSTEM FOR BACKGROUND REPLICATION OF DATA OBJECTS

Matter enclosed in heavy brackets [ ] appears in the original patent but forms no part of this reissue specification; matter printed in italics indicates the additions made by reissue.

PRIORITY CLAIM

This application *is a reissue application of U.S. Pat. No. 8,099,492, which was issued Jan. 17, 2012, from U.S. application Ser. No. 12/195,073, filed Aug. 20, 2008, which* is a continuation of prior application Ser. No. 10/429,278, filed May 2, 2003 now U.S. Pat. No. 7,418,494 which claims priority to U.S. Provisional Application 60/398,488 filed Jul. 25, 2002. This application claims priority to said application Ser. Nos. *12/195,073,* 10/429,278 and 60/398,488. Further, the specification of application Ser. Nos. *12/195,073,* 10/429,278 and 60/398,488 are hereby incorporated by reference herein in their entirety.

BACKGROUND OF THE INVENTION

1. Field of the Invention

Embodiments disclosed herein generally relate to methods and systems for data transmission. More specifically, embodiments relate to methods and systems of background transmission of data objects.

2. Description of the Relevant Art

TCP congestion control has seen an enormous body of work since publication of Jacobson's seminal paper on the topic. Jacobson's work sought to maximize utilization of network capacity, to share the network fairly among flows, and to prevent pathological scenarios like congestion collapse. Embodiments presented herein generally seek to ensure minimal interference with regular network traffic. Some embodiments seek to achieve high utilization of network capacity.

Congestion control mechanisms in existing transmission protocols generally include a congestion signal and a reaction policy. The congestion control algorithms in popular variants of TCP (Reno, NewReno, Tahoe, SACK) typically use packet loss as a congestion signal. In steady state, the reaction policy may use additive increase and multiplicative decrease (AIMD). In an AIMD framework, the sending rate may be controlled by a congestion window that is multiplicatively decreased by a factor of two upon a packet drop and is increased by one packet per packet of data acknowledged. It is believed that AIMD-type frameworks may contribute significantly to the robustness of the Internet.

In the Proceedings of the Second USENIX Symposium on Internet Technologies and Systems (October 1999), Duchamp proposes a fixed bandwidth limit for prefetching data. In "A Top-10 Approach to Prefetching on the Web" (INET 1998), Markatos and Chronaki adopt a popularity-based approach in which servers forward the N most popular documents to clients. A number of studies propose prefetching an object if the probability of its access before it is modified is higher than a threshold. The primary performance metric in these studies is increase in hit rate. End-to-end latency while many clients are actively prefetching and interference with other applications are generally not considered.

SUMMARY OF THE INVENTION

In embodiments presented herein, an operating system may manage network resources in order to provide a simple abstraction of near zero-cost background replication. Such a self-tuning background replication layer may enable new classes of applications by (1) simplifying applications, (2) reducing the risk of being too aggressive and/or (3) making it easier to reap a large fraction of spare bandwidth to gain the advantages of background replication. Self-tuning resource management may assist in coping with network conditions that change significantly over seconds (e.g., changing congestion), hours (e.g., diurnal patterns), months (e.g., technology trends), etc.

In an embodiment presented herein, a communications protocol (referred to herein as "TCP-Nice" or simply "Nice") may reduce interference caused by background flows on foreground flows. For example, a TCP-Nice system may modify TCP congestion control to be more sensitive to congestion than traditional protocols (e.g., TCP-Reno or TCP-Vegas). A TCP-Nice system may also detect congestion earlier and/or react to congestion more aggressively than traditional protocols. Additionally, a TCP-Nice system may allow much smaller effective minimum congestion windows than traditional protocols. These features of TCP-Nice may inhibit the interference of background data flows (e.g., prefetch flows) on foreground data flows (e.g., demand flows) while achieving reasonable throughput. In an embodiment, an implementation of Nice may allow senders (e.g., servers) to select Nice or standard Reno congestion control on a connection-by-connection basis. Such an embodiment may not require modifications at the receiver.

In an embodiment, a method of sending data over a network may include receiving a request for one or more data packets. One or more data packets may be sent in response to the received request. The data packets may include all or portions of desired data objects and/or pointers to desired data objects. The time that a first data packet was sent may be determined. An acknowledgement of receipt of at least one data packet may be received. The time that the acknowledgement of receipt of the data packet was received may be determined. An estimate of network congestion may be determined. For example, the estimate of network congestion may be based at least in part on the time the data packet was sent and the time the acknowledgement of receipt of the data packet was received. If the estimate of network congestion indicates the existence of significant network congestion, then the network sending rate may be reduced.

In an embodiment, the network sending rate is controlled by a congestion window that represents the maximum number of packets or bytes that may be sent but not yet acknowledged. In such an embodiment, to reduce the network sending rate, the size of the congestion window may be reduced.

In an embodiment, the network sending rate may be reduced by at least a multiplicative factor if significant network congestion is detected. For example, in an embodiment, the size of the congestion window may be reduced by at least a multiplicative factor if significant network congestion is detected. For example, the size of the congestion window may be reduced to one half of its previous size. The size of the congestion window may determine the amount of low priority (e.g., prefetch) data desired to be in transit at any one time or the rate at which one or more data packets are sent (e.g., the delay between sending one data packet and the next data packet or between sending one group of data packets and the next group of data packets). In an embodiment, the congestion window may be reduced to a non-integer size. For example, the window may be reduced to less than one. In such an embodiment, the method may send one new data packet during an interval spanning more than one round trip time. For example, to affect a congestion window of ¼, one packet is sent every four round trip time intervals. In an embodiment, at least two packets are sent at once even when the congestion window size is below two packets; this embodiment ensures that a receiver using TCP "delayed acknowledgements" generally receives two packets at a time, avoiding delayed acknowledgement time-outs. For example, to affect a congestion window of ¼, two packets are sent every eight round trip intervals.

In an embodiment, Nice congestion control is implemented at user level by calculating a user-level congestion window that may be smaller than the TCP congestion window. In such an embodiment, code running at user level may restrict the amount of data that has been sent and not yet received to not exceed the user level congestion window. In one embodiment, user level code monitors the amount of data that have been received by sending user-level acknowledgements when data are received. In another embodiment, user level code monitors the amount of data that have been received by detecting the receipt of TCP acknowledgements; for example packet filter tools, such as Berkeley Packet Filter, provide a means to monitor low level network traffic of this sort. In a user level embodiment, the user level code may monitor network congestion by monitoring round trip times between sending data and receiving acknowledgements.

In an embodiment, determining the estimate of network congestion may include determining a round trip time of a first data packet and determining the estimate of network congestion based on the round trip time and the size of the congestion window. A round trip time may refer to an elapsed time between the time that a data packet is sent and the time that the acknowledgement of receipt of the data packet is received. In an alternative embodiment, determining the estimate of network congestion may include determining a number of round trip times measured during an interval that exceeds a determined threshold round trip time. Significant network congestion may be determined to exist if the number of round trip times that exceed the threshold round trip time during the interval exceeds a threshold number. In an embodiment, significant network congestion may be determined to exist if the number of round trip times that exceeds the threshold round trip time during the interval exceeds a fraction of the difference between an estimated congested round trip time and an estimated uncongested round trip time.

An estimate of uncongested round trip time may be based on a minimum round trip time for a data packet that has been detected (e.g., within a specific time period). Other estimates of uncongested round trip time may also be used, such as a decaying running average of minimum round trip times or a round trip time that represents a percentile of detected round trip times (e.g., the $1^{st}$ or $5^{th}$ percentile of round trip times). Similarly, the estimate of congested round trip time may be based on a minimum round trip time, an average or decaying average maximum round trip time or a percentile of maximum round trip times (e.g., the $99^{th}$ or $95^{th}$ percentile of round trip times). Alternatively, rather than using congested or uncongested round trip times, congested or uncongested end-to-end throughput of the network may be measured (or determined).

For example, in an embodiment, significant congestion may be determined to exist if the estimate of network congestion exceeds a determined fraction of the estimated bottleneck queue buffer capacity. In an embodiment, the buffer capacity may be known or estimated a priori. In other embodiments, the buffer capacity may be estimated based on measurements. For example, the uncongested round trip time may be taken as an estimate of the empty-queue round trip time and the congested round trip time may be taken as an estimate of the full-queue round trip time, and congestion is determined if over an interval some first fraction of measured round trip time exceeds the uncongested round trip time plus some second fraction times the difference between the congested and uncongested round trip times.

In an embodiment, the method may also include increasing the size of the congestion window based on the estimate of network congestion (e.g., if significant to congestion is not detected). In such embodiments, the size of the congestion window may be increased linearly or multiplicatively. For example, the size of the congestion window may be increased by one data packet per round trip time interval.

In an embodiment, a method of sending data packets via a network may include determining end-to-end network performance (e.g., based on round trip times and/or throughput). An estimate of network congestion may be determined based at least in part on the end-to-end network performance. If significant network congestion is determined to exist, then the size of a congestion window may be reduced.

In some embodiments, a method of sending a plurality of data packets via a network may include sending a first plurality of data packets over a network using a first protocol and sending a second plurality of data packets over the network using a second protocol. The first plurality of data packets may include one or more high priority data packets (e.g., demand packets, such as data packet requested by a user). The second plurality of data packets may include one or more low priority data packets (e.g., prefetch data packets, such as data packets not explicitly requested by the user). The second protocol may be configured so that the sending of the second plurality of data packets does not interfere with the sending of the first plurality of data packets. For example, the second protocol may be configured to reduce the size of a congestion window associated with the second plurality of data packets in order to inhibit sending the second plurality of data packets from interfering with sending the first plurality of data packets.

A system for sending data packets over a network may include at least one server coupled to the network. At least one server coupled to the network may be configured to send high priority data packets via the network using a first protocol. Additionally, at least one server coupled to the network may be configured to send low priority data packets via the network using a second protocol. The server configured to send high priority data packets and the server configured to send low priority data packets may be the same server or different servers. For example, one server may be configured respond to requests using the first protocol or the second protocol on a connection-by-connection basis. The second protocol may be configured to inhibit low priority data packets from interfering with the sending of high priority data packets.

A system for sending data packets over a network may include at least one server coupled to the network. At least one server coupled to the network may be configured to send demand data packets via the network using a first protocol. Additionally, at least one server coupled to the network may be configured to send prefetch data packets via the network using a second protocol. The server configured to send demand data packets and the server configured to send prefetch data packets may be the same server or different servers. For example, one server may be configured respond to requests using the first protocol or the second protocol on a connection-by-connection basis. The second protocol may be configured to inhibit prefetch data packets from interfering with the sending of demand data packets.

A system for sending data packets over a network may include a hint server coupled to the network. The hint server may be configured to send hint lists via the network during use. Hint lists provide information referring to data to be prefetched. In an embodiment, hint lists contain one or more references to data that may be prefetched. In an embodiment, items on the hint list may be items likely to be referenced in the future by a demand request. The hint server may be configured to determine an estimate of probability of one or more data objects on at least one server being requested as a demand request. Determination of the estimate of the probability of one or more data objects being requested in a demand request may be based on factors such as past history of demand access by all clients, past history of access by a class of clients, past history of access by the client fetching a hint list, a priori estimates of object importance or object popularity, links embedded in recently viewed pages, and the like. Suitable algorithms, such as prediction by partial matching, markov chains, breadth first search, top-10 lists, and hand-constructed lists of objects, will be known by those ordinarily skilled in the art.

The hint lists sent by the hint server may be sized to inhibit prefetching of hint list objects from causing congestion on the prefetch server or demand server. The hint lists sent by the hint server may also be sized to utilize a significant portion of available prefetch server capacity for prefetching of hint list objects. In an embodiment, hint list sizing determines the number of client nodes that are allowed to prefetch in an interval. For example, some number N of clients may be given non-zero hint list sizes while any remaining clients during an interval may be given zero hint list sizes to inhibit their prefetching during an interval. In an embodiment, hint lists are sized by the hint server including different numbers of references to data that may be prefetched. In an embodiment, hint lists are sized by the hint server including metadata that controls prefetching aggressiveness such as the rate that prefetching may occur or the number of objects that may be prefetched before the metadata is refreshed. In an embodiment, hint lists are sized by a separate server sending metadata that controls prefetching aggressiveness. For example, a client may receive a hint list from a hint server and a prefetch count or prefetch rate from a separate server.

In an embodiment, a front-end application may be included between the network and at least one server. The front-end application may be configured to determine whether a received request is a prefetch request or a demand request during use. If the request is a demand request, the front-end application may route the request to a demand server. If the request is a prefetch request, the front-end application may be configured to provide a redirection data object in response to the request.

In an embodiment, at least one server may be a demand server. A demand server may include one or more data objects associated via one or more relative references. In certain embodiments, at least one server may be a prefetch server. A prefetch server may include one or more duplicate data objects associated via one or more absolute references. The one or more duplicate data objects may include data objects that are substantially duplicates of a data object of the demand server.

In an embodiment, the system may also include a monitor coupled to the network. The monitor may be configured to determine an estimate of server congestion during use. Server congestion may include demand server congestion or prefetch server congestion or both. In an embodiment, a monitor determines server congestion by monitoring server statistics such as CPU load, average response time, queue length, IO's per second, memory paging activity, cache hit rate, internal software module load, or server throughput. In an embodiment, a monitor determines server congestion by requesting at least one object from the server and measuring the response time from when each object is requested until when it is received; in such an embodiment, if over an interval more than a first fraction of requests take longer than a second fraction (which may be greater than 1.0) times a benchmark time, then server congestion may be determined. In an embodiment, a benchmark time is an average, exponentially decaying average, minimum, or percentile (e.g., 5%-tile or 25%-tile) time measured on earlier fetches. In an embodiment, a single benchmark time is maintained for all objects fetched. In another embodiment, a list of candidate objects are used for monitor fetching and different benchmark times are maintained for each item on the list.

In an embodiment, server congestion estimates may be used to control the aggressiveness of prefetching. In an embodiment, server congestion estimates may affect the sizing of hint lists. For example, in an embodiment, a prefetch budget for an interval may be computed by starting with an initial prefetch budget value and multiplicatively decreasing it when the monitor detects server congestion and additively increasing it when the monitor detects no server congestion.

In an embodiment, clients repeatedly request hint list sizes over an interval and the hint server provides non-zero hint list sizes to up to the prefetch budget of those requests and zero hint list sizes to other requests during the interval. In an embodiment, the non-zero hint list size is a small number (e.g., 1 or 2 objects or documents) in order to ensure that clients given non-zero hint list sizes only prefetch for a short amount of time before updating their hint list size; this arrangement may increase the responsiveness of the system to changes in load.

In an embodiment, a hint server may have a list of items for a client to prefetch and may send a client a first part of that list. Subsequently, the hint server may send a client subsequent parts of the list. In an embodiment, a list of items for a client to prefetch may be ordered to increase the benefit/cost of prefetching items early on the list. For example, items may be sorted by importance such as probability of demand reference, probability of demand reference divided by object size, or probability of demand reference divided by object generation cost. In an embodiment, the size of a part of the list sent to a client depends on the current hint list size.

In an embodiment, a method of sending data packets may include providing a transmission path for transmission of data packets between two or more computer systems. The transmission path may include at least one router buffer. An estimate of congestion along the transmission path may be determined at a time when at least one router buffer is not full. For example, the estimate of congestion may be determined as previously described. If significant congestion is determined to exist according to the estimate of congestion, then the size of the congestion window may be reduced by at least a multiplicative factor.

In some embodiments, an estimate of a queue size of at least one router buffer may be determined. In such a case, if the queue size exceeds a specified fraction of a capacity of at least one router buffer, the congestion window may be reduced.

In certain embodiments, a method of sending data packets may include determining an estimate of congestion along a transmission path of one or more data packets. If significant congestion exists based on the estimate of congestion, then the size of a congestion window may be reduced to a non-integer value. For example, the congestion window may be reduced to less than one.

In an embodiment, a method of prefetching data may include sending a request for one or more data packets (e.g., based on input received from a user) and receiving one or more requested data packets and one or more prefetch hints. A prefetch hint may include a suggestion to prefetch one or more data packets. The method may include determining if one or more prefetch hints refer to one or more data packets available in a local memory (e.g., browser cache). The method may also include determining one or more data packets to prefetch. For example, a local memory may be searched for one or more data packets referred to by one or more prefetch hints. One or more data packets that do not exist in the local memory may be prefetched.

After determining one or more data packets to prefetch, a request for one or more prefetch data packets may be sent. Upon receipt of one or more requested prefetch data packets, an acknowledgement of receipt of the packets may be sent. Additionally, the received packets may be stored in a local memory. If one or more of the received data packets includes a pointer, then a data packet (or data object) referenced by the pointer may be requested.

After receiving one or more data packets, one or more received data packets may be displayed to a user. Additionally, if the user requests access to one or more other data objects while prefetch data packets are being received, the method may include ceasing to receive the prefetch data packets.

In an embodiment, a method of determining a hint list may include receiving an indication of server congestion and receiving a reference list. The reference list may include a list of data objects (or files) previously requested by one or more users. The hint list may be determined based at least in part on the reference list. For example, the hint list may be determined by determining one or more data objects that have a probability of a demand request that is greater than a threshold based at least in part on the reference list. One or more data objects having a relatively high probability of receiving a demand request may be referenced in the hint list. Additionally, the size of the hint list may be based at least in part on the indication of server congestion. The size of the hint list may be further based on the size of one or more data objects identified on the hint list.

The hint list may be sent to a client that sent the reference list. In an embodiment, the hint list may be sent to the client in an order that causes an inline object to be prefetched before a data object that refers to the inline object.

The hint list may be sent to a client in parts. In an embodiment, a first part of the hint list is sent to a client. Subsequently, subsequent parts are sent to a client. In an embodiment, objects on the hint list are ordered so that more important or more valuable objects appear earlier on the hint list than less important and/or less valuable objects.

In an embodiment, the indication of server congestion may include a recommended hint list size. For example, the recommended hint list size may include a number of data objects recommended for prefetching or may be zero to suspend prefetching for an interval. In an embodiment, some clients are sent zero hint list sizes and some non-zero hint list sizes such that some fraction of clients prefetch and some other fraction do not over an interval.

In an embodiment, a method of determining network congestion may include sending one or more requests for one or more data objects. For example, a request may to be sent for a file on a server. In another example, the server may be pinged. At least one data packet associated with one or more requested data objects may be received. An estimate of network congestion may be determined based at least in part on the round trip time of at least one received data packet. Additionally, a prefetch rate appropriate for the estimated network congestion may be determined. In an embodiment, two or more requests for data objects may be sent. For example, a number of requests may be sent over a length of time. The requests may be distributed (e.g., periodically, arbitrarily or randomly) throughout the length of time.

The method may determine network congestion as previously described. Alternatively, a number of round trip times may be determined. If more than a threshold number of data packets received experienced significant network delays, then significant congestion may be determined to be present. In such a case, the prefetch rate may be decreased. If fewer than a threshold number of data packets experience significant network delays, then no significant network congestion may be determined to be present. Therefore, in some embodiments, the prefetch rate may be increased. In certain embodiments, determining a prefetch rate appropriate for the estimated network congestion may include determining whether a previous change in the prefetch rate has had sufficient time to affect network congestion. After a prefetch rate has been determined, a signal including the prefetch rate may be sent.

In an embodiment, a method of providing data objects over a network may include receiving a request for one or more data objects. The method may determine whether the request comprises a demand request or a prefetch request. If the request comprises a prefetch request, then the method may return a redirection data object corresponding to one or more requested data objects. The redirection data object may cause a request to be sent to a prefetch server. If the request comprises a demand request, then the method may route the request to a demand server.

BRIEF DESCRIPTION OF THE DRAWINGS

Advantages of embodiments presented herein will become apparent upon reading the following detailed description and upon reference to the accompanying drawings in which:

FIG. 29 depicts an embodiment of program code that may be added to one or more HTML documents for use with a prefetching system;

FIG. 30 depicts an embodiment of program code of a pfalways.html file;

FIG. 31 depicts an embodiment of program code of a pflist.html file;

Figure 1:
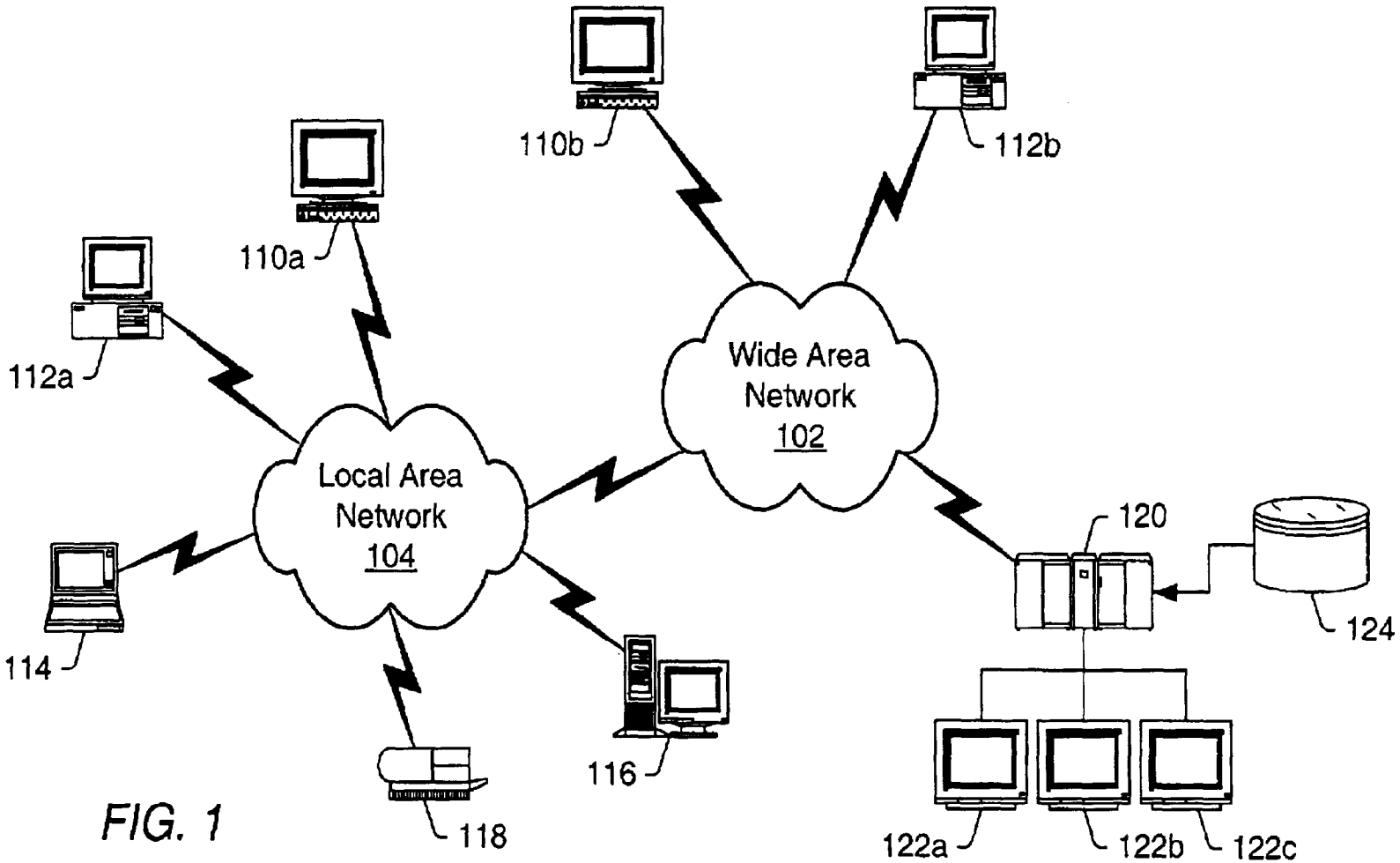
FIG. 1 depicts an embodiment of a network diagram of a wide area network suitable for implementing various embodiments.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates a wide area network ("WAN") according to one embodiment. WAN 102 may be a network that spans a relatively large geographical area. The Internet is an example of WAN 102. A wireless phone network with data transfer capability is an example of WAN 102. And a system comprising both the Internet and a wireless phone network coupled together so that wireless phones may access data from Internet servers is an example of WAN 102. WAN 102 typically includes a plurality of computer systems that may be interconnected through one or more networks. Although one particular configuration is shown in FIG. 1, WAN 102 may include a variety of heterogeneous computer systems and networks that may be interconnected in a variety of ways and that may run a variety of software applications.

One or more local area networks ("LANs") 104 may be coupled to WAN 102. LAN 104 may be a network that spans a relatively small area. Typically, LAN 104 may be confined to a single building or group of buildings. Each node (i.e., individual computer system or device) on LAN 104 may have its own CPU with which it may execute programs, and each node may also be able to access data and devices anywhere on LAN 104. Thus, LAN 104 may allow many users to share devices (e.g., printers) and data stored on file servers. LAN 104 may be characterized by a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, and/or radio waves).

Each LAN 104 may include a plurality of interconnected computer systems and optionally one or more other devices such as one or more workstations 110a, one or more personal computers 112a, one or more laptop or notebook computer systems 114, one or more server computer systems 116 and/or one or more network printers 118. As illustrated in FIG. 1, an example LAN 104 may include one of each computer systems 110a, 112a, 114, and 116, and one printer 118. LAN 104 may be coupled to other computer systems and/or other devices and/or other LANs 104 through WAN 102.

One or more mainframe computer systems 120 may be coupled to WAN 102. As shown, mainframe 120 may be coupled to a storage device or file server 124 and mainframe terminals 122a, 122b, and 122c. Mainframe terminals 122a, 122b, and 122c may access data stored in the storage device or file server 124 coupled to or included in mainframe computer system 120.

WAN 102 may also include computer systems connected to WAN 102 individually and not through LAN 104 (e.g., workstation 110b and personal computer 112b). For example, WAN 102 may include computer systems that may be geographically remote and connected to each other through the Internet.

Figure 2:
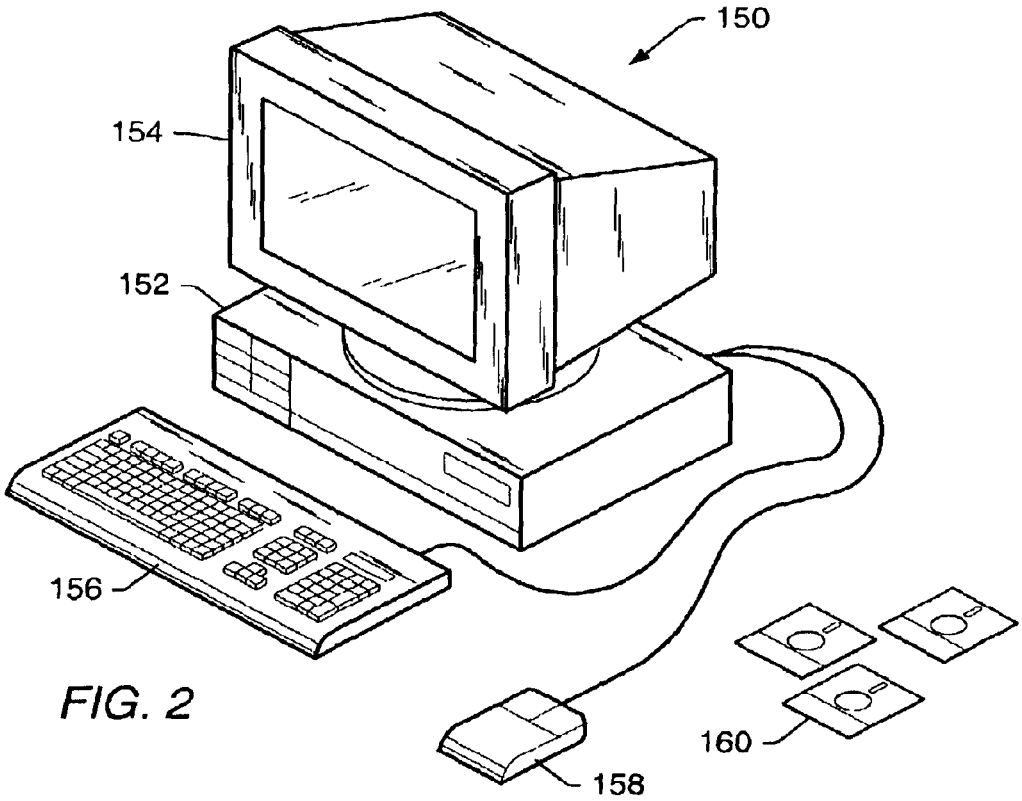
FIG. 2 depicts an embodiment of a computer system suitable for implementing various embodiments.

FIG. 2 illustrates an embodiment of computer system 150 that may be suitable for implementing various embodiments described herein. Each computer system 150 typically includes components such as CPU 152 with an associated memory medium such as floppy disks 160. The memory medium may store program instructions for computer programs. The program instructions may be executable by CPU 152. Computer system 150 may further include a display device such as monitor 154, an alphanumeric input device such as keyboard 156, and a directional input device such as mouse 158. Computer system 150 may be operable to execute computer programs to implement various embodiments disclosed herein.

Computer system 150 may include a memory medium on which computer programs according to various embodiments may be stored. The term "memory medium" is intended to include an installation medium (e.g., a CD-ROM or floppy disks 160), a computer system memory (e.g., DRAM, SRAM, EDO RAM, Rambus RAM), or a non-volatile memory (e.g., magnetic media such as a hard drive or optical media). The memory medium may also include other types of memory or combinations thereof. In addition, the memory medium may be located in a first computer which executes the programs or may be located in a second computer which connects to the first computer over a network. In the latter instance, the second computer may provide program instructions to the first computer for execution. Also, computer system 150 may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement various embodiments disclosed herein. The software program(s) may be implemented in various ways, including, but not limited to, procedure-based techniques, component-based techniques, and/or object-oriented techniques. For example, the software programs may be implemented using ActiveX controls, C++ objects, JavaBeans, Microsoft Foundation Classes ("MFC"), browser-based applications (e.g., Java applets), traditional programs, or other technologies or methodologies, as desired. A CPU such as host CPU 152 executing code and data from the memory medium may include a means for creating and executing the software program or programs according to the embodiments described herein.

Various embodiments may also include receiving or storing instructions and/or data on a carrier medium. Suitable carrier media may include storage media or memory media as described above. Carrier media may also include signals such as electrical, electromagnetic, or digital signals, conveyed via a communication medium (e.g., WAN 102, LAN 104 and/or a wireless link).

Application performance and availability may be improved by aggressive background replication. As used herein, "background replication" refers to distributing data (e.g., across a network) to where it may be needed before it is requested. In certain embodiments, background replication may involve hand tuning a network. However, given the rapid fluctuations of available network bandwidth and changing resource costs due to technology trends, hand tuning applications may risk (1) complicating applications, (2) being too aggressive and interfering with other applications, or (3) being too timid and not gaining the benefits of background replication. As used herein. "prefetching" refers to a particular form of background replication involving background replication of one or more data objects from a server to a cache. Generally, a data object may be prefetched with the goal of decreasing how long a user must wait to access the prefetched object(s). For example, in the case of a user browsing the Internet, a second web page may be prefetched while the user is viewing a first web page. Thus, if the user desires to view the second web page, the second web page (now loaded into the browser's cache) may be displayed more quickly than if the browser had to request the second web page from a server.

In an embodiment, an operating system may manage network resources in order to provide a simple abstraction of near zero-cost background replication. For example, a system referred to herein as TCP-Nice or Nice, may limit the interference inflicted by background flows on foreground flows. Microbenchmarks and case study applications suggest that, in practice, TCP-Nice interferes little with foreground flows while reaping a large fraction of spare network bandwidth and simplifying application construction and deployment. For example, in one microbenchmark, when demand flows consumed half of the available bandwidth, Nice flows consumed 50-80% of the remaining bandwidth without increasing average latencies of demand packets by more than 5%. If the same background flows are transmitted with TCP Reno, they can hurt foreground latencies by up to two orders of magnitude. Research indicates that aggressive prefetching (e.g., background replication of selected data objects) may improve demand performance by a factor of about three when Nice manages resources. However, the same prefetching may hurt demand performance by a factor of six under standard network congestion control.

Application performance and availability may be improved by aggressive background replication. A broad range of applications and services may be able to trade increased network bandwidth consumption and disk space for improved service latency, improved availability, increased scalability, and/or support for mobility. Many of these services have potentially unlimited bandwidth demands where incrementally more bandwidth consumption provides incrementally better service. For example, a web prefetching system may improve its hit rate by fetching objects from a virtually unlimited collection of objects that have non-zero probability of access or by updating cached copies more frequently as data change. Similarly, in peer-to-peer replication systems, Yu and Vandat suggest a direct trade-off between the aggressiveness of update propagation and service availability. Technology trends suggest that "wasting" bandwidth and storage to improve latency and availability will become increasingly attractive in the future. For example, per-byte network transport costs and disk storage costs are low and have been improving at about 80-100% per year. Conversely, network availability and network latencies improve slowly, and long latencies and failures waste human time.

Current operating systems and networks typically do not provide good support for aggressive background replication. In particular, because background transfers compete with foreground requests, aggressive replication can hurt overall performance and availability by increasing network congestion. Applications should therefore carefully balance the benefits of replication against the risk of both self-interference (in which applications hurt their own performance) and cross-interference (in which applications hurt performance of other applications). Often, applications attempt to achieve this balance by setting "magic numbers" (e.g., the prefetch threshold in certain prefetching algorithms) that have little obvious relationship to system goals (e.g., availability or latency) or constraints (e.g., current spare network bandwidth or server capacity).

In embodiments presented herein, an operating system may manage network resources to provide a simple abstraction of near zero-cost background replication. Such a self-tuning background replication layer may enable new classes of applications by (1) simplifying applications, (2) reducing the risk of being too aggressive, and/or (3) making it easier to reap a large fraction of spare bandwidth to gain advantages of background replication. Self-tuning resource management may assist in coping with network conditions that change significantly over periods of seconds (e.g., changing congestion), hours (e.g., diurnal patterns), and/or months (e.g., technology trends). In an embodiment, network resources may be managed rather than processors, disks, and memory because networks are shared across applications, users, and organizations and therefore are believed to pose the most critical resource management challenge to aggressive background replication. In some embodiments, network resources may be managed in addition to one or more additional resources, such as processors, disks, and memory.

A TCP-Nice system may reduce interference inflicted by background flows on foreground flows. For example, a TCP-Nice system may modify TCP congestion control to be more sensitive to congestion than traditional protocols (e.g., TCP-Reno or TCP-Vegas). A TCP-Nice system may also detect congestion earlier and/or react to congestion more aggressively than traditional protocols. Additionally, a TCP-Nice system may allow smaller effective minimum congestion windows than traditional protocols. In an embodiment, these features of TCP-Nice may limit the interference of background flows on foreground flows while achieving reasonable throughput in practice. In an embodiment, an implementation of Nice may allow senders (e.g., servers) to select Nice or a traditional congestion control protocol on a connection-by-connection basis. Such an embodiment may not require modifications at the receiver.

It may be desirable to minimize impact on foreground flows while reaping a significant fraction of available spare network capacity. Nice has been evaluated in this regard using theory, microbenchmarks, and application case studies. Embodiments presented herein are believed to be less aggressive than Reno. Additionally, in a simplified network model, it is believed that Nice flows interfere with Reno flows' bandwidth by a factor that falls exponentially with the size of the buffer at the bottleneck router independent of the number of Nice flows in the network.

As used herein, microbenchmarks may include both network simulations (using ns) to stress test the protocol and Internet measurements to examine the system's behavior under realistic conditions. Simulation results indicate that Nice may avoid interfering with traditional congestion control protocol flows (e.g., TCP-Reno, TCP-Vegas, etc.) across a wide range of background transfer loads and spare network capacity situations. For example, when there are 16 continuously backlogged background flows competing with demand HTTP cross traffic averaging 12 open connections and consuming half of the bottleneck bandwidth, the background flows slow down the average demand packet by less than 5% and reap over 70% of the spare network bandwidth. Conversely, 16 backlogged Reno (or Vegas) flows slow demand requests by more than an order of magnitude.

Internet microbenchmarks may measure the performance of simultaneous foreground and background transfers across a variety of Internet links. Based on studies discussed herein, it is believed that background flows may cause little interference to foreground traffic (e.g., average latency and bandwidth of the foreground flows are substantially the same whether foreground flows compete with background flows or not). It is also believed that there is sufficient spare capacity that background flows may reap significant amounts of bandwidth throughout the day. During one study, for example, Nice flows between London, England and Austin, Tex. averaged more than 80% of the bandwidth achieved by Reno flows during most hours. During the worst hour of the study it was observed that the Nice flows still saw more than 30% of the bandwidth of the Reno flows.

Studies disclosed herein also examine the end-to-end effectiveness, the simplicity, and the usefulness of Nice. Two services were studied. A first system studied included a HTTP prefetching client and server and used Nice to regulate the aggressiveness of prefetching. A second system studied included a model of a Tivoli Data Exchange system for replicating data across large numbers of hosts. In both studies, Nice: (1) simplified the application by eliminating magic numbers; (2) reduced the risk of interfering with demand transfers; and (3) improved the effectiveness of background transfers by using significant amounts of bandwidth when spare capacity exists. For example, in a prefetching case study, applications that prefetch aggressively, demonstrated improved performance by a factor of 3 when Nice is used. If the applications prefetched using TCP-Reno instead, however, the prefetching overwhelmed the network and increased total demand response times by more than a factor of six.

Congestion control mechanisms in existing transmission protocols generally include a congestion signal and a reaction policy. The congestion control algorithms in popular variants of TCP (Reno, NewReno, Tahoe, SACK) typically use packet loss as a congestion signal. In steady state, the reaction policy may use additive increase and multiplicative decrease (AIMD). In an AIMD framework, the sending rate may be controlled by a congestion window that is multiplicatively decreased by a factor of two upon a packet drop and is increased by one per window of data acknowledged. It is believed that AIMD-type frameworks may contribute significantly to the robustness of the Internet.

With respect to minimizing interference, however this congestion signal (a packet loss) arrives too late to avoid damaging other flows. In particular, overflowing a buffer (or filling a RED router enough to cause it to start dropping packets) may trigger losses in other flows, forcing them to back off multiplicatively and lose throughput.

Certain traditional congestion protocols attempt to detect incipient congestion (e.g., TCP-Vegas). To detect incipient congestion due to interference, round trip delays of packets may be monitored. Increasing round trip delays may be used as a signal of congestion. By monitoring round trip delays, each Vegas flow tries to keep between $\alpha$ (typically 1) and $\beta$ (typically 3) packets buffered at the bottleneck router. As used herein, a "bottleneck router" refers to a router (either actual or virtual) which accounts for much of the round trip delay experienced by a data packet. If fewer than $\alpha$ packets are queued, Vegas increases the window by one unit (typically one data packet) per received acknowledgement. If more than β packets are queued, the method decreases the window by one unit per received acknowledgement. Vegas does this estimation as follows:

$$E = \frac{W}{\text{minRTT}},$$

where E is the Expected throughput $$A = \frac{W}{\text{observedRTT}},$$

wherein A is the Actual throughput $$\text{Diff} = E - A$$

$$\text{if } \left(\text{Diff} < \frac{\alpha}{\text{minRTT}}\right)$$

$$W = W + 1$$

$$\text{else if } \left(\text{Diff} > \frac{\alpha}{\text{minRTT}}\right)$$

$$W = W - 1$$

Bounding the difference between the actual and expected throughput translates to maintaining between α and β packets in the bottleneck router. Vegas may have some drawbacks as a background replication protocol. For example:

1. Vegas competes for throughput approximately fairly with Reno.
2. Vegas attempts to back off when the number of queued packets from its flows increase. However, it does not necessarily back off when the number of packets enqueued by other flows increases.
3. Each Vegas flow tries to keep α and β (e.g., between about 1 to 3) packets in the bottleneck queue; hence, a collection of background flows could cause significant interference.

Note that even setting α and β to very small values may not prevent Vegas from interfering with cross traffic. The linear decrease on the "Diff>β" trigger may not be responsive enough to inhibit interference with other flows. This expectation has been confirmed by simulations and real world experiments, and also follows as a conclusion from theoretical analysis.

The TCP-Nice includes components not present in Vegas. For example, in an embodiment, TCP-Nice may include: 1) a more sensitive congestion detector; 2) multiplicative reduction in response to incipient congestion (e.g., increasing round trip times); and 3) the ability to reduce the congestion window below one.

In an embodiment, a Nice flow may signal congestion when significant queuing is detected. In an embodiment, congestion may be signaled before dropping of demand packets from the queue impacts a foreground flow. For example, Nice may indicate significant queuing before the router queue fills for a drop-tail router. In another example, Nice may indicate significant queuing in a random early detection (RED) router before the router queue fills enough to start probabilistically dropping packets or soon after the router starts probabilistically dropping packets. In some embodiments, a Nice flow may monitor round trip delays, estimate the total queue size at the bottleneck router, and signal congestion when this total queue size exceeds a fraction of the estimated maximum queue capacity. For example, a Nice flow may use minRTT (the minimum observed round trip time) as an estimate of the round trip time when queues are empty. The Nice flow may use maxRTT (the maximum observed round trip time) as an estimate of the round trip time when the bottleneck queue is full. If more than fractions of the packets Nice sends during a RTT (round trip time) window encounter delays exceeding minRTT+(maxRTT−minRTT)*threshold, the detector may signal congestion. In an embodiment, minRTT and maxRTT may be initialized by assuming that the first round trip delay is minRTT and setting the maxRTT to 2*minRTT. In another embodiment, Nice filters minRTT and maxRTT measurements to eliminate statistically insignificant measurements (e.g., outliers). For example, the longest 10% of round trip times and/or the shortest 10% of round trip times may be ignored. Such moving measures may have their limitations. For example, if the network is in a state of persistent congestion, a bad estimate of minRTT may be obtained. However, past studies have indicated that a good estimate of the minimum round trip delay may typically be obtained in a short time. Route changes during a transfer may also contribute to inaccuracies in RTT estimates. However, such changes are believed to be relatively uncommon. It is also believed that to route changes may be handled by weighting recent measurements more heavily than older measurements. For example, exponentially decaying averages for minRTT and maxRTT estimates may be maintained.

Some systems have signaled congestion when encountering delays exceeding minRTT*(1+threshold'). Expressing the threshold in terms of the difference between minRTT and maxRTT makes the problem more mathematically tractable and reduces the need to hand-tune threshold for different networks.

In an embodiment, when a Nice flow signals congestion, it reduces its congestion window by a multiplicative factor. For example, in one embodiment, when a Nice flow signals congestion, the current congestion window is halved. In contrast, Vegas reduces its window by one packet each round that encounters long round trip times. A Vegas window is halved only if packets are lost (i.e., Reno-like behavior). In an embodiment, limiting interference with demand flows may include detecting when queues exceed a threshold and backing off multiplicatively. Experimental results show that such methods may achieve reasonable throughput in practice.

Figure 3:
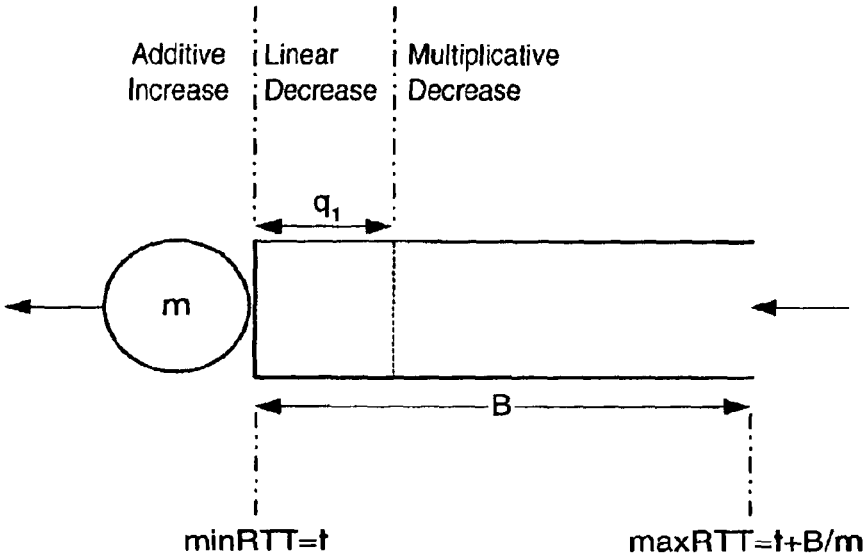
FIG. 3 depicts dynamics of a Nice queue system.

FIG. 3 shows a queue at a bottleneck router that routes Nice flows with a threshold t and fractions Round trip delays of packets are indicative of the current queue size. In an embodiment, the Nice congestion avoidance mechanism may be written as:

```
per ack operation:
    if(curRTT > (1 − t)min RTT + t · max RTT)
        numCong++;
per round operation:
    if(numCong > f · W)
        W ← W/2;
        numCong = 0;
    else {
        // ... congestion avoidance of a traditional protocol follows
    }
```

If the congestion condition does not trigger, Nice may utilize the congestion avoidance rules of a traditional protocol (e.g., TCP-Vegas or TCP-Reno). Additionally, if a packet is lost, Nice may utilize the congestion avoidance rules of a traditional protocol.

In an embodiment, TCP-Vegas congestion control rules may be used as the traditional protocol and both Nice and Vegas congestion control rules operate on a common congestion window variable. This embodiment was utilized for the experiments described below. In another embodiment, TCP-Reno congestion control rules may be used as the traditional protocol.

In another embodiment, two separate limits are maintained on sending rates. One limit is maintained by the traditional protocol and a separate limit is maintained by Nice. The system is organized so that the actual sending rate is the minimum of the two limits. For example, in an embodiment, a user-level control algorithm maintains a congestion window for each connection in accordance with the Nice rules and a kernel-level control algorithm maintains a congestion window in accordance with Reno rules. The user level control algorithm ensures that packets are submitted to the kernel TCP congestion control algorithm at a rate not exceeding the Nice-limited rate, and then kernel congestion control algorithm ensures that packets are submitted to the network at a rate not exceeding the Reno-limited rate; together these controls ensure that packets are not submitted to the network at a rate exceeding the minimum of the Nice and Reno limited rates.

In certain embodiments, Nice congestion control may to allow the window sizes to multiplicatively decrease below one if so dictated by the congestion trigger and response. To affect window sizes less than one, a packet may be sent out after waiting for the appropriate number of smoothed round trip delays. In these circumstances, ack-clocking may be lost, but the flow continues to send at most as many packets into the network as it gets out. In this phase, the packets act as network probes waiting for congestion to dissipate. By allowing the window to go below one, Nice retains the non-interference property even for a large number of flows. Both analysis and experiments indicate that this optimization may reduce interference, particularly when testing against several background flows.

In an embodiment, a Nice system may be implemented by extending an existing version of the Linux kernel that supports Vegas congestion avoidance. Like Vegas, microsecond resolution timers may be used to monitor round trip delays of packets to implement a congestion detector.

Typically, a Linux TCP implementation may maintain a minimum window size of two in order to avoid delayed acknowledgements by receivers that attempt to send one acknowledgement for every two packets received. To allow the congestion window to go to one or below one, a new timer may be added that runs on a per-socket basis when the congestion window for the particular socket (flow) is below two. In this phase, the flow waits for the appropriate number of RTTs before sending two packets into the network. Thus, a window sized at 1/16 of a data packet sends out two packets after waiting for 32 smoothed round trip times. In an embodiment, the minimum window size may be limited. For example, in certain embodiments, the minimum window size may be limited to 1/48.

In an embodiment, congestion detection may include a number of configurable parameters such as, but not limited to, fraction and threshold. For example, the congestion detector may signal congestion when more than fraction=0.5 packets during an RTT encounter delays exceeding threshold=0.2. Experimental data indicate that interference of Nice flows with demand flows is relatively insensitive to the fraction parameter chosen. Since, in some embodiments, packets are sent in bursts, most packets in a round observe similar round trip times.

A simple API may be provided to designate a flow as a background flow through an option in the "setsockopt" system call. By default, flows may be considered foreground flows for experimental purposes.

Analysis indicates that under a simplified network model, for long transfers, the reduction in the throughput of Reno flows may be asymptotically bounded by a factor that falls exponentially with the maximum queue length of the bottleneck router irrespective of the number of Nice flows present.

The following analysis assumes a simplified fluid approximation and synchronous network model. The analysis may apply, for example, to long background flows. The analysis also assumes long foreground Reno flows. The analysis further assumes that a Nice sender accurately estimates the queue length during the previous epoch at the end of each RTT epoch. These assumptions apply only to the formal analysis of the Nice protocol, and are not intended to limit embodiments presented herein in any way. The Nice protocol is believed to work well under more general circumstances (as demonstrated by experimental results presented herein).

A simplified fluid approximation model of the network may be used to model the interaction of multiple flows using separate congestion control algorithms. This model may assume infinitely small packets. For purposes of the model, the network itself may be simplified to a source, a destination, and a single bottleneck. The bottleneck router may perform drop-tail queuing.

Let $\mu$ denote the service rate of the queue and B the buffer capacity at the queue. Let $\tau$ be the round trip delay of packets between the source and destination excluding all queuing delays. A fixed number of connections may be considered, including l following Reno and m following Nice. Each of the connections may have one continuously backlogged flow between a source and a destination. Let t be the Nice threshold and $q_t=t*B$ be the corresponding queue size that triggers multiplicative backoff for Nice flows. The connections may be homogeneous (i.e., they may experience the same propagation delay $\tau$). Moreover, the connections may be synchronized so that in the case of buffer overflow, all connections may simultaneously detect a loss and multiply their window sizes by $\gamma$. The congestion avoidance phase of the model is described herein to analyze the steady-state behavior.

A bound on the reduction in the throughput of Reno flows due to the presence of Nice flows may be obtained by analyzing the dynamics of the bottleneck queue. To do so, the duration of the flows may be divided into periods. In each period, the decrease in the number of Reno packets processed by the router due to interfering Nice packets may be bounded.

Let $W_r(t)$ and $W_n(t)$ denote the total number of outstanding Reno and Nice packets in the network at time t, respectively. W(t), the total window size, is $W_r(t)+W_n(t)$. These window sizes may be traced across periods. The end of one period and the beginning of the next period may be marked by a packet loss. Upon packet loss, each flow may reduce its window size by a factor of $\gamma$. Thus, $W(t)=\mu\tau+B$ just before a loss and $W(t)=(\mu\tau+B)*\gamma$ just after the packet loss. Let $t_0$ be the beginning of one such period after a loss. Consider the case when $W(t_0)=(\mu\tau+B)*\gamma<\mu\tau$ and $m>l$. For ease of analysis it may be assumed that the "Vegas $\beta$" parameter for the Nice flows is 0. That is, the Nice flows may additively decrease upon observing round trip times greater than $\tau$. The window dynamics in any period may be split into three intervals as described below.

Additive Increase, Additive Increase: In this interval $[t_0, t_1]$, both Reno and Nice flows may increase linearly. W(t) increases from $W(t_0)$ to $W(t_1)=\tau$, at which point the queue starts building.

Additive Increase, Additive Decrease: This interval $[t_1, t_2]$ is marked by additive increase of $W_r$. Additionally, in embodiments where TCP-Vegas is used as the traditional protocol, $W_n$ may additively decrease of as the "Diff>β" rule triggers the underlying Vegas controls for the Nice flows. The end of this interval is marked by $W(t_2)=\mu\tau+q_1$.

Additive Increase, Multiplicative Decrease: In this interval $[t_2, t_3]$, $W_n(t)$ may multiplicatively decrease in response to observing queue lengths above $q_t$. The rate of decrease of $W_n(t)$, however, may be bounded by the rate of increase of $W_r(t)$, as any faster decrease may cause the queue size to drop below $q_t$. At the end of this interval $W(t_3)=\Xi\tau+B$. At this point, each flow may decrease its window size by a factor of γ, thereby entering into the next period.

To quantify the interference experienced by Reno flows in the presence of Nice flows, differential equations may be formulated to represent the variation of the queue size in a period. The values of $W_r$ and $W_n$ at the beginning of periods may stabilize after several losses, so that the length of a period converges to a fixed value. It is then straightforward to compute the total amount of Reno flow sent out in a period. The interference I, defined as the fractional loss in throughput experienced by Reno flows because of the presence of Nice flows, may be given as follows.

Theorem 1: The interference I is given by:

$$I \leq \frac{4m \cdot e^{\left(-\frac{B(1-t)\gamma}{m}\right)}}{(\mu\tau + B)\gamma}$$

The derivation of I indicates that all three design features of Nice may contribute to reducing interference. The interference falls exponentially with B(1−t) or $B-q_t$, which reflects the time that Nice may multiplicatively back off before packet losses occur. Intuitively, multiplicative decrease may allow any number of Nice flows to get out of the way of additively increasing demand flows. The dependence on the ratio B/m suggests that as the number of demand flows approaches the maximum queue size, the non-interference property may start to break down. Such a breakdown may not be surprising, as each flow barely gets to maintain one packet in the queue and TCP Reno is known to to behave anomalously under such circumstances. In a well designed network, when B>>m, the dependence on the threshold t may be weak. That is, interference may be small when t is small. Therefore, careful tuning of the exact value of t in this region may be unnecessary. Analysis indicates that the above bound on I may hold even for the case when m>>1.

Experiments were conducted to test the non-interference properties of Nice. Additionally, the experiments determined whether Nice gets any useful bandwidth for the workloads considered. Using controlled ns simulations, the system was stress tested by varying network configurations and loads to extreme values. Nice methods were also systematically compared to other methods. In general, the experiments indicated that:

- Nice flows cause almost no interference irrespective of the number of flows.
- Nice flows may utilize a significant fraction of the available spare bandwidth.
- Nice methods may outperform other existing protocols, including Reno, Vegas, and Vegas with reduced α and β parameters.

All of the simulation experiments were conducted using ns 2.1 b8a. A barbell topology was used in which N TCP senders transmit through a shared bottleneck link L to an equal number of receivers. The router connecting the senders to L becomes the bottleneck queue. The routers performed drop-tail first-in-first-out queuing. The router buffer size was set to 50 packets. Each packet was 1024 bytes in size. The propagation delay was set to 50 ms. The capacity of the link was varied to simulate different amounts of spare capacity.

A 15 minute section of a Squid proxy trace logged at UC Berkeley was used as the foreground traffic over L. The number of flows fluctuated as clients entered and left the system as specified by the trace. On average, there were about 12 active clients. In addition to this foreground load, permanently backlogged background flows were introduced. For the initial set of experiments, the bandwidth of the link was fixed to twice the average demand bandwidth of the trace. The primary metric used to measure interference was the average round trip latency of a foreground packet (i.e., the time between its being first sent and the receipt of the corresponding ack, inclusive of retransmissions). The total number of bytes transferred by the background flows was used as the measure of utilization of spare capacity.

The performance of the background protocol was compared to several other strategies for sending background flows. For example, router prioritization that services a background packet only if there are no queued foreground packets was used for comparison. Router prioritization may be considered the ideal strategy with respect to performance for background flow transmission. In some cases, however, router prioritization may require modification to existing networks and routers, and thus may be impractical to deploy and use. In addition, Vegas (α=1, β=3), Reno, Vegas (α=0, β=0), and rate-limited Reno (which sets a maximum transmission bandwidth on each flow) were used for comparison.

Figure 4:
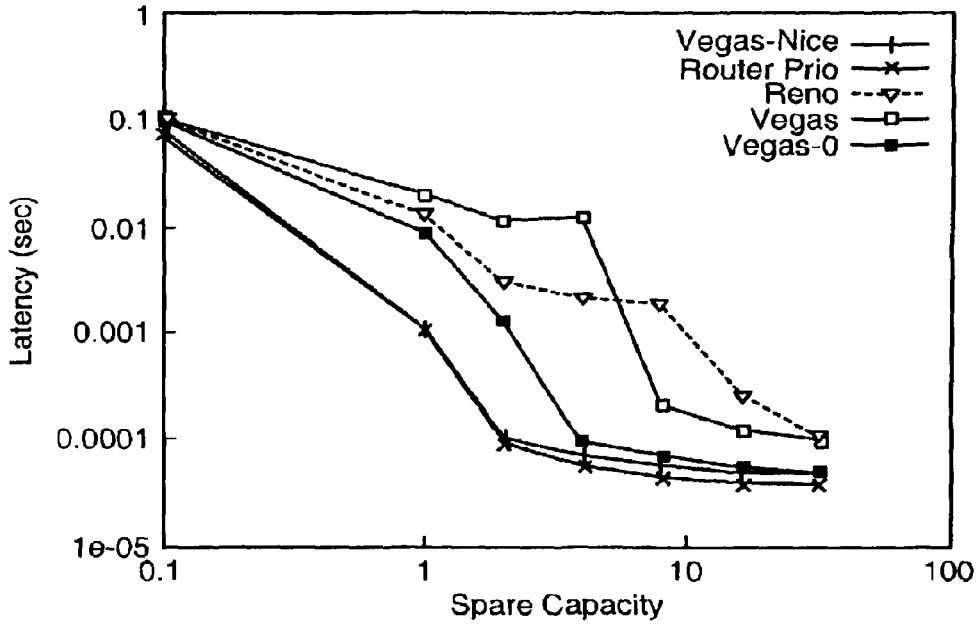
FIG. 4 depicts experimental results showing spare capacity vs. latency.

Experiment 1: In this experiment, the number of background flows was fixed to 8 and the spare capacity, S, was varied. To achieve a spare capacity S, the bottleneck link bandwidth L was set to (1+S)*averageDemandBW, where averageDemandBW is the total number of bytes transferred in the trace divided by the duration of the trace. FIG. 4 is a plot the average latency of foreground packets as a function of spare capacity in the network. Different lines represent different runs of the experiments using different protocols for background flows. It can be seen that the Nice is hardly distinguishable from the router prioritization, whereas the other protocols cause a significant increase in foreground latency. Note that the Y-axis is on a log scale, indicating that in some cases Reno and Vegas increase foreground packet latencies by two orders of magnitude.

Figure 5:
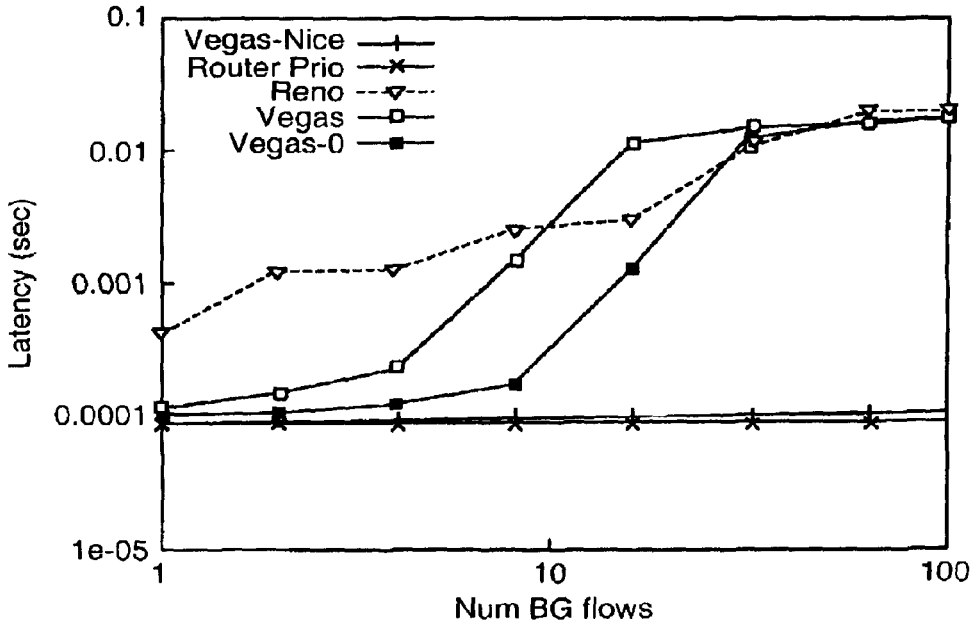
FIG. 5 depicts experimental results showing number of background flows vs. latency.
Figure 6:
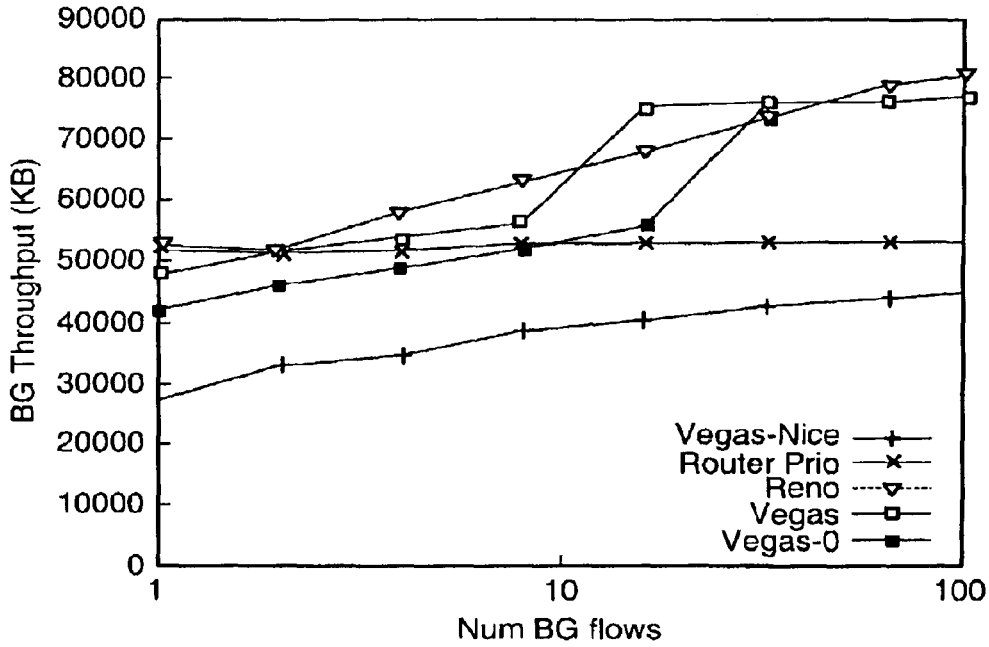
FIG. 6 depicts experimental results showing number of background flows vs. background throughput.

Experiment 2: In this experiment the spare capacity, S, of the network was fixed at 1. The number of background flows was varied. The bottleneck link bandwidth, L, was set to twice the bandwidth needed by demand flows. FIG. 5 is a plot of the latency of foreground packets versus the number of background flows. Even with 100 background Nice flows, the latency of foreground packets is hardly distinguishable from the ideal case when routers provide strict prioritization. On the other hand, Reno and Vegas background flows can cause latency of demand flows to increase by orders of magnitude. FIG. 6 is a plot of the number of bytes successfully transmitted by the background flows. A single Nice background flow reaped about half the spare bandwidth available under router prioritization. This background throughput improved with increasing number of Nice background flows but remained below router prioritization. Note that although Reno and Vegas obtained better throughputs, even for a small number of flows each went beyond the router prioritization line. This indicates that the Reno and Vegas flows stole bandwidth from foreground traffic.

These experiments were also performed where the Nice congestion window was not allowed to fall below 1. In these cases, when the number of background flows exceeded about 10, the latency of foreground flows began to increase noticeably. The increase in foreground flow latency was about a factor of two when the number of background flows was 64.

Figure 7:
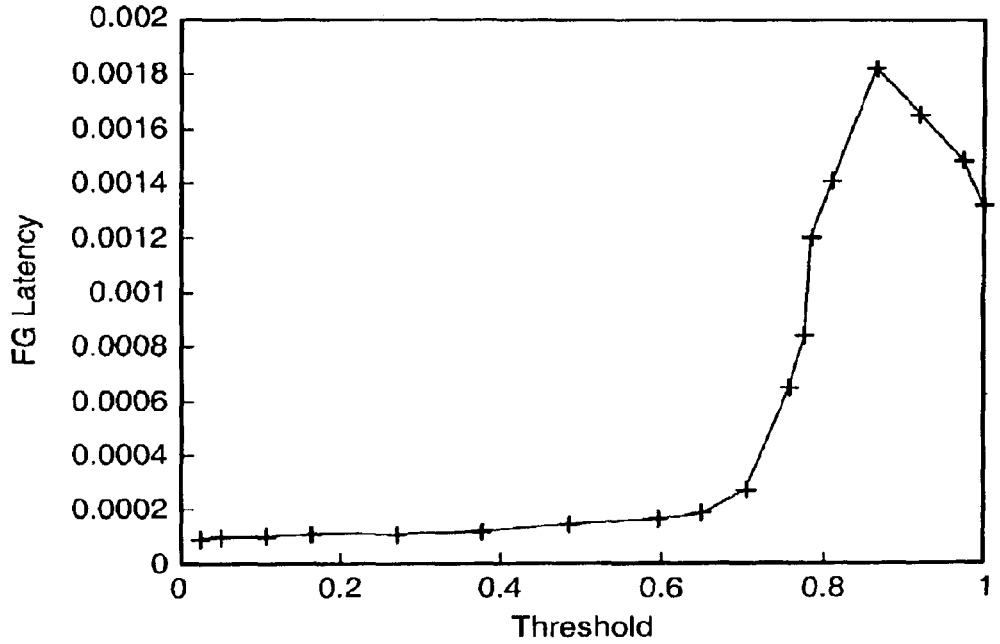
FIG. 7 depicts experimental results showing threshold vs. foreground latency.

Experiment 3: In this experiment the effect of the Nice threshold and fraction parameters was tested. FIG. 7 shows the latency of foreground packets as a function of the threshold for the same trace as above, with S=1 and 16 background flows. As the threshold value increased, the interference caused by Nice increased until the protocol finally reverted to Vegas behavior as the threshold approached 1. Nice demonstrated low interference over a large range of threshold values, suggesting that the threshold value may not need to be manually tuned for each network. Similarly, no significant change in foreground latency was found as the trigger fraction was varied from 0.1 to 0.9.

Experiment 4a: Nice flows were compared to simple rate-limited Reno flows. The foreground traffic was again modeled by the Squid trace and the experiment performed was identical to experiment 1.

Figure 8:
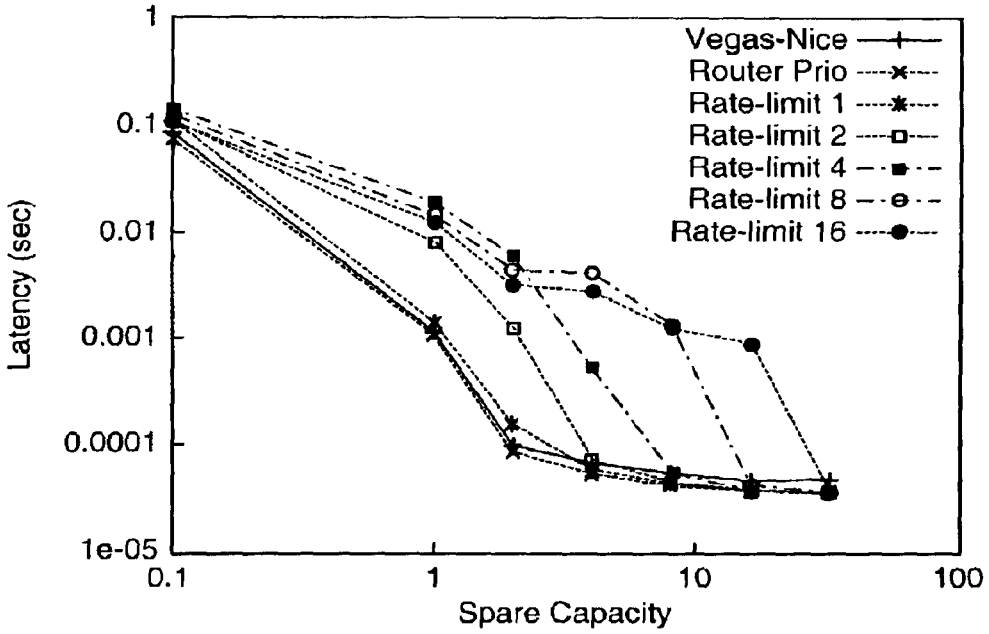
FIG. 8 depicts experimental results showing spare capacity vs. latency.

FIG. 8 is a plot of the average latency of foreground packets as a function of the spare capacity in the network. The various lines represent rate-limited background flows with the limits corresponding to a window size of 1, 2, 4 and 16. It can be seen that even a flow with a rate limit of 1 caused slightly greater interference than Nice. This result is not surprising since Nice is equipped to reduce its window size below one when it deems necessary to minimize interference. All other flows with higher rates performed much worse and resulted in up to two orders of magnitude of increase in latency.

Figure 9:
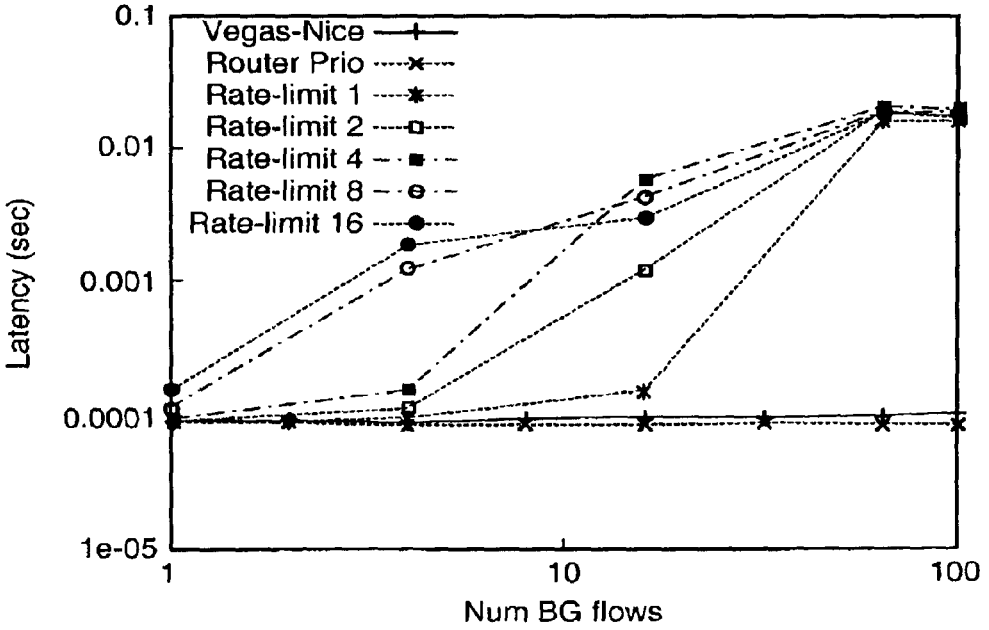
FIG. 9 depicts experimental results showing number of background flows vs. latency.
Figure 10:
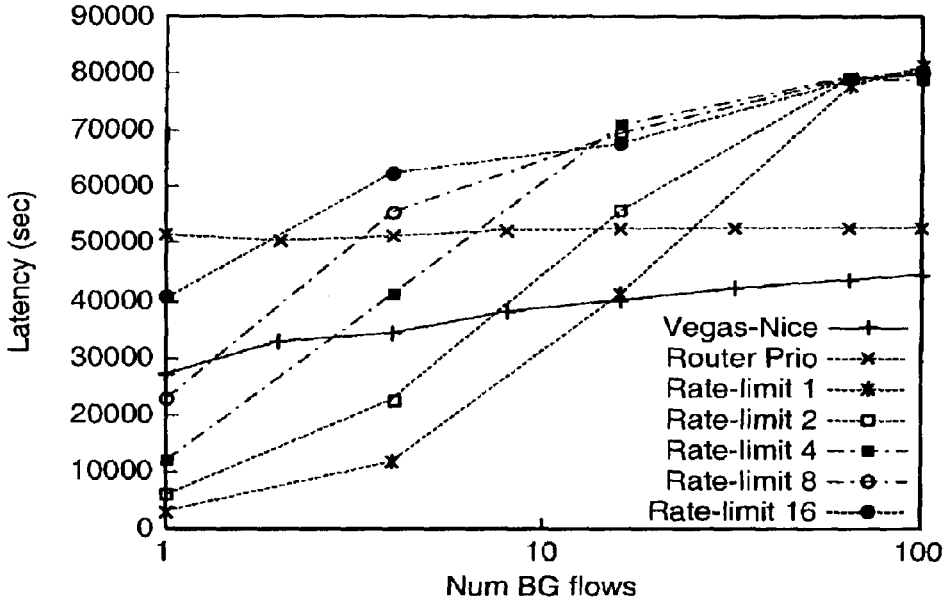
FIG. 10 depicts experimental results showing number of background flows vs. background throughput.

Experiment 4b: In this experiment the spare capacity of the network, S, was fixed at 1. The bottleneck link bandwidth, L, was set at twice the bandwidth needed by demand flows. The number of background flows was varied. This experiment was otherwise identical to experiment 2. FIG. 9 is a plot of the latency of foreground packets versus the number of background flows. Even flows limited to a window size of 1 caused up to two orders of magnitude of increase in latency when there were 64 background flows present. Nice, on the other hand, was hardly distinguishable from the router prioritization line even for 100 background flows. FIG. 10 is a plot of the number of bytes the background flows that managed to get across. A single Nice background flow achieved more throughput than a flow rate-limited to a window size of 8. This single Nice flow obtained about 10 times as much throughput as a flow rate-limited to a window of one, but still caused lower interference, as seen in FIG. 9. With increasing number of flows, the rate-limited flows showed a linear (X-axis is on a log-scale) increase in throughput while the throughput obtained by Nice increased more slowly. However, all the rate-limited flows sooner or later crossed the router prioritization line, or stole bandwidth from the foreground flows. Nice, on the other hand, remained below the router prioritization line and reaped between 60-80% of the spare bandwidth.

Experiment 5a: In this experiment the foreground traffic was modeled as a set of user datagram protocol (UDP) sources transmitting in an on/off manner in accordance with a Pareto distribution. The burst time and idle time were each set to 250 ms, and the value of the shape parameter set to 1.5. The experiments performed were otherwise identical to the experiments involving trace-based traffic (e.g., spare capacity and the number of background flows were varied).

Figure 11:
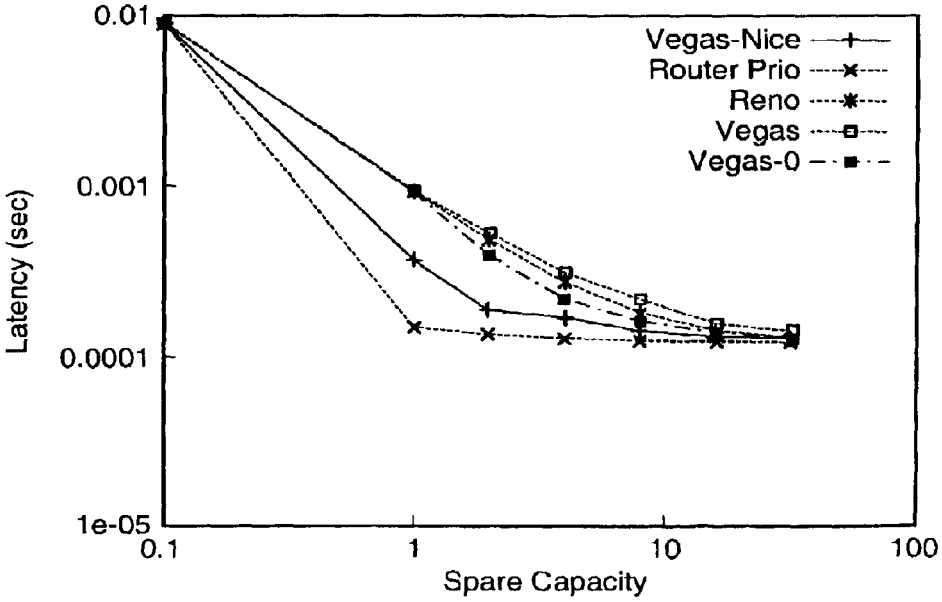
FIG. 11 depicts experimental results showing spare capacity vs. latency.

FIG. 11 shows average latency of foreground packets as a function of spare capacity in the network. The Nice flows caused less latency overhead than Reno or Vegas. However, the difference is not as dramatic as in the case in which the foreground traffic was a trace following TCP suggesting that Nice may be less well-suited to environments in which the traffic is unpredictable.

Figure 12:
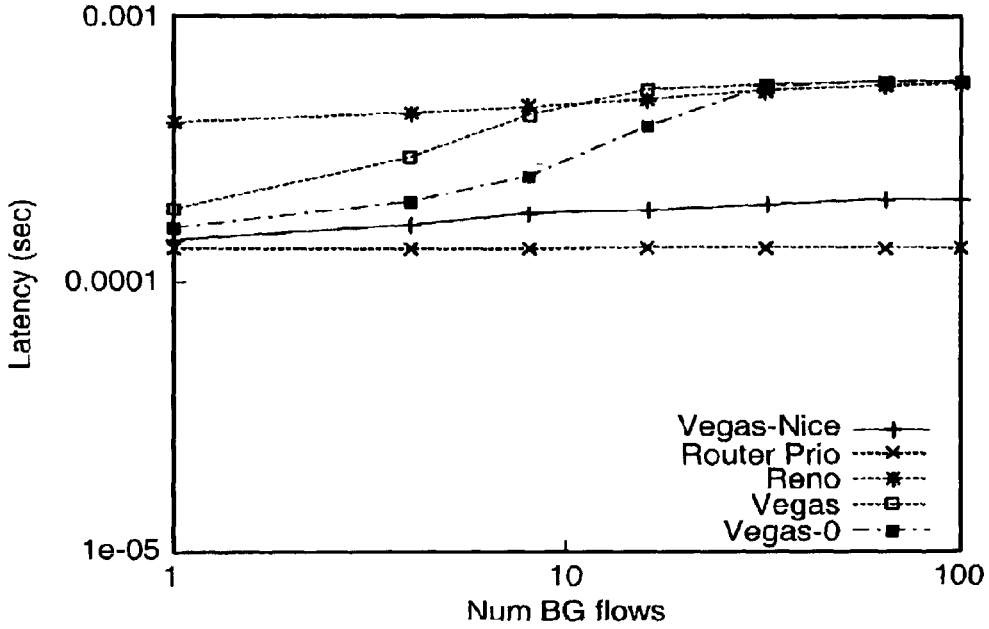
FIG. 12 depicts experimental results showing number of background flows vs. latency.
Figure 13:
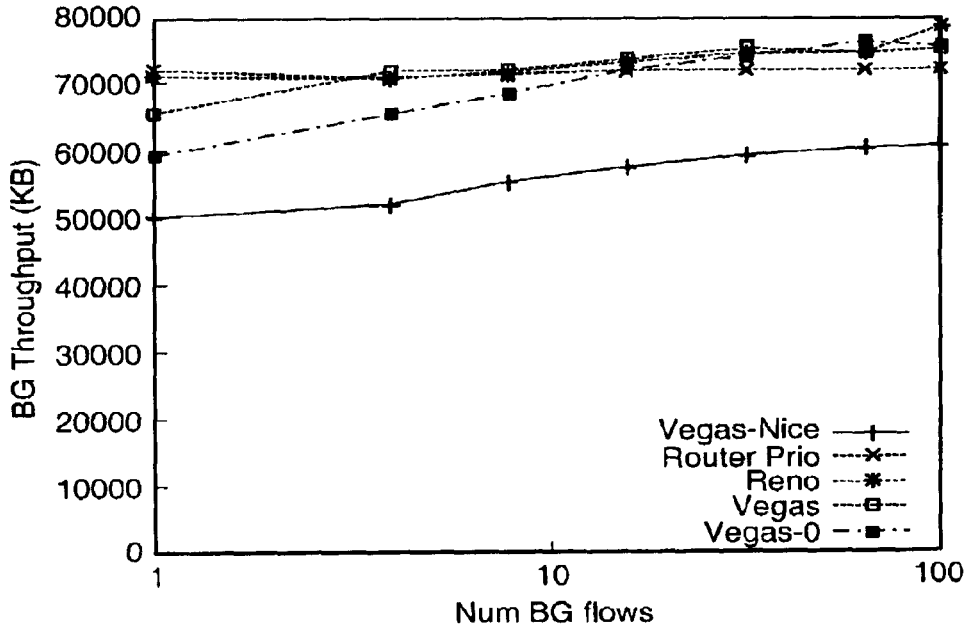
FIG. 13 depicts experimental results showing number of background flows vs. background throughput.
Figure 14A:
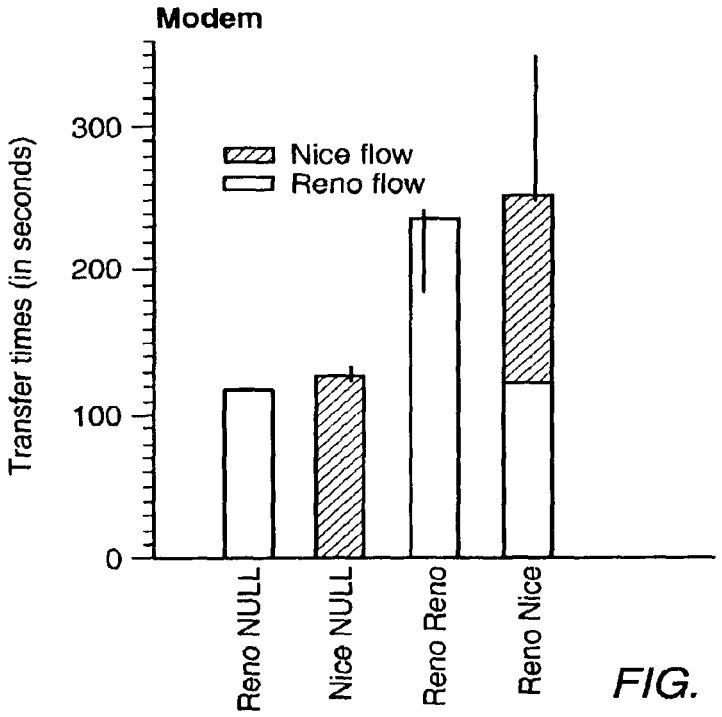
FIG. 14A depicts experimental results showing large flow transfer performance for various systems over a modem.
Figure 14B:
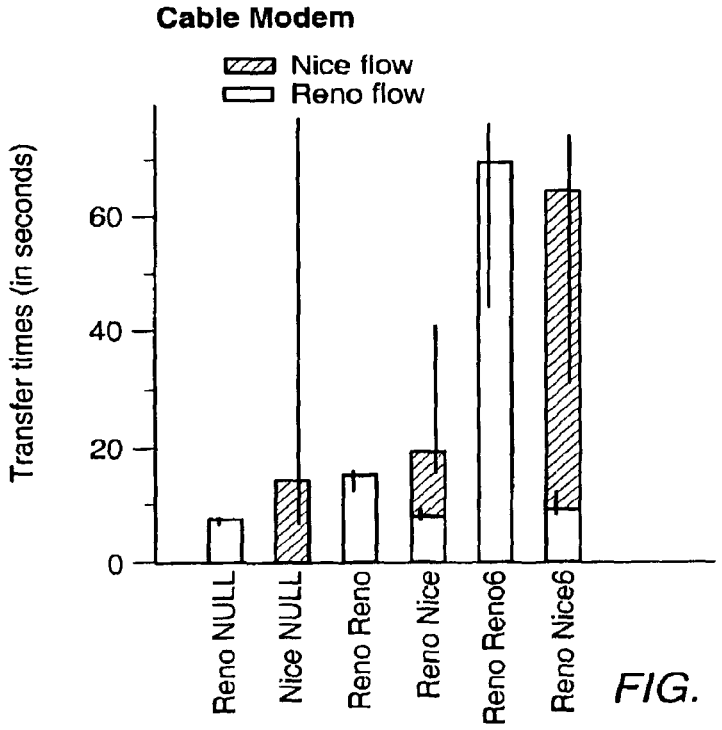
FIG. 14B depicts experimental results showing large flow transfer performance for various systems over a cable modem.
Figure 14C:
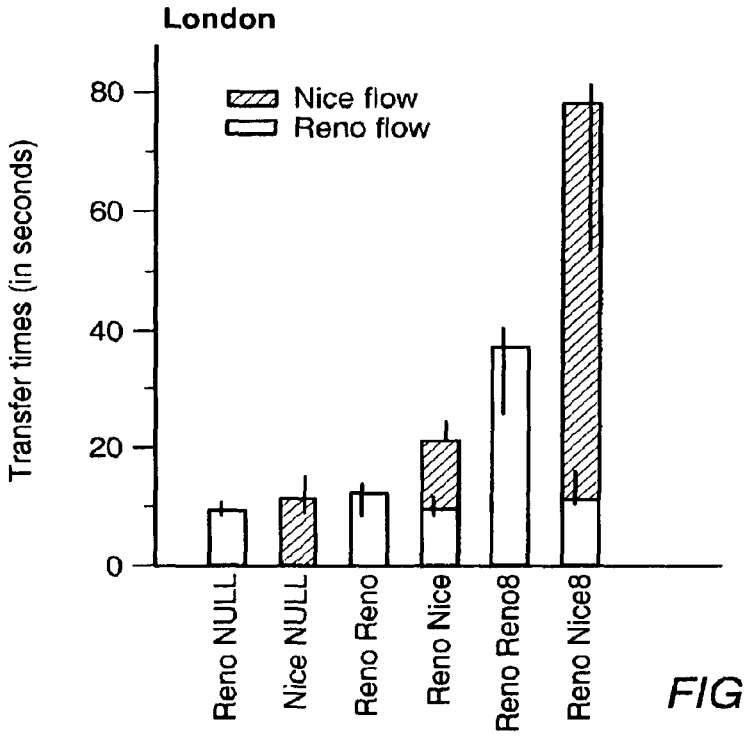
FIG. 14C depicts experimental results showing large flow transfer performance for various systems between London, England and Austin, Tex.
Figure 14D:
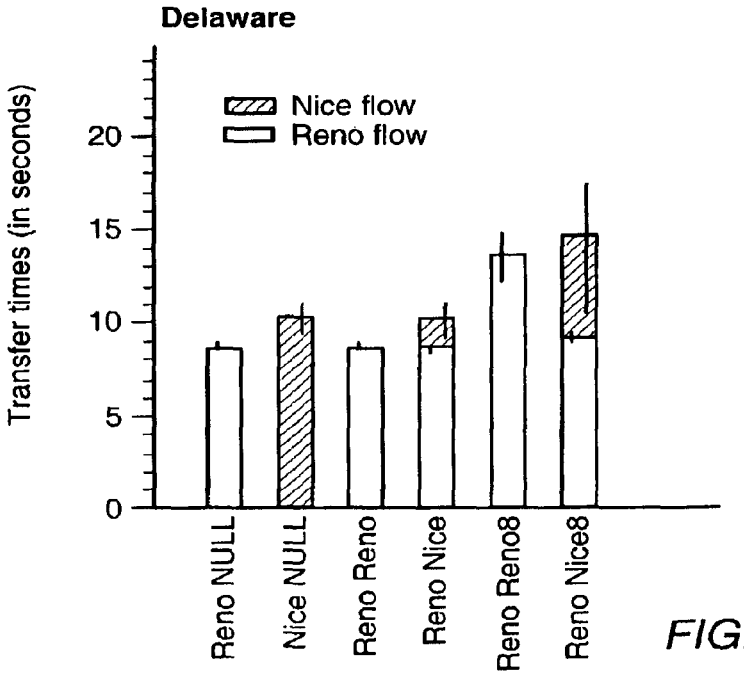
FIG. 14D depicts experimental results showing large flow transfer performance for various systems between Delaware and Austin, Tex.
Figure 15A:
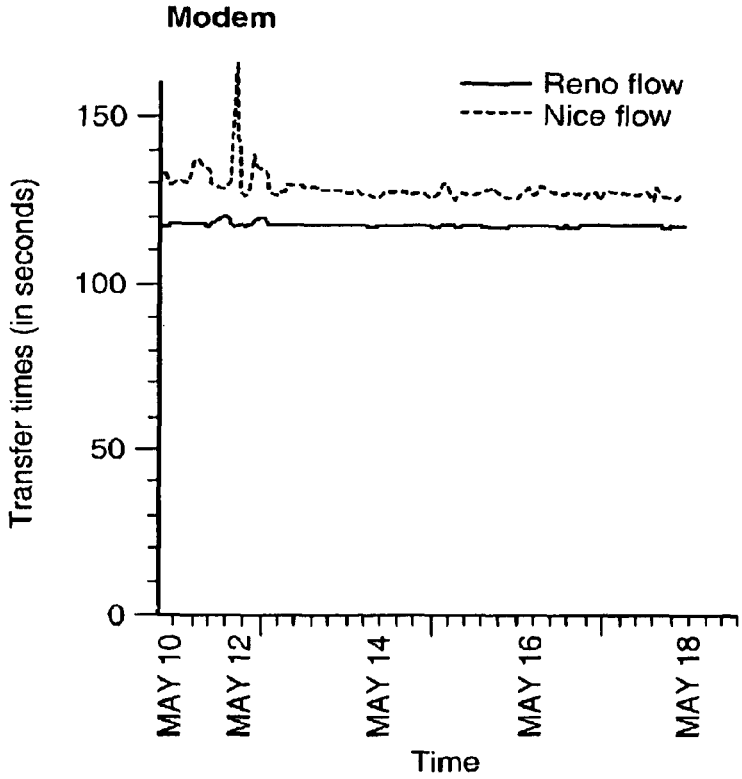
FIG. 15A depicts experimental results showing large flow transfer performance over time for various systems using a modem.
Figure 15B:
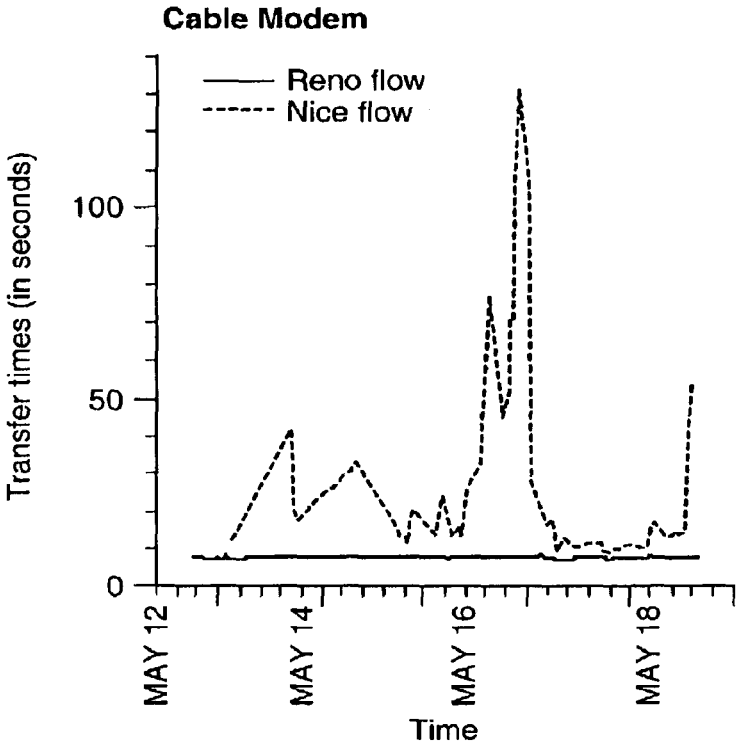
FIG. 15B depicts experimental results showing large flow transfer performance over time for various systems using a cable modem.
Figure 15C:
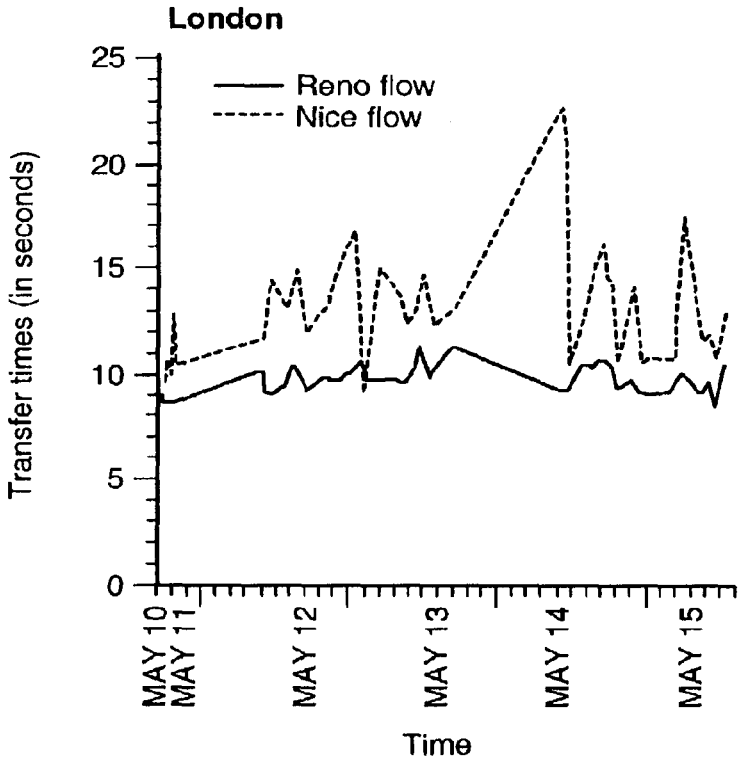
FIG. 15C depicts experimental results showing large flow transfer performance over time for various systems between London, England and Austin, Tex.
Figure 15D:
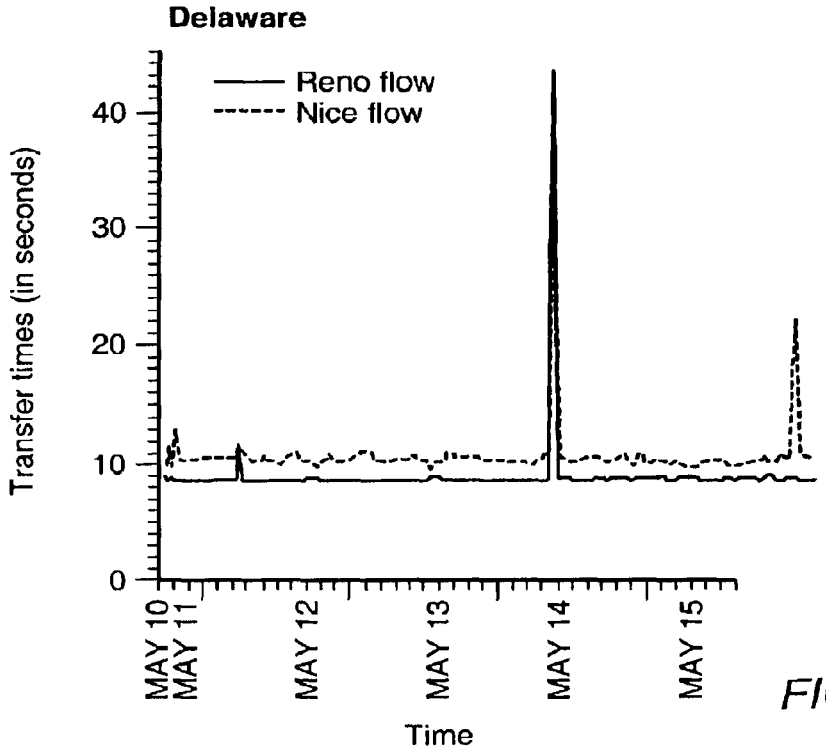
FIG. 15D depicts experimental results showing large flow transfer performance over time for various systems between Delaware and Austin, Tex.

Experiment 5b: In this experiment the capacity of the network was fixed at S=2. The bottleneck link bandwidth, L, was set at four times the bandwidth needed by demand flows. The number of background flows was varied. FIG. 12 is a plot of the latency of foreground packets versus the number of background flows. Though Nice outperformed Reno and Vegas, it did not match router prioritization as closely. However, Nice continued to show graceful degradation with the number of background flows because of its ability to decrease its window size below one. FIG. 13 is a plot of the number of bytes the background flows managed to get across. A single Nice flow obtained about 70% of the spare bandwidth available under router prioritization. This background throughput improved with increasing number of background flows, but remained below router prioritization. Thus, Nice may reap a significant fraction of the spare capacity even when the foreground traffic is unpredictable.

Controlled experiments were also performed in which a Nice implementation was tested over a variety of Internet links. The experiments focused on answering three questions. First, in a less controlled environment than ns simulations, does Nice still avoid interference? Second, are there enough reasonably long periods of spare capacity on real links for Nice to reap reasonable throughput? Third, are any such periods of spare capacity spread throughout the day, or is the usefulness of background transfers restricted to nights and weekends?

The experimental results suggest that Nice works for a range of networks including, but not limited to, a modem, a cable modem, a transatlantic link, and a fast WAN. In particular, it appears that Nice avoids interfering with other flows and that it may achieve throughputs that are significant fractions of the throughputs that would be achieved by Reno throughout the day.

A measurement client program connected to a measurement server program at exponentially distributed random intervals. At each connection time, the client chose one of six actions: Reno/NULL, Nice/NULL, Reno/Reno, Reno/Nice, Reno/Reno8, or Reno/Nice8. Each action consisted of a "primary transfer (denoted by the term left of the /) and zero or more "secondary transfers" (denoted by the term right of the /). Reno terms indicate flows using standard TCP-Reno congestion control. Nice terms indicate flows using Nice congestion control. For secondary transfers, NULL indicates actions that initiate no secondary transfers to compete with the primary transfer. An 8 at the end of the right term indicates actions that initiate eight (rather than the default one) secondary transfers. The transfers are of large files with sizes chosen to require approximately 10 seconds for a single Reno flow to compete on the network under study. In addition, during these actions and during periods of inactivity, clients pinged the server to measure latency for individual packet transfers.

A server that supported Nice was positioned at the University of Texas at Austin, in Austin, Tex. Clients were positioned as follows: (1) in Austin connected to the internet via a 56.6K dial in modem bank (modem), (2) in Austin connected via a commercial ISP cable modem (cable modem), (3) in a commercial hosting center in London, England connected to multiple backbones including an OC12 and an OC3 to New York (London), and (4) at the University of Delaware, which connects to the University of Texas via an Abilene OC3 (Delaware). All of the computers ran Linux. The server was a 450

MHz Pentium II with 256 MB of memory. The clients ranged from 450-1000 MHz and all had at least 256 MB of memory. Approximately 50 probes per client/workload pair were gathered.

FIGS. 14A, 14B, 14C and 14D summarize the results of the large-transfer experiments. In FIGS. 14A, 14B, 14C and 14D, each bar represents average transfer time observed for the specified combination of primary and secondary transfers. The narrow vertical lines represent the minimum and maximum values observed during multiple runs of each combination. On each of the networks, the throughput of Nice flows was a significant fraction of the total throughput, suggesting that periods of spare capacity are often long enough for Nice to detect and make use of them. During Reno/Nice and Reno/Nice8 actions, the primary (Reno) flow achieved similar throughput to the throughput seen during the control Reno/NULL sessions. In particular, on a modem network, when Reno flows competed with a single Nice flow, the Rcno flows received on average 97% of the average bandwidth received when there was no competing Nice flow. On a cable modem network, when Reno flows competed with eight Nice flows, the Reno flows received 97% of the bandwidth received when there where no competing flows. Conversely, Reno/Rcno and Rcno/Rcno8 showed the expected fair sharing of bandwidth among Reno flows, which reduced the bandwidth achieved by the primary flow.

FIGS. 15A, 15B, 15C, 15D show the hourly average bandwidth achieved by the primary flow for the different combinations listed above. The data indicate that Nice may achieve useful amounts of throughput throughout the day.

Many studies have published promising results that suggest that prefetching (also known as "pushing" data) content could significantly improve web cache hit rates by reducing compulsory and consistency misses. However, few such systems have been deployed.

Typically, prefetching algorithms are tuned with a threshold parameter to balance the potential benefits of prefetching data against the bandwidth costs of fetching the data and the storage costs of keeping the data until the data is used. In an embodiment, an object is prefetched if the estimated probability that the object will be referenced before it is modified exceeds a threshold. One study calculates reasonable thresholds given network costs, disk costs, and human waiting time values and concludes that most algorithms in the literature have been far too conservative in setting their thresholds. Furthermore, the estimated 80-100% per year improvements in network and disk capacity/cost mean that a value that is correct today may be off by an order of magnitude in 3-4 years.

In an embodiment, a system may include one or more servers which send demand data and prefetch data to one or more clients. In such an embodiment, demand data may be sent using a first congestion control protocol such as TCP Reno and prefetch data may be sent using a second congestion control protocol such as TCP Nice.

In an embodiment, a list of objects to be prefetched is generated and stored at the server. In such an embodiment, servers may piggyback lists of suggested objects in a new HTTP reply header when serving requests. In this embodiment, a list is generated using a prediction algorithm such as hand-generation by a user, Markov prediction, prediction by partial matching, or by another algorithm. Clients receiving a prediction list may discard old predictions and then issue prefetch requests for objects from the new list. This division of labor allows servers to use global information and application-specific knowledge to predict access patterns. The division of labor may also allow clients to filter requests through their caches to avoid repeatedly fetching an object. In some embodiments, servers generate prefetch lists and send the listed objects to the client without first sending the list to the client. In certain embodiments, clients generate a list of objects to prefetch and request those objects from the server. In some embodiments, a machine separate from the client and the server generates a prefetch list and sends this list to the client or the server.

In an embodiment, after a server stores a prefetch list, it transmits one or more elements from the list to the client using the prefetch congestion control algorithm (e.g., TCP-Nice). In one embodiment, elements are sent in order, with objects of higher benefit (e.g., higher likelihood of being referenced) sent before objects of lower benefit. In some embodiments, elements are sent in order with objects of high benefit/cost (e.g., high likelihood of being accessed and/or small size) sent before objects with low benefit/cost. In one embodiment, prefetch and demand data are transmitted on separate logical channels (e.g., separate TCP connections, with Reno congestion control for the demand connections and Nice congestion control for the prefetch connection). In certain embodiments, the same connection is used for both demand and prefetch traffic. In such embodiments, the congestion control algorithm may be set to Reno when demand packets are transmitted. The congestion control algorithm may be set to Nice when prefetch data packets are transmitted.

To evaluate prefetching performance, a standalone client may be used that reads a trace of HTTP requests, simulates a local cache, and issues demand and prefetch requests. For example, a client written in Java may pipeline requests across HTTP/1.1 persistent connections. To ensure that demand and prefetch requests use separate TCP connections, a server may direct prefetch requests to a different port than demand requests. A disadvantage of this approach is that it does not fit with the standard HTTP caching model. In an embodiment, a modified client may recognize that URLs with two different ports on the same server are the same. In another embodiment, an HTTP wrapper object may be fetched from a demand server where the wrapper object contains a reference to the corresponding URL on the prefetch server port so that when the demand object is selected for display, the prefetched object is displayed instead. In another embodiment, a Nice implementation may be modified to allow a server to switch a single connection between Reno and Nice congestion control. Several methods of deploying a perfecting system are described in more detail below.

An experiment was conducted in which predictions were generated at clients (using knowledge from the trace to simulate server knowledge) rather than sending predictions across the network. This simplification allowed the use of an unmodified Apache server. The modification slightly reduced network traffic for prefetching, but the impact on overall performance was believed to be small. If servers have large prediction lists to send to clients, they may send small numbers of predictions in the headers of demand replies and "chain" the rest of the predictions in headers of prefetch replies.

A Squid proxy trace from 9 regional proxies was collected during January 2001. Each trace record included the URL, the anonymized client IP address, and the time of the request. The network interference near the server was studied by examining subsets of the trace corresponding to popular groups of related servers. For example, a series of cnn servers (e.g., cnn.com, www.cnn.com, cnnfn.com, etc.) was used.

The network interference study compared relative performance for different resource management methods for a given set of prefetching methods. The study did not try to identify an optimal prefetching method. Several suitable prefetching algorithms are known to those familiar with the art (e.g., Markov, prediction by partial matching or hand-generation). Nor did the study attempt to precisely quantify the absolute improvements available from prefetching. A simple prediction by partial matching (PPM) algorithm, PPM-n/w, that uses a client's n most recent requests to the server group for non-image data to predict cacheable (e.g., non-dynamically generated) URLs that will appear during a subsequent window that ends after the wth non-image request to the server group was used. This algorithm is limited because it uses neither link topology information nor server specific semantic knowledge. For simplicity, it was assumed that all non-dynamically generated data (e.g., data not including a suffix indicating that a program was executed) were cacheable and unchanging for the 1-hour duration of the experiments. Also, to allow variation in demand, the trace was broken into per-client, per-hour sections. Each section was treated as coming from a different client during the same simulated hour. Since prefetching methods and server workloads are likely to vary widely, these assumptions may yield a simple system that falls within the range of prediction effectiveness that a simple service might experience.

A conservative variation of the PPM-n/w algorithm was used with parameters similar to those found in the literature for HTTP prefetching. The algorithm used n=2, w=5 and set the prefetch threshold to 0.25. To prevent prefetch requests from interfering with demand requests, requests are issued at least 1 second after a demand reply is received. In addition, an aggressive variation of the PPM-n/w algorithm was used with parameters set at n=2, w=10. This variation truncates prefetch proposal lists with a threshold probability of 0.00001. Prefetch requests are issued immediately after receipt.

Two client machines were connected to a server machine via a cable modem. Eight virtual clients were run on each client machine. Each client had a separate cache and separate HTTP/1.1 demand and prefetch connections to the server. For the demand traffic to consume about 10% of the cable modem bandwidth, the six busiest hours from the trace were selected and divided among trace clients each hour randomly across four of the virtual clients. In each of the seven trials, all the 16 virtual clients ran the same prefetching method (i.e., none, conservative-Reno, aggressive-Reno, conservative-Nice, or aggressive-Nice).

Figure 16:
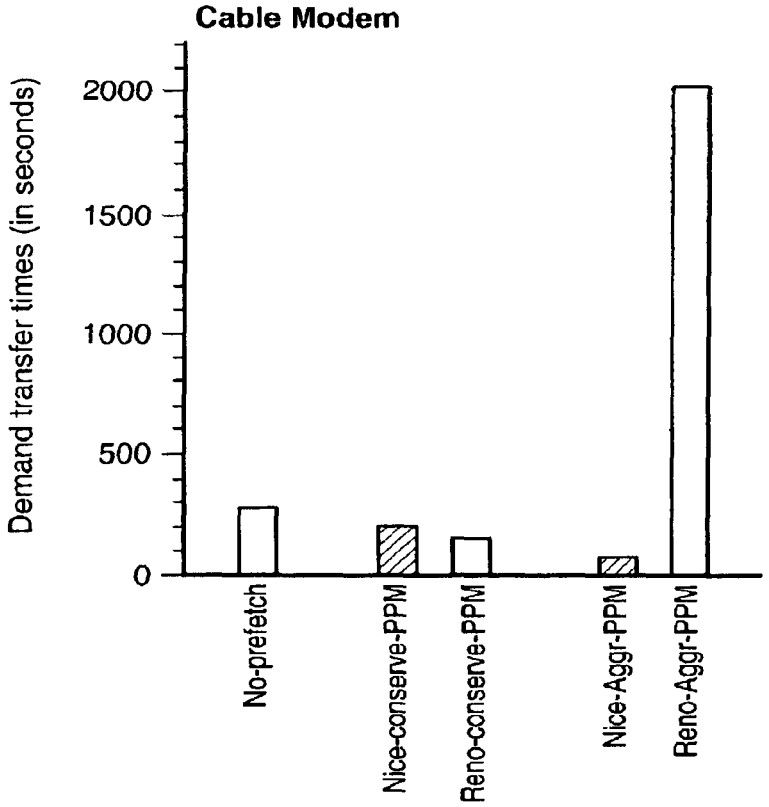
FIG. 16 depicts experimental results showing average response time for various methods from a particular server group.

FIG. 16 shows the average cumulative demand transfer times perceived by the clients for all the files fetched on demand from the CNN server. In FIG. 16, when clients did conservative prefetching using either protocol (Nice or Reno) the latency reductions were comparable. When aggressive prefetching using Reno was initiated, however, the latency increased by an order of magnitude. Clients using aggressive Nice prefetching continued to see further latency reductions. FIG. 16 shows that Nice may effectively utilize spare bandwidth for prefetching without affecting demand requests.

Figure 17:
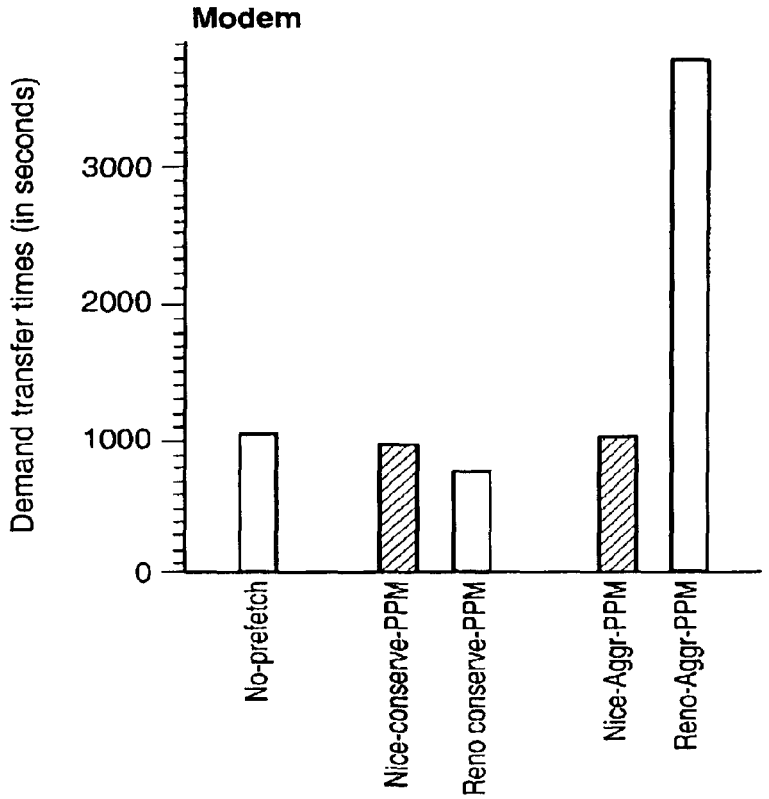
FIG. 17 depicts experimental results showing average response time for various methods from a particular server group.

FIG. 17 represents the effect of prefetching over a modem. The setup was the same as previously described with reference to FIG. 16 with the cable modem replaced by a modem (i.e., less spare bandwidth was available). FIG. 17 shows that while the Reno and Nice protocols were comparable in benefits during conservative prefetching, aggressive prefetching using Reno hurt the clients significantly by increasing the latencies three-fold. The latency was not increased with Nice.

A model of the Tivoli Data Exchange system was studied for replicating data across large numbers of hosts. This system distributes data and programs across thousands of client machines using a hierarchy of replication servers. Both non-interference and good throughput are believed to be important metrics for such a system. In particular, data transfers should not interfere with interactive use of target machines. Transfers may be large, and time may be critical. Additionally, transfers may go to a large number of clients using a modest number of simultaneous connections. Thus, each data transfer should be completed as quickly as possible. For example, after Congress makes last minute changes to tax laws, the IRS must rapidly distribute new documentation to auditors. The system must cope with complex topologies including thousands of clients, LAN/WAN/modem links, and mobile clients whose bandwidths may change drastically over time. The system typically uses two parameters at each replication server to tune the balance between non-interference and throughput. One parameter throttles the maximum rate that the server will send data to a single client. The other parameter throttles the maximum total rate (across all clients) that data is sent.

Choosing rate limiting parameters may require some knowledge of network topology. In selecting rate limiting parameter values, a trade-off may be required between overwhelming slow clients and slowing fast clients (e.g., distributing a 300 MB Office application suite would take nearly a day if throttled to use less than half a 56.6 Kb/s modem). A more complex system may allow a maximum bandwidth to be specified on a per-client basis, but such a system may be prohibitively complex to configure and maintain.

Nice may provide an attractive self-tuning abstraction. Using Nice, a sender may send at the maximum speed allowed by the connection. Results below are for a standalone server and client.

The servers and clients were the same were used in the Internet measurements previously described. The servers and clients ran simple programs that transferred data in patterns to model data transfer in the Tivoli system. Large transfers were initiated from the server. During each transfer, the ping round trip time between the client and the server was measured. When running Reno, the client throttle parameter was varied. The total server bandwidth limit was set to an effectively infinite value. When running Nice, both the client and server bandwidth limits were set to effectively infinite values.

Figure 18:
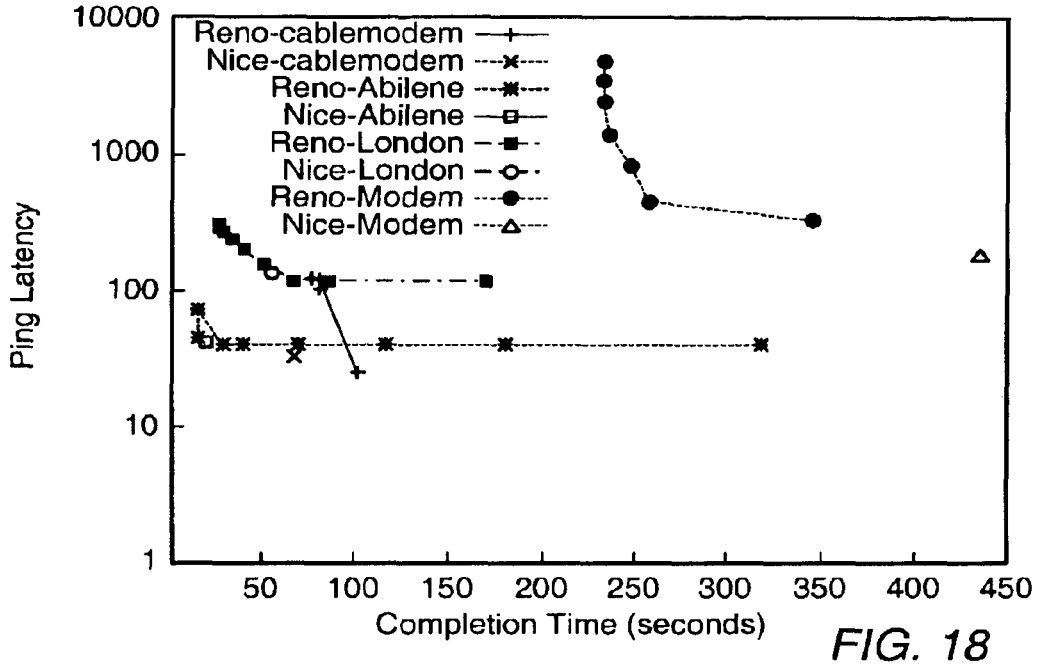
FIG. 18 depicts experimental results showing ideal send rates in a model of a Tivoli system selected using a Nice method.

FIG. 18 shows a plot of ping latencies (representative of interference) as a function of the completion time of transfers to clients over different networks. With Reno, completion times decreased with increasing throttle rates, but ping latencies increased. In contrast, Nice picked good sending rates without the need for any manual tuning, and ping latencies were low.

In some embodiments, variations of Nice may be deployed which allow different background flows to be more or less aggressive compared to one another while remaining timid with respect to competing foreground flows.

Prioritizing packet flows may be easier with router support. Certain router prioritization queues, such as those proposed for DiffServe service differentiation architectures, are capable of completely isolating foreground flows from background flows while allowing background flows to consume nearly the entire available spare bandwidth. Unfortunately, these solutions are of limited use for someone trying to deploy a background replication service today because few applications are deployed solely in environments where router prioritization is installed or activated. Embodiments presented herein demonstrate that an end-to-end strategy need not rely on router support to make use of available network bandwidth without interfering with foreground flows.

Router support may also be used to relay network congestion information to end-points. Examples of this approach include random early detection (RED), explicit congestion notification (ECN) and Packeteer's rate controlling scheme based on acknowledgement streaming. These systems raise issues in the context of Nice. For example, by supplying better congestion information, routers may improve the performance of protocols like Nice.

Applications may limit the network interference they cause in various ways. For example:

Coarse-grain scheduling (e.g., diurnal patterns): Background transfers may be scheduled during hours where there is little foreground traffic. For example, network backup is commonly scheduled for early mornings. Studies have observed appreciable savings in latency by performing updates of prefetched data during the nighttime alone. Other studies have discussed bandwidth smoothing techniques by selectively distributing traffic across the course of a day.

Rate limiting: Senders can pace the rate at which bytes are sent with simple logic, and receivers can limit senders by limiting their maximum advertised TCP receive window. For example, some have proposed window-based rate controlling approaches for prefetching data. Overall latency may be improved using this approach, and the traffic shaping may lead to less bursty traffic and smaller queue lengths. The rate-controlling approach spreads prefetched data in the time interval between the end of one request and the beginning of the next request. For example, the Tivoli Data Exchange system limits per-destination and total bandwidth consumption by each distribution server.

Application tuning: Applications may limit the amount of data sent by varying application-level parameters. For example, many prefetching algorithms estimate a probability of an object being referenced and only prefetch the object if the probability exceeds a threshold.

Self-tuning support for background replication may have a number of advantages over existing application-level approaches (e.g., Nice may operate over fine time scales). Thus, self-tuning support for background replication may provide reduced interference (by reacting to spikes in load) as well as higher average throughput (by using a large fraction of spare bandwidth) than static hand-tuned parameters. This property may reduce the risk and increase the benefits available to background replication while simplifying design. Additionally, Nice may provide useful bandwidth throughout the day in many environments.

In an embodiment, a non-intrusive web prefetching system may avoid interference between prefetch and demand requests at the server as well as in the network by utilizing only spare resources. Additionally, in certain embodiments, such a system may be deployable without any modifications to the browsers, the HTTP protocol and/or the network.

Despite the potential benefits, prefetching systems have not been widely deployed because of at least two concerns: interference and deployability. First, if a prefetching system is too aggressive, it may interfere with demand requests to the same service (self-to interference) or to other services (cross-interference) and hurt overall system performance. Second, if a system requires modifications to the existing HTTP protocol, it may be impractical to deploy. For example, the large number of deployed clients makes it difficult to change clients, and the increasing complexity of servers makes it difficult to change servers.

Embodiments disclosed herein provide a prefetching system that: (1) causes little or no interference with demand flows by effectively utilizing only spare resources on the servers and the network; and (2) is deployable with no modifications to the HTTP protocol and/or the existing infrastructure. To avoid interference, the system may monitor the server load externally and tune the prefetch aggressiveness of the clients accordingly. Such a system may utilize TCP-Nice. Additionally, in certain embodiments, the system may utilize a set of heuristics to control the resource usage on the clients. To work with existing infrastructure, the system may be implemented by modifying html pages to include JavaScript code that issues prefetch requests and by augmenting the server infrastructure with several simple modules that require no knowledge of or modifications to the existing servers.

Additionally, certain embodiments include a self-tuning architecture for prefetching that eliminates the traditional "threshold" magic number that is often used to limit the interference of prefetching on demand requests. In such embodiments, the architecture separates prefetching into two different tasks: (i) prediction and (ii) resource management. The predictor may propose prioritized lists of high-value documents to prefetch. The resource manager may decide how many of those documents can be prefetched and schedule the prefetch requests to avoid interference with demand requests and other applications. Separating prefetching into prediction and resource management may have a number of advantages. First, it may simplify deployment and operation of prefetching systems by eliminating the need to select an appropriate threshold for an environment and update the threshold as conditions change. Second, it may reduce the to interference caused by prefetching by throttling aggressiveness during periods of high demand load. Third, it may increase the benefits of prefetching by prefetching more aggressively than would otherwise be safe during periods of low and moderate load.

In certain embodiments, a prefetching system may be deployed that substantially ignores the problem of interference. Such embodiments may be augmented relatively easily to avoid server interference. Extending such a system to also avoid network interference may be more involved. However, doing so appears feasible even under the constraint of not modifying current infrastructure. At the client, additional interference may be taken to include prefetch data displacing more valuable data (e.g., demand data). This issue may be mitigated using several methods discussed herein.

It may be desirable for services that prefetch to balance the benefits they get against the risk of interference. Interference may include, but is not limited to: self-interference, in which a prefetching service hurts its own performance by interfering with its demand requests; cross-interference, in which the service hurts the performance of other applications on the prefetching client, other clients; or both.

Interference may occur at one or more resources in the system. For example:

Server: Prefetching may consume extra resources on the server such as CPU time, memory space and disk I/Os.

Network: Prefetching may cause extra data packets to be transmitted over the Internet and hence may consume network bandwidth, potentially increasing router queue delays and network congestion.

Client: Prefetching may lead to extra resource requirements even at the client. CPU, memory, and disk usage on clients may increase depending on how aggressively the client prefetches. A client browser's memory and disk caches may be polluted by aggressive prefetching.

A common way of achieving balance between the benefits and costs of prefetching is to select a threshold probability and fetch objects whose estimated probability of use before the object is modified or evicted from the cache exceeds that threshold. There are at least two concerns with such "magic-number" based approaches. First, it may be difficult for even an expert to set thresholds to optimum values to balance costs and benefits. Although the thresholds may relate closely to the benefits of prefetching, they have little obvious relationship to the costs of prefetching. Second, appropriate thresholds to balance costs and benefits may vary over time as client, network and server load conditions change over seconds. For example, the costs and/or benefits of prefetching may change over a matter of seconds (e.g., due to changing workloads or network congestion), hours (e.g., due to diurnal patterns), and/or months (e.g., due to technology trends).

In an embodiment, a self-tuning resource management layer that inhibits prefetching from interfering with demand requests may be desirable to solve or mitigate the concerns described above. Such an embodiment may simplify the design of prefetching systems by separating the tasks of prediction and resource management. In such an embodiment, at any given time, prediction algorithms may specify arbitrarily long lists of the most beneficial objects to prefetch. The resource management layer may issue requests for these objects in a manner that inhibits interference with demand requests or other system activities. In addition to simplifying system design, such an embodiment may have performance advantages over static prefetch thresholds. First, such a system may reduce interference by reducing prefetching aggressiveness when resources are scarce. Second, such a system may increase the benefits of prefetching when resources are plentiful by allowing more aggressive prefetching than would otherwise be possible.

Some proposed prefetching mechanisms suggest modifying the HTTP/1.1 protocol to create a new request type for prefetching. An advantage of extending the protocol may be that clients, proxies, and servers could then distinguish prefetch requests from demand requests and potentially schedule them separately to prevent prefetch requests from interfering with demand requests. However, such mechanisms may not be easily deployable because modifying the protocol may require modifying the widely deployed infrastructure that supports the current protocol. Furthermore, as web servers evolve and increase in their complexity by spanning multiple machines, content delivery networks (CDNs), database servers, dynamic content generation subsystems, etc., modifying CPU, memory, and disk scheduling to separate prefetch requests may become increasingly complex.

In an embodiment, a client browser may match requests to documents in the browsers' caches based on (among other parameters) the server name and the file name of the object on the server. Thus, files of the same name served by two different server names may be considered different. Additionally, browsers may multiplex multiple client requests to a given server on one or more persistent connections.

Figure 19A:
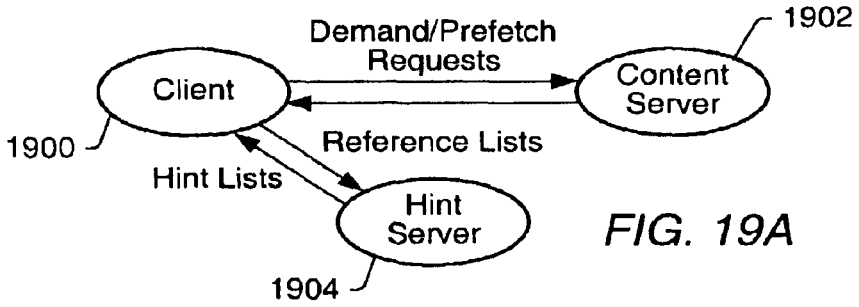
FIG. 19A depicts an embodiment of a one-connection architecture for a prefetching system.
Figure 19B:
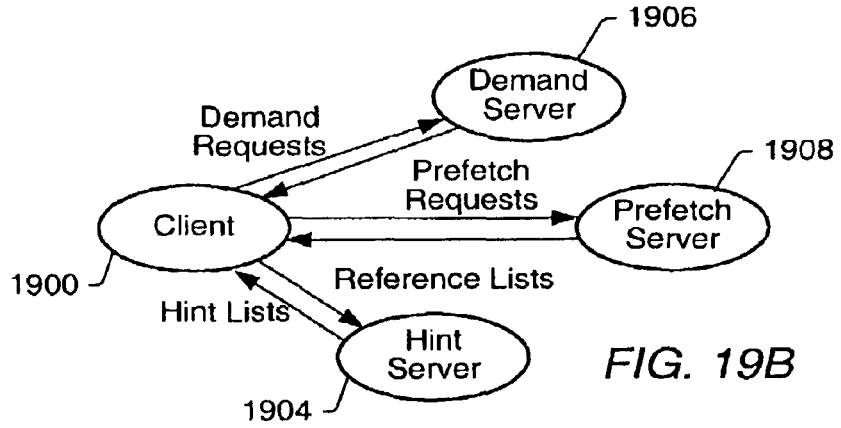
FIG. 19B depicts an embodiment of a two-connection architecture for a prefetching system.

In certain embodiments, as depicted in FIGS. 19A and 19B, clients may receive a list of documents to prefetch from a Hint Server. As used herein, a list of documents recommended for prefetching may be referred to as a "hint list." Clients may send their access histories to the hint server. The hint server may use either online or offline prediction algorithms to compute hint lists consisting of probable documents that clients may request in the future. Note that in some embodiments the hint server is logically separate from the content server, demand server, or prefetch server but is physically located on the same machine. In other embodiments, the hint server executes on a separate machine.

FIG. 19A depicts an embodiment of a one-connection system architecture. In a one-connection architecture, client 1900 may fetch both demand and prefetch requests from the same content server 1902. Files to prefetch may be identified by hint server 1904. Since browsers may multiplex requests over established connections to the servers, and since current browsers typically do not differentiate between demand and prefetch requests, each TCP connection may have interleaved prefetch and demand requests and responses. In some embodiments, browsers may distinguish between demand and prefetch requests and send prefetch requests and demand requests on different network connections between the content server and the client.

Sharing connections may allow prefetch requests to interfere with demand requests for network and server resources. If interference can be avoided, this system architecture may be easily deployable. In particular, objects fetched from the same server share the domain name of the server. Therefore, unmodified client browsers may be able use cached prefetched objects to service demand requests.

FIG. 19B depicts an embodiment of a two-connection system architecture. In the two-connection architecture, client 1900 fetches demand and prefetch requests from different servers (e.g., content server 1906 and prefetch server 1908). This architecture thus segregates demand and prefetch requests on separate network connections. The two-connection architecture may allow the demand and prefetch servers to be hosted either on different machines or on the same one. For example, two application servers listening on different TCP ports may be hosted on a single machine.

Although, the two-connection architecture may provide additional options for reducing interference, the two-connection architecture appears to be more complicated to deploy than the one-connection architecture. For example, objects with the same names fetched from the different servers may be considered different by the browsers. Therefore, some browsers may not correctly use the prefetched objects to service demand requests. In one embodiment, this challenge may be addressed by modifying the client to allow an object in the cache that was fetched from a prefetch server to satisfy demand requests for the same object fetched from a demand server. In another embodiment, this challenge may be addressed by providing a "wrapper" object from the demand server that refers to an object from the prefetch server such that when the wrapper object is selected for display, the prefetched object is displayed.

Either a one-connection or a two-connection architecture may be more desirable depending on the circumstances. For example, if server load is a primary concern and network load is known not to be a major issue, then the one-connection architecture may be simpler to implement than the two-connection architecture. For example, if the browser can be modified to separate prefetch and demand requests on different connections, then the one connection architecture may be simple and effective. For example, if the HTTP protocol is modified to allow out-of order delivery of requested objects then a single connection could be used for both demand and prefetch requests with demand requests not waiting behind prefetch requests and with Nice congestion control used when prefetch requests are being served on the connection. The two-connection architecture, however, may manage both network and server interference without modifying current browsers or servers.

Figure 20A:
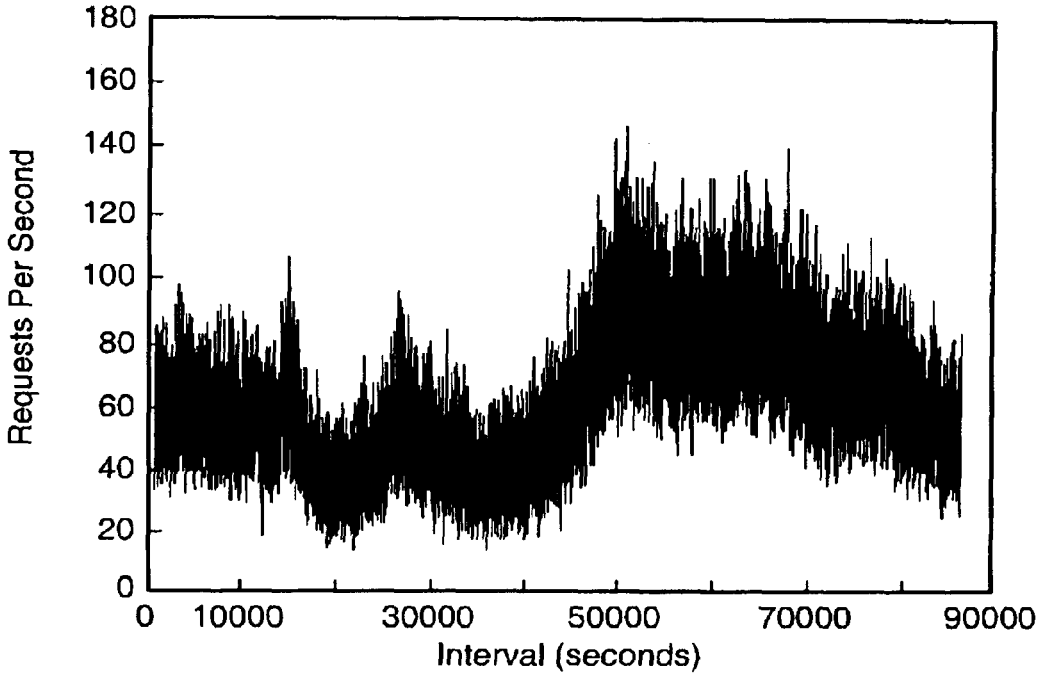
FIGS. 20A and 20B depict the request load on a sampled server averaged over 1-second and 1-minute intervals, respectively.
Figure 20B:
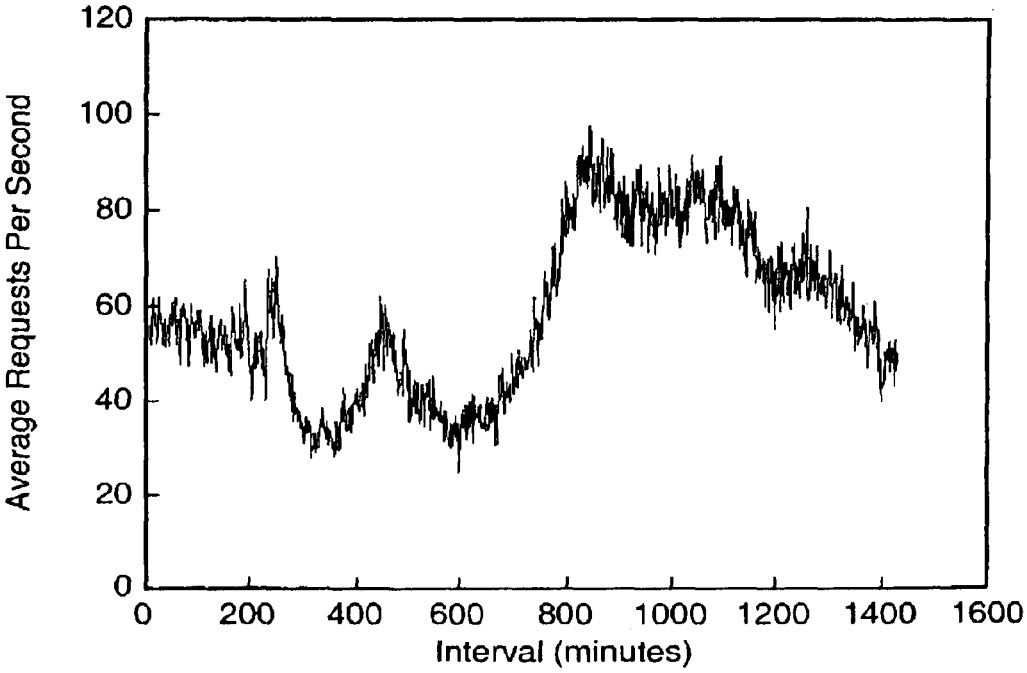

It is believed that an ideal system for avoiding server interference would cause no delay to demand requests in the system and would utilize significant amounts of any spare resources on servers for prefetching. The system would cope with and take advantage of changing workload patterns over various timescales. HTTP request traffic arriving at a server is often bursty. The burstiness may be observable at several scales of observation. Peak rates may exceed the average rate by factors of 8 to 10. For example, FIGS. 20A and 20B show the request load on an IBM server hosting a major sporting event during 1998 averaged over 1-second and 1-minute intervals, respectively. Although such burstiness favors prefetching when the servers are not loaded (e.g., to make use of the spare resources), the prefetching system should gracefully back off when the demand load on the servers increases. As used herein, the prefetch aggressiveness of a prefetching scheme may be referred to as the "pfrate." The pfrate represents the number of files to prefetched for each demand file served.

In various embodiments, several methods may be used to inhibit prefetching from interfering with demand requests at servers. For example, such methods may include, but are not limited to, local scheduling, a separate prefetch infrastructure, and end-to-end monitoring.

Local server scheduling may help in the use of the spare capacity of existing infrastructures for prefetching. In principle, existing schedulers for CPUs, memories, etc. may prevent low-priority prefetch requests from interfering with high-priority demand requests. Since these schedulers are intimately tied to the operating system, they may be efficient in utilizing spare capacity for prefetch requests even over fine time scales. Local scheduling may be applicable to either one-connection or two-connection architecture.

For certain services, server scheduling may not be easily deployable for at least two reasons. First, although several available operating systems support CPU schedulers that can provide strict priority scheduling, few provide memory/cache or disk schedulers that isolate prefetch requests from demand requests. Second, even if an operating system provides the needed support, existing servers may require modification to associate prefetch and demand requests with scheduling priorities as they are serviced.

A method of avoiding server interference may include using separate servers to serve prefetch and demand requests to achieve complete isolation of prefetch and demand flows. In an embodiment, such a system may be used as a third-party "prefetch distribution network" to supply geographically distributed prefetch servers in a manner analogous to existing content distribution networks.

End-to-end monitoring periodically measures the response time of servers and adjusts the pfrate accordingly. For example, the pfrate may be increased when measured response time is low (indicating that the serves have spare capacity). Pfrate may be decreased when the measured response time is high (indicating that the servers are heavily loaded). In certain embodiments, end-to-end monitoring may be implemented without making changes to existing servers. End-to-end monitoring may be used in either one-connection or two-connection architecture. End-to-end monitoring may provide less precise scheduling than local schedulers that have access to the internal state of servers and operating systems. A particular concern is whether such an approach can be configured to react to changing loads at fine timescales. An embodiment of an end-to-end monitoring system is disclosed herein. The efficacy of the end-to-end monitoring system is evaluated in comparison to server scheduling.

Figure 21:
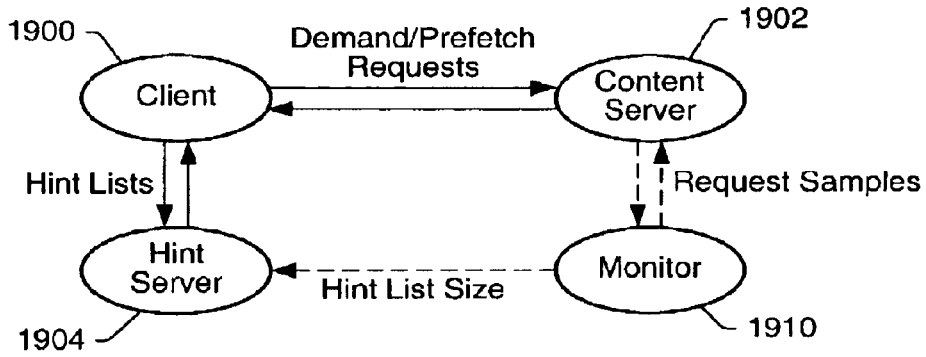
FIG. 21 depicts an embodiment of a monitored prefetching system.

FIG. 21 illustrates an embodiment of a monitor controlled prefetching system. In this embodiment, monitor 1910 controls the size of the hint lists given out by the hint server 1904 based on the server load. In an embodiment, monitor 1910 sends probe packets to server 1902 at random times and measures the response times perceived by the probe packets. In an embodiment, the probe packets are regular HTTP requests to representative objects on server 1902. One concern with using probe packets may be determining an appropriate rate at which probing is done. High rates may make the monitor more reactive to server load, but also add extra load on server 1902. On the other hand, low probe rates may make the monitor slow in reacting, and thus affect demand requests. In an embodiment, the probe rate is selected to balance these concerns.

In an embodiment, if a probe packet indicates response times exceeding a first threshold, the pfrate is reduced. Similarly, if the response times are under a second threshold, the pfrate is increased. To implement such an embodiment, appropriate thresholds should be selected. Different thresholds may be used for different probe objects so that different paths can be probed through server 1902. Additionally, increment/decrement rates (e.g., how much the pfrate is changed for various response times) should balance the risk of causing interference against the risk of not using available spare capacity. In an embodiment, multiplicative decrease (e.g., reducing the pfrate by ½ when congestion is detected) and additive increase (e.g., increasing the prefetch rate by one unit when congestion is not detected) is used. For stability, the system may limit the rate at which pfrate is adjusted so that the effects of previous adjustments are observed before new adjustments are made. In an embodiment, the pfrate is adjusted at most once per average round trip request time.

In an embodiment, a monitoring system may be configured to collect five response-time samples spaced randomly between about 100 and 120 milliseconds. In such an embodiment, if all the five samples lie below a threshold, the hint list size may be incremented. If any sample exceeds the threshold, the hint list size may be reduced by one. Additionally, the sample count may be reset so that a new set of five samples is collected.

A challenge in studying web services may be that prefetch demands, prefetching strategy and/or prefetching effectiveness of the web services may vary widely. As a result, it may not be practical to simulate application-specific prefetching and adaptation. To enable evaluation of a prefetching system, prefetch prediction policies may be ignored. Rather, prefetch systems may be evaluated while prefetching sets of dummy data from arbitrary URLs at the server. The goal of such experiments may be to compare the effectiveness of different resource management alternatives in avoiding server interference with the ideal case (e.g., when no prefetching is done). Resource management alternatives may be compared with respect to metrics including, but not limited to: (i) cost (e.g., the amount of interference in terms of demand response times), and (ii) benefit (e.g., the amount of bandwidth utilized for prefetching).

A number of different systems were considered in the experiments described herein. The systems included: an ideal case, no-avoidance cases, a prefetching with monitor control case, and a local scheduling case. The ideal case refers to a system wherein no prefetching is done or a separate infrastructure is used for prefetching. The no-avoidance cases refer to prefetching with no interference avoidance. In the studied no-avoidance cases, the pfrate was assigned a constant value of either 1 or 5. Prefetching with monitor control refers to a case in which the pfrate was allowed to vary from zero to a high maximum value (e.g., 100). The pfrate was varied based on monitored response times. Local scheduling refers to using a simple server scheduling policy. For example, in the experiments, the unix nice utility was used as the scheduling utility. Two different http servers on one machine were used. One server ran at a lower priority (+19) to handle prefetch requests. The other server ran at a normal priority to handle demand requests. This implementation of server scheduling was intended as a comparison for monitoring schemes. It is believed that more sophisticated local schedulers may closely approximate the ideal case.

For experimentally evaluating the first three systems (i.e., the ideal case, the no-avoidance cases, and the prefetching with monitor control case), one server was set up to serve both demand and prefetch requests. However, it is noted that these systems may be used in either one-connection or two-connection architecture. To evaluate the last system (i.e., the local scheduling case), two different servers were configured to serve demand and prefetch requests, respectively. However, it is noted that in certain embodiments, the general approach of local scheduling could be applied to one-connection architecture as well.

Two different workloads were used in the experiments. The first workload generated demand requests to the server at a constant rate. The second workload was a one hour subset of the IBM sporting event server trace discussed with reference to FIGS. 20A and 20B. The trace was scaled up in time by a factor of two. Thus, requests were generated at twice the rate of the original trace.

The experimental setup included the Apache HTTP server running on a machine including a 450 MHz Pentium II processor and 128 MB of memory. The client load was generated using httperf running on four different Pentium III 930 MHz machines. Each of the machines used the Linux operating system.

Figure 22:
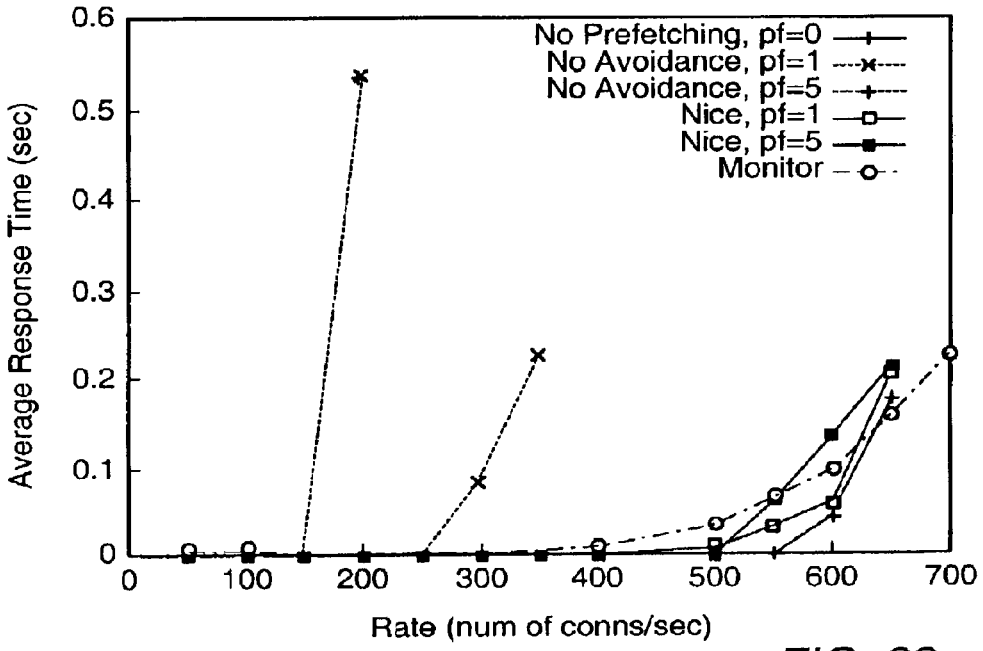
FIG. 22 depicts a graph of experimental results showing demand response times with varying request arrival rates for several cases.

FIG. 22 shows the demand response times with varying request arrival rates. As shown in FIG. 22, both the monitor case and the Nice cases closely approximated the behavior of the ideal case in not affecting the demand response times. However, the no-avoidance cases with fixed pfrate values significantly damaged both the demand response times and the maximum demand throughput.

Figure 23:
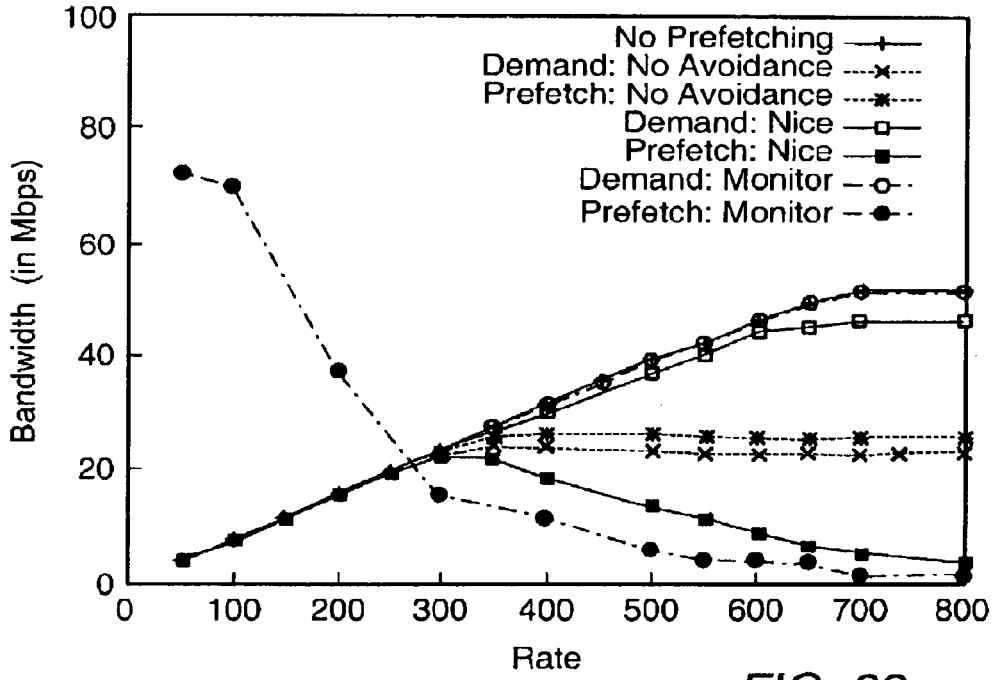
FIG. 23 depicts a graph of experimental results showing prefetch and demand bandwidths at various demand request rates for a pfrate of 1.
Figure 24:
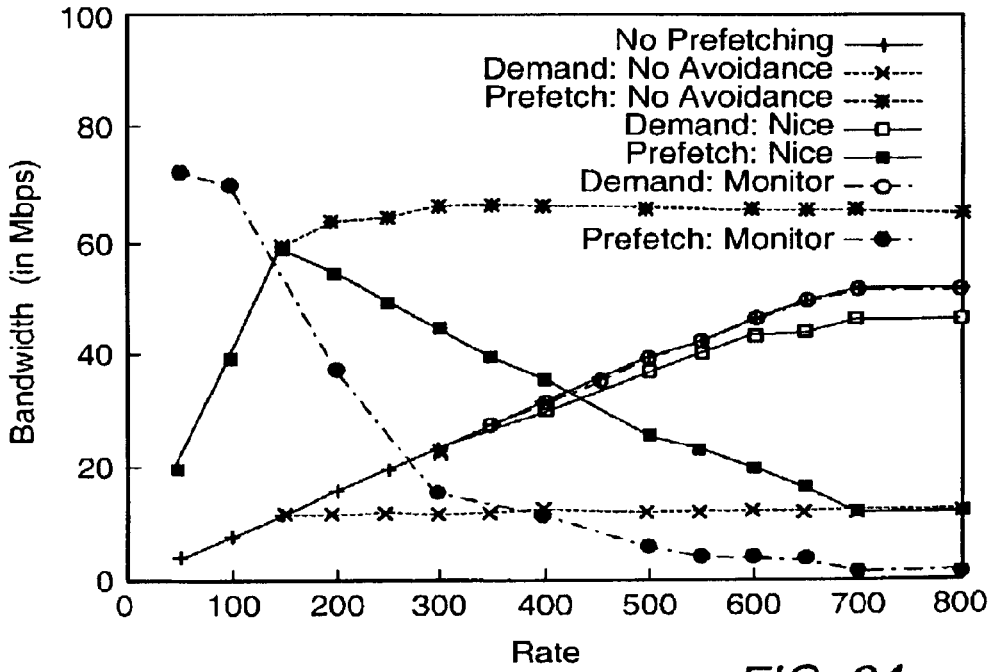
FIG. 24 depicts a graph of experimental results showing prefetch and demand bandwidths at various demand request rates for a pfrate of 5.

FIGS. 23 and 24 show the bandwidth achieved by prefetch requests and their effect on the demand bandwidth with varying demand request rate. For different values of pfrate, the no-avoidance case may adversely affect the demand bandwidth. However, both the Nice and monitor schemes reap significant bandwidth without large decreases in the demand bandwidth. Further, at higher request rates, monitor outperforms Nice by conservatively setting the pfrate to very low values (almost zero). In the experimental setup, Nice could not meet expected performance because the Linux scheduler only prioritizes processes on a coarse granularity. Even with the lowest possible priority values for prefetch requests, the CPU time allotted for demand requests can not be more than forty times the CPU time allotted for prefetch requests (with Nice values of −20 and +19 for demand and prefetch processes, respectively). Difficulties encountered as a result of course granularity may be avoided by using more sophisticated CPU schedulers.

Figure 25:
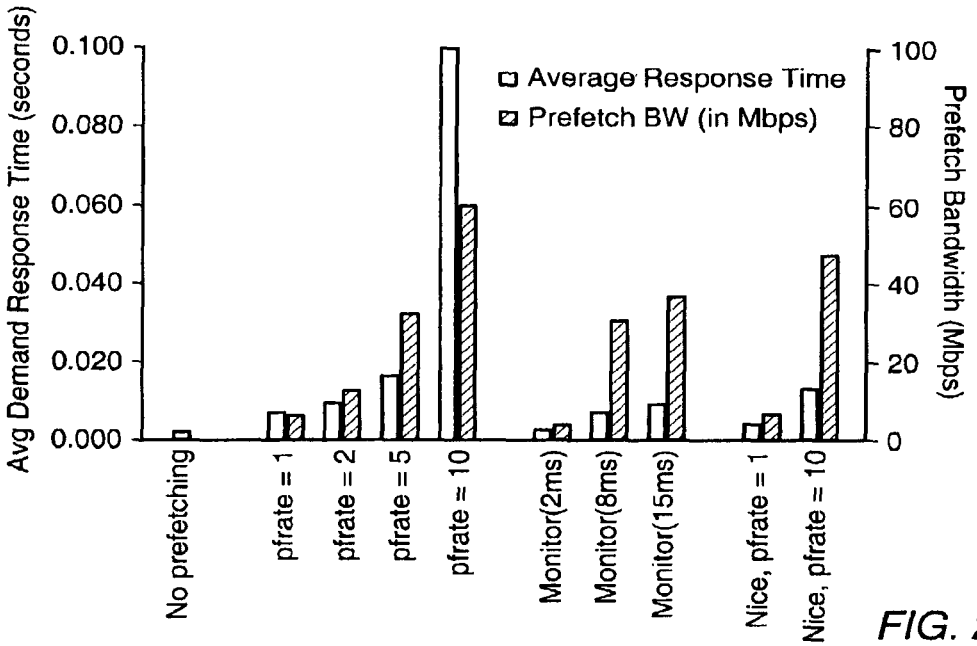
FIG. 25 depicts a graph of experimental results showing average demand response time and prefetch bandwidth for several cases.

Results of experiments utilizing the IBM sporting event server workload are shown in FIG. 25. In FIG. 25, the bars for pfrate 1, 2, 5 and 10 correspond to results for the no-avoidance case with the pfrate set according to 1, 2, 5 and 10, respectively. For the monitor case, the performance results are shown for various threshold values (e.g., 2 ms, 8 ms and 15 ms). For the Nice case, the performance results are shown for pfrate settings of 1 and 10.

FIG. 25 shows that the no-avoidance scheme may be sensitive to the fixed value of pfrate. At lower values of pfrate, the no-avoidance scheme may prefetch too little. As the pfrate increases, the no-avoidance scheme may achieve more prefetch bandwidth but may also start interfering with demand requests. If pfrate is fixed at a high value, then the demand response time interference may rise sharply. The monitor scheme appears to be somewhat sensitive to the threshold value. However, the monitor scheme seems to have a range of acceptable threshold values. Compared to the no-avoidance scheme, the monitoring scheme achieved more prefetch bandwidth for a given response time cost. The Nice scheme also outperformed the no-avoidance method.

Figure 26A:
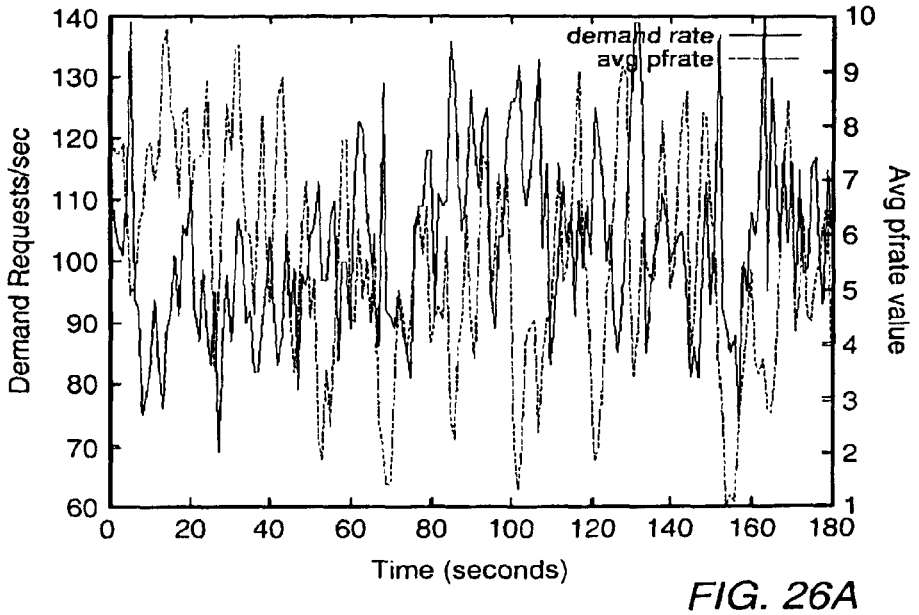
FIGS. 26A and 26B depict experimental results showing demand rate and pfrate on a monitored server averaged over 1-second and 1-minute intervals, respectively.
Figure 26B:
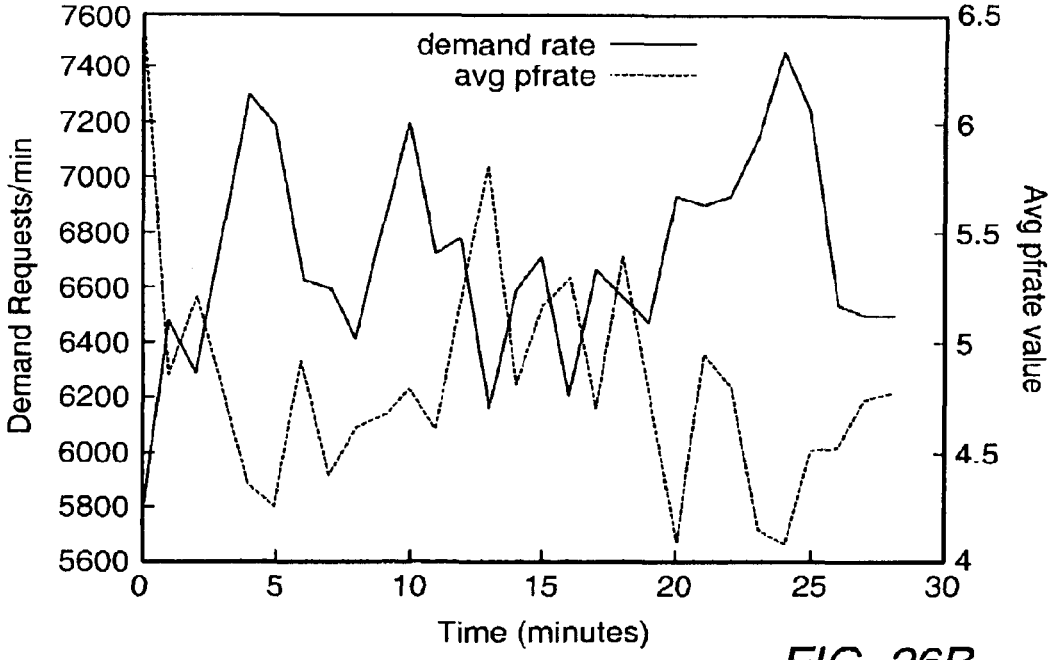

FIGS. 26A and 26B illustrate the capability of the monitor to adapt in a timely manner to changes in server load. A selected run of the monitor on the trace is displayed. The monitor has a threshold setting of 8 ms. FIG. 26A depicts one second averages of the pfrate settings by the monitor against the changes in the demand load pattern for the first three minutes of the workload. FIG. 26B depicts one minute averages of the pfrate settings by the monitor against the changes in the demand load pattern for the entire workload. FIGS. 26A and 26B illustrate the ability of the monitor in controlling the pfrate. For example, note that even though the average pfrate setting established by the monitor in this case is 4.79, the monitor outperforms the no-avoidance scheme with a fixed pfrate value of 5 in both response time and prefetch bandwidth (as shown in FIG. 25).

Mechanisms to avoid network interference may be deployed on clients, intermediate routers and/or servers. For example, clients may reduce the rate at which they receive data from the servers using TCP control mechanisms. How to set the parameters of such TCP control mechanisms or how to deploy them given existing infrastructure is not clear. Router prioritization may avoid interference effectively, since routers have more information of the state of the network. Router prioritization, however, may not be easily deployable in the foreseeable future. In an embodiment, server based network interference avoidance methods may be used. For example, TCP-Nice may be used. As previously described, experimental evidence under a range of conditions and workloads indicates that Nice may cause little or no network interference related to prefetch. Additionally, Nice may utilize a large fraction of the spare capacity in the network.

Nice may be deployed in two-connection architecture without modifying the internals of servers by configuring systems to use Nice for all connections made to/from the prefetch server. A prototype of Nice currently runs on Linux and porting Nice to other operating systems may be straightforward. In other embodiments, Nice may be used in non-Linux environments by putting a Linux machine running Nice in front of the prefetch server and configuring the Linux machine to serve as a reverse proxy or a gateway. In other embodiments, Nice may be used in a non-Linux environment by porting Nice to the other operating system. In other embodiments, Nice may be used in a non-Linux environment by implementing Nice at user level.

In an embodiment, Nice may also be deployed in one-connection architecture. For example, the Nice implementation may allow a connection's congestion control algorithm to switch between standard TCP (e.g., Reno) (when serving demand requests) and Nice (when serving prefetch requests). In providing such an implementation, care may be taken to ensure that switching modes does not cause packets already queued in the TCP socket buffer to inherit the new mode. For example, ensuring that packets are sent out in the appropriate modes may require an extension to Nice and coordination between the application and the Nice implementation. Additionally, care may be taken to ensure that demand requests do not become queued behind prefetch requests, thereby causing demand requests to perceive increased latencies. Demand request queuing may result from the standard HTTP/1.1 pipelining procedure which causes replies to be sent in the order requests were received. One way to avoid interference may be to quash all the prefetch requests queued in front of the demand request. For example, an error message (e.g., with HTTP response code 204 indicating no content) with a short lifetime may be sent as a response to the quashed prefetch requests. Additionally, servers may be modified to tell the TCP layer when to use standard TCP and when to use Nice. There have also been proposals in the literature to extend the HTTP protocol to allow replies to be sent in an order different than requests.

Prefetching may interfere with client performance in at least two ways. First, processing prefetch requests may consume CPU cycles and, for instance, delay rendering of demand pages. Second, prefetched data may displace demand data from the client cache and thus hurt demand hit rates for the prefetching service or other services.

As with the server interference issues discussed above, in certain embodiments, client CPU interference may be mitigated by modifying the client browser (and, perhaps, the client operating system) to use a local CPU scheduler to ensure that prefetch processing never interferes with demand processing. In some embodiments, client CPU interference may be mitigated by ensuring that prefetch processing does not begin until after the loading and rendering of the demand pages. Although this approach may not reduce cross-interference with other applications at the client, it may avoid a potentially common cause of self-interference of the prefetches triggered by a page delaying the rendering of that page.

Similarly, in certain embodiments, a storage scheduling algorithm may be used to balance caching prefetched data against caching demand data. Storage scheduling algorithms may typically require modifications to the cache replacement algorithm. For example, Patterson's Transparent Informed Prefetching algorithm, Cao's integrated prefetching and caching algorithm, and Chandra et.al's cache replacement algorithm published at the 2001 World Wide Web Conference describe approaches for scheduling prefetching and demand data that coexist in a cache.

In some embodiments, a system may place a limit on the ratio of prefetched bytes to demand bytes sent to a client. In other embodiments, a system may set the Expires HTTP header to a value in the near future (e.g., one day in the future) to encourage some clients to evict prefetched documents earlier than they may otherwise. Certain embodiments may include both limiting the ratio of prefetch bytes to demand bytes sent to a client, and causing clients to evict prefetched documents early. Although these methods may utilize tuned thresholds, there is reason to expect that performance will not be too sensitive to these parameters. For example, magnetic disk memory media tend to have a large capacity. This capacity is growing at about 100% per year. Additionally, modest-sized memory media may be effectively infinite for many client web cache workloads. Thus, it is believed that available caches may have room to absorb relatively large amounts of prefetch data with little interference. In another example, hit rates tend to fall relatively slowly as available memory shrinks. This may suggest that relatively large amounts of unused prefetch data will have a relatively small effect on demand hit rate.

Figure 27:
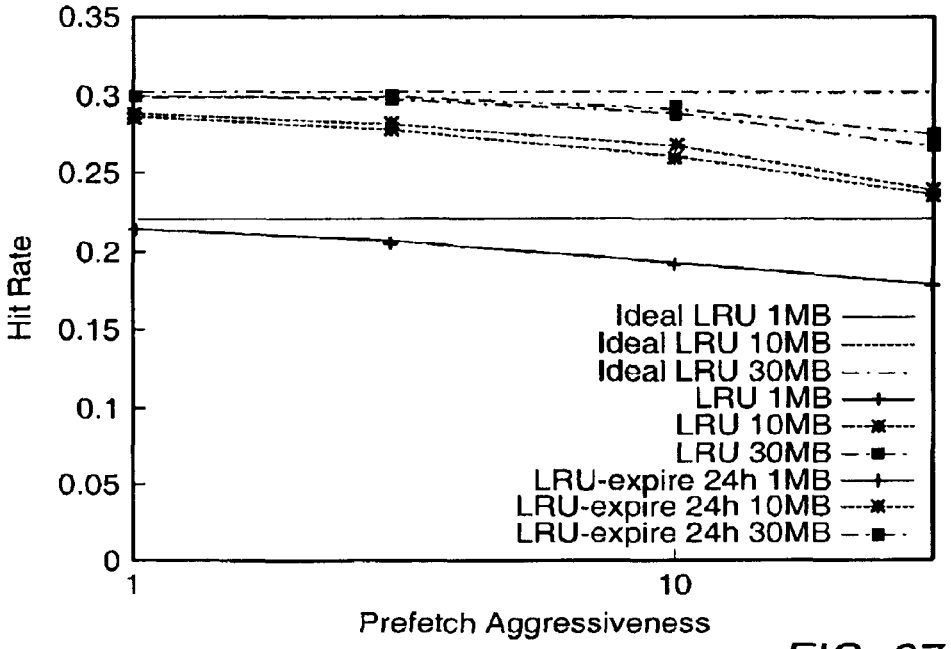
FIG. 27 depicts a graph of experimental results showing hit rates as a function of prefetch aggressiveness for several system configurations.

FIG. 27 illustrates the extent to which limiting the ratio of prefetched bytes to demand bytes sent to a client and setting the Expires HTTP header to a value in the near future may limit the interference of prefetching on hit rates. The experiment used to generate FIG. 27 utilized a 28-day trace of 8000 unique clients from 1996 at the University of California at Berkley. The experiment simulated the hit rates of 1 MB, 10 MB and 30 MB per-client caches. Note that these cache sizes are relatively small given, for example, Internet Explorer's default behavior of using 3% of a disk's capacity (e.g., 300 MB of a 10 GB hard drive) for web caching. The x-axis shows the number of bytes of dummy prefetch data per byte of demand data that are fetched after each demand request. For the experiment, 20% of services used prefetching at the specified aggressiveness and 80% did not prefetch. The demand hit rate of the non-prefetching to services was plotted. Ideally, the demand hit rates should be unaffected by prefetching. As FIG. 27 shows, the hit rates tended to fall gradually as prefetching increased. The decrease in hit rates became smaller as larger cache sizes were used. If, for example, a client cache had 30 MB and 20% of services prefetched aggressively enough so that each service prefetched ten times as much prefetch data as the client referenced demand data, demand hit rates fell from 29.9% to 28.7%.

Figure 28A:
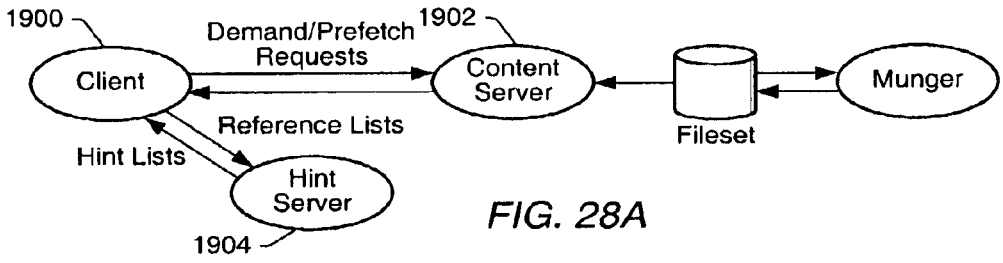
FIG. 28A depicts an embodiment of a one-connection architecture for a prefetching system.
Figure 28B:
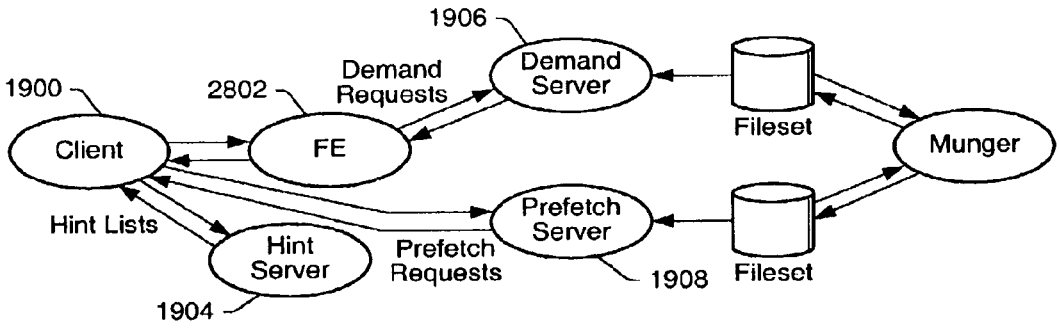
FIG. 28B depicts an embodiment of a two-connection architecture for a prefetching system.

FIGS. 28A and 28B depict alternative embodiments of a prefetching mechanism for one-connection and two-connection architectures, respectively. In an embodiment, the one-connection system may include an unmodified browser and server 1902 that acts as both the demand server and the prefetch server. The monitor may control the size of hint lists given out by hint server 1904. In an embodiment, the two-connection system may include an unmodified browser and two or more servers. In such an embodiment, one server may act as prefetch server 1908 and a second server may act as demand server 1906. In an embodiment, prefetch server 1908 may be a copy of demand server 1906. Prefetch server 1908 may run either on a separate machine or on the same machine, but on different ports than the demand server 1906. Front-end 2802 in front of demand server 1906 may be used to intercept certain requests and return appropriate redirection objects as described below. Such an embodiment may eliminate the need to make any modifications to the original demand server. In certain embodiments, the front-end may be integrated with the demand server.

In an embodiment of a one-connection prefetching system, one or more HTML documents may be augmented with supplemental program code. For example, supplemental program code may include JavaScript code. Alternatively, a zero-pixel frame that loads the prefetched objects may be used instead of JavaScript. Alternatively, the refresh header in HTTP/1.1 could also be exploited to iteratively prefetch a list of objects by setting the refresh time to a very small value. For example, FIG. 29 depicts exemplary JavaScript code. One or more Java applets could have been used instead of the JavaScript in FIG. 29.

An embodiment of a prefetch method deployable on one-connection architecture is illustrated in FIG. 28A. The method may include a client requesting one or more demand documents. One or more of the demand documents may be augmented with code as described above. When a demand document is received and finishes loading in the browser, a pageOnLoad function may be called This function may call getPfList( ) The getPfList( ) function may be defined in pfalways.html code (shown in FIG. 30). The pfalways.html code may request the file pflist.html (shown in FIG. 31) from the hint server using the name of the enclosing document, the name of the previous document in history (the enclosing document's referrer) and TURN=1 as arguments. The prediction module in the hint server may generate a list of documents to be prefetched in pflist.html. When pflist.html loads with TURN=i, the preload( )function in the body of pflist.html may request the current list of documents to be prefetched from the server.

After the current list of prefetch documents has been loaded, the myOnLoad( )function may call the getMore( ) function to replace pflist.html by fetching a new version with TURN=i+1. Thus, a long list of prefetch suggestions may be "chained" as a series of short lists. When the hint server has sent everything it wants to, it may return a pflist.html that does not include a call to the getMore( )function.

In the exemplary code in FIG. 29, the window's onload function is replaced with a function that first executes the window's original onload function (if any) and then executes a function pageOnLoad which begins prefetching. Those familiar with the art will be aware that in JavaScript, a window's onload function is executed after the window has been loaded and rendered to the screen. The pageOnLoad function calls a function getPFlist embedded in a HTML Frame object called myiframe. This function is called with an argument document.referrer, which in JavaScript refers to the URL of the current document (e.g., the document represented in FIG. 29). In this embodiment, the function getPFlist is stored in a file pfalways.html, an embodiment of which is illustrated in FIG. 30.

In the exemplary code illustrated in FIG. 30, the JavaScript getPFList function replaces the current frame's contents (e.g., pfalways.html) with a new document. In this embodiment, the new document is: "http://hint-server>/pflist.html+PCOOKIE=<document-referrer>+<prevref>+TURN=1" where <hint-server> is the identity of the hint server (e.g., a server DNS name or IP address and port), <document-referrer> is the name of the current document (e.g., the URL of pfalways.html), and <prevref> is the argument passed in to getPFList (e.g., the URL of the document depicted in FIG. 29). Thus, the hint server receives a request that includes the name of the enclosing demand document, which may be used to construct histories of demand document reference patterns by prefetch prediction algorithms. Finally, the TURN=1 argument in the new document.location is used to segment hint lists into pieces; TURN=1 means that the first piece of the relevant hint list should be sent.

In the exemplary code illustrated in FIG. 31, the JavaScript code includes a preload function. This function thus calls preload on a list of URLs to be prefetched. The preload function loads each of these objects into the cache. Note that in JavaScript, this is accomplished by creating an Image object for each URL to be fetched regardless of the URLs actual type. Once all specified objects have been prefetched, preload returns. At this point, JavaScript has completed loading the body of the document, so it calls the document's onload function which in this case is called myOnLoad. The preload( )call in the myOnLoad function in FIG. 31 is only utilized for the two-connection case and is discussed below. MyOnLoad calls getMore. GetMore replaces the current frame with a new document in a manner similar to what is done in pfalways in FIG. 30. Note that the effect of this procedure is to repeatedly load code similar to that in FIG. 31, but each time (a) different URLs are designated for prefetching, and (b) each time TURN is incremented. Thus, a series of iterations may each fetch a different small piece of a larger hint list. This iteration may end when a new demand document FIG. 29 is loaded or when the hint server runs out of things to prefetch and returns an empty pflist.html file rather than a file like that in FIG. 31.

In the case of a demand request for a document previously prefetched, the client may retrieve the document from the cache just as with any other cache hit.

In an embodiment, a prefetching method deployable in a two-connection architecture may include the same basic mechanisms for prefetching described above. Because browsers may cache documents using the server name and document name, however, additional steps may be required to ensure that demand requests for previously prefetched objects (e.g., objects that are now cached) can be serviced by the prefetched objects.

For example, to use a prefetched document in the cache when a demand request arrives for it, a redirection object may be retrieved from the demand server. After receiving a prefetched document from the prefetch server, a request for the same object may be sent to the demand server. The demand server may respond with a redirection object (also called a "wrapper") that points to the corresponding document on the prefetch server. In this way, when a demand request arrives later for the prefetched document, the corresponding wrapper stored in the cache may redirect the request to the prefetched document, which is also found in the cache.

In an embodiment, a copy of content on the demand server may be made for the prefetch server. Relative links in the prefetch server may be changed to absolute links to the demand server. Absolute links to inline objects may be changed to be absolute links to the prefetch server. In an embodiment, no change is made to the content of the demand server (except that in some embodiments supplemental code may be added to one or more files on the server). In an embodiment, the new call to preload in the code depicted in FIG. 31 may be intercepted by the front end that returns the corresponding wrapper.

In an additional embodiment, a predictor module on the hint server may be modified such that inline objects are sent before the HTML files that refer to them. Such an embodiment may prevent demand requests from being incorrectly sent to the prefetch server in case of partial transfer of prefetch documents.

In certain embodiments, after getting prefetched documents from the prefetch server, the myOnLoad( ) code depicted in FIG. 31 may also send a request for the corresponding HTML file to the demand server to obtain a suitable redirection object. The HTTP/1.1 "referrer" field for this request may be set to the current file pflist.html, thus distinguishing it from regular demand requests.

In certain embodiments, the front-end may allow regular demand requests to pass through to the demand server. However, when a request for a wrapper is received, the front-end may return an appropriate redirection object. As previously mentioned, the front-end may detect a request for a wrapper by observing the referrer field. A redirection object may include a short JavaScript file that sets its document.location property to the prefetched object's URL.

In an embodiment in which a previously prefetched document is requested as a demand document, a client implementing methods as described above may check cache to determine if the document is already present in cache. The client may identify the redirection object in the cache. The redirection object may replace itself with the prefetched document from the cache. Inline objects in the prefetched document may point to objects from the prefetch server which are also found in the cache. Links in the prefetched document may point to objects in the demand server.

In such embodiments, it is feasible that a prefetched object might be evicted from the cache before a wrapper that refers to the evicted object. Such a chain of events may cause the client to send a demand request for the evicted object to the prefetch server. However, the likelihood of such incidents may be reduced by setting the expiration time of the wrapper to a value smaller than the prefetched object.

In an embodiment, for each prefetched document, a wrapper may be fetched from the demand server to enable redirection. Since wrappers are small in size (e.g., about 200 bytes), overhead of serving wrappers may be minimal. In an embodiment, a wrapper is sent only for a complete document (including inline objects), not for every prefetched object. As an alternative to using wrapper objects, the client may maintain state to store information about whether a document has already been prefetched. Server content could be augmented with a code to execute on a link's onClick event that checks a database before requesting a document from the demand server or prefetch server. Methods of maintaining state information on the client are known in the art.

In an embodiment, the hint server may use any prediction algorithm. Since each client may fetch a pflist.html for each HTML document, the hint server may see a trace of all HTML documents requested by each client. The hint server may therefore maintain a detailed history of client behavior and use a standard algorithm proposed in the literature or an algorithm using more service specific information.

In an embodiment, a hint server may "chain" prediction lists to avoid overwhelming a client with a long hint list. Hint servers may send a small number of predictions to clients and wait for the clients to request more predictions. In a perfectly non-interfering environment, the length of the hint lists may only be limited by sizes beyond which no useful predictions can be generated. To limit client cache pollution, however, the length of hint lists may be otherwise limited. The ordering of predictions in the list generated by servers may be such that inline objects are requested before the referring page itself. This may reduce the possibility of a concurrent demand request for the same document being incorrectly sent to the prefetch server.

Experiments were conducted using a prefetching system configured in two-connection architecture as shown in FIG. 28B. The system included a computer system using Apache's HTP server software running on two different ports on the same machine. One port was used to serve demand requests and one port was used to serve prefetch requests. The front-end was implemented as a module combined with the server (i.e., the Apache process). The hint server was implemented in Java. The hint server ran on a separate machine from the prefetch and demand servers. The hint server used offline created prediction lists generated using the PPM algorithm. The monitor ran as a separate thread on same machine as the hint server. The content munger was also implemented in Java. All of the content was munged offline.

An experiment was conducted to evaluate the overhead incurred by requiring the demand server to serve redirection wrapper objects as described with reference to one embodiment of the two-connection architecture. Four different cases were tested, including: 1) no modifications to the server; 2) server modifications, but no prefetching; 3) prefetching files; and 4) prefetching wrappers. The experiment measured the sustained throughput (in connections/second) by the server for each case. Results for each case are depicted in FIGS. 32 and 33.

Figure 32:
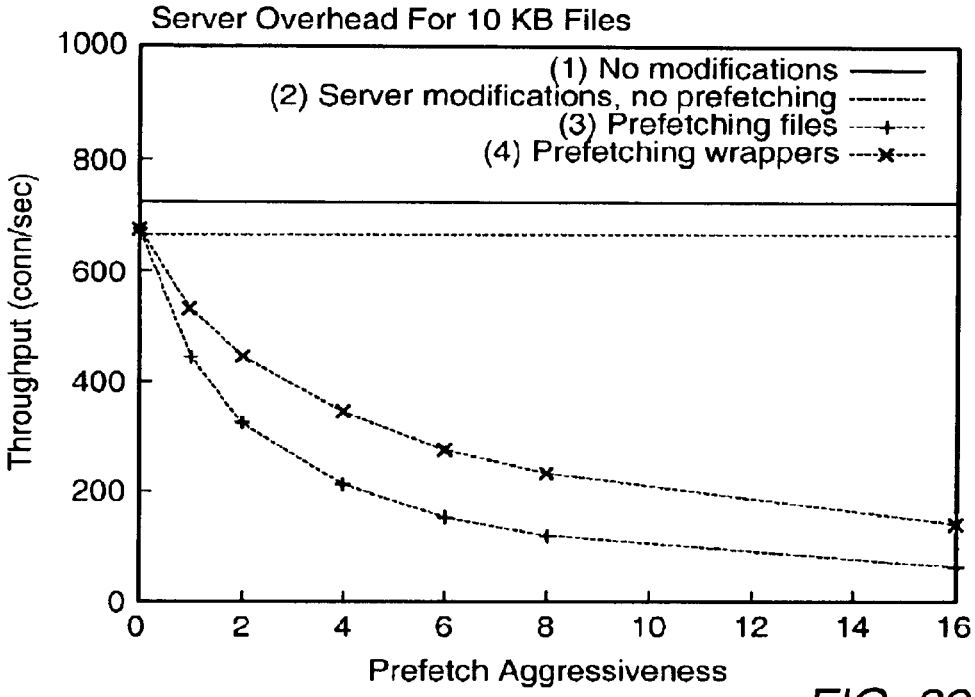
FIG. 32 depicts a graph of experimental results showing throughput for several cases as a function of prefetch aggressiveness for a files size of 10 KB.
Figure 33:
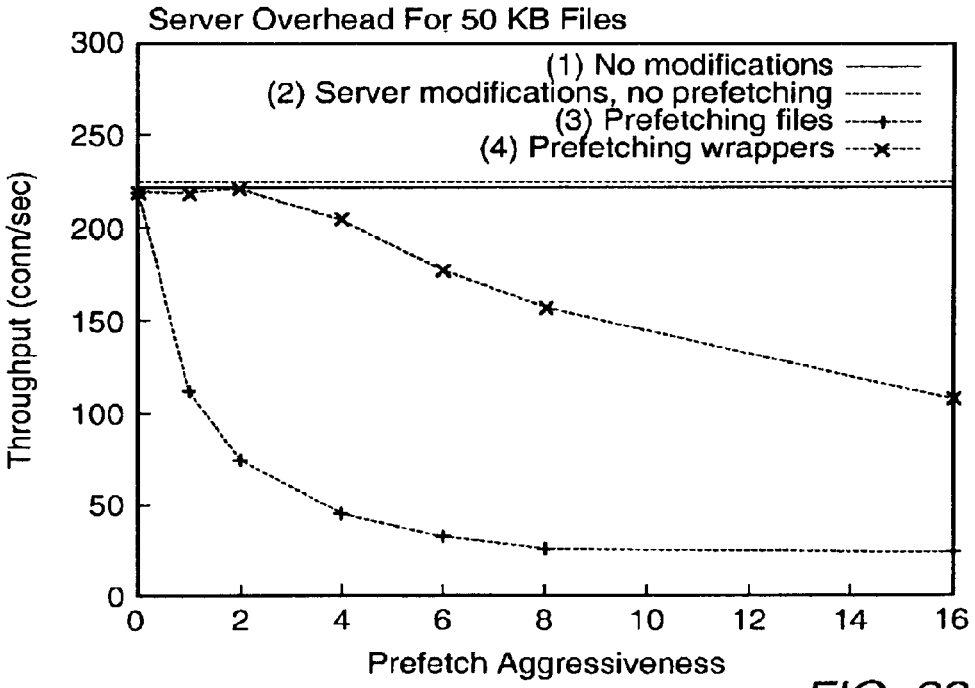
FIG. 33 depicts a graph of experimental results showing throughput for several cases as a function of prefetch aggressiveness for a file size of 50 KB.

The difference between plots for case 1 and case 2 in FIGS. 32 and 33 illustrates the overhead of executing the front-end logic added before the server to check the referrer field and send wrappers accordingly. For both case 1 and case 2 plots, httperf fetches one 10 KB file per connection in FIG. 14 and one 50 KB file per connection in FIG. 15. The case 3 plot shows the throughput of the demand server when serving actual files for different values of pfrate. The case 4 plot shows the throughput of the demand server when serving wrappers corresponding to requested files for different values of pfrate. As the pfrate is varied, the throughput falls in both case 3 and case 4. The case 4 plot falls less steeply, however, because the wrapper size is much smaller than the actual file. Comparing FIGS. 32 and 33 shows that the overhead is less burdensome for larger file sizes. It is believed that the experiment is pessimistic since wrappers need only be sent with .html documents and not with all fetched objects. Thus, the number of wrappers served in an actual system may be considerably smaller than the number of wrappers served in the tested system. It is also noted that embodiments presented herein which include end-to-end monitoring may detect the additional load of serving the wrappers and throttle the prefetching as needed.

Additional experiments were conducted to compare three system configurations at a fixed pfrate. The system configurations included a prefetch case including a monitor and TCP-Nice, a no-prefetch case system with no prefetching, and a no-avoidance prefetch case with prefetching but interference avoidance scheme. For these experiments, the client was a Sony Laptop with an AMD Athlon 1 GHz processor and 256 MB of memory. The client was connected to the Internet through a cable modem link. The HTTP server was the same machine as for the previous experiments. The Hint Server ran on a Pentium III 930 MHz machine with 256 MB of RAM loaded with the Red Hat Linux 7.1 package. On an unloaded network, the round trip time from client to server was about 10 ms and the bandwidth was about 1 Mbps. The workload consisted of demand accesses made by 41 clients in a one-hour subset of the IBM sporting event server trace. This workload contains 1590 unique files, and the network demand bandwidth is about 77 kbps.

Figure 34:
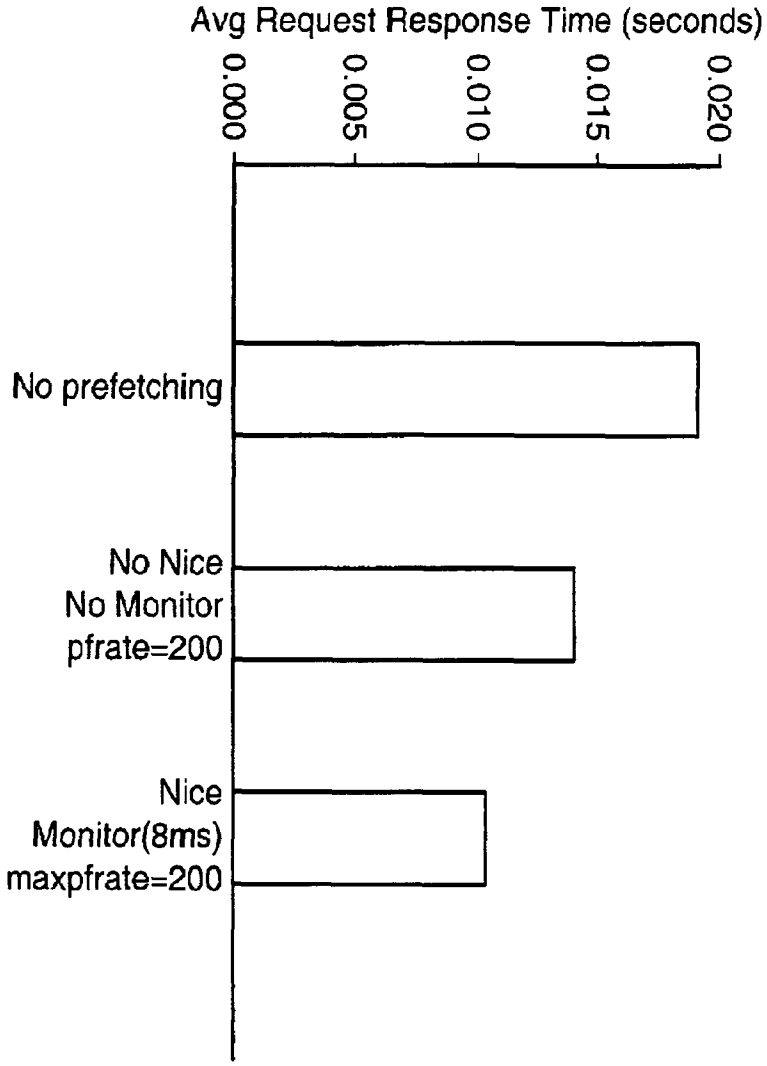
FIG. 34 depicts a graph of experimental results showing average demand response time for different system configurations.

The average demand response times observed using the different system configurations are shown in FIG. 34. Both the prefetch case and the no-avoidance prefetch case achieved hit rates of 88.3% (compared to 49.7% for the no-prefetch case). The prefetch case caused less interference, however, resulting in significantly better miss times, and leading to a 25% reduction in end-to-end response times.

In this experiment, the loads on the network and server were light enough to result in performance improvements due to prefetching even without a monitor or interference avoidance scheme. Aggressive prefetching without a monitor, however, may cause response times to increase by a factor of 4.

Embodiments presented herein include end-to-end congestion control methods optimized to support background transfers. The end-to-end methods may nearly approximate the ideal router-prioritization strategy by (a) inhibiting interference with demand flows and (b) utilizing significant fractions of available spare network bandwidth. The methods are designed to support massive replication of data and services, where hardware (e.g., bandwidth, disk space, and processor cycles) is consumed to help humans be more productive. Massive replication systems may be designed as if bandwidth were essentially free. Nice provides a reasonable approximation of such an abstraction.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method of controlling data transmission over a communication network, the method comprising:

sending, by a device, one or more data packets over the communication network in view of a congestion window representative of a congestion state of the communication network;

determining, by the device, a time that a first data packet was sent;

receiving, by the device, an acknowledgement of receipt of at least the first data packet;

determining, by the device, a time that the acknowledgement of receipt of the first data packet was received;

determining, by the device, an estimate of network congestion based at least in part on the time the first data packet was sent and the time the acknowledgement of receipt of the first data packet was received; and if the estimate of network congestion exceeds a congestion threshold, then reducing a size of the congestion window, wherein round trip times are indicative of a bottleneck queue size and wherein the congestion threshold represents a number of round trip times that exceed the bottleneck queue size.

2. The method of claim 1, wherein said determining, by the device, the estimate of network congestion includes:

determining, by the device, a number of round trip times, received during an interval, that exceed a threshold round trip time, wherein a round trip time includes an elapsed time between a time that a data packet is sent and a time that an acknowledgement of receipt of the data packet is received.

3. The method of claim 2, wherein the congestion threshold further represents a percentage of round trip times that exceed the threshold round trip time during the interval.

4. The method of claim 1, wherein said reducing, by the device, the size of the congestion window includes reducing, by the device, the size of the congestion window by at least a multiplicative factor.

5. The method of claim 1, wherein the congestion window determines an amount of prefetch data to be in transit at any one time.

6. The method of claim 1, wherein said sending, by the device, one or more data packets includes sending, by the device, one or more pointers to one or more requested data.

7. The method of claim 1, wherein said sending, by the device, one or more data packets includes sending, by the device, one or more requested data packets.

8. The method of claim 1, wherein said determining, by the device, the estimate of network congestion includes determining, by the device, a number of round trip times received during an interval that exceed a threshold round trip time, wherein a round trip time includes an elapsed time between a time that a data packet is sent and a time that an acknowledgement of receipt of the data packet is received, and wherein the congestion threshold is determined to be exceeded if the number of round trip times exceeding the threshold round trip time during the interval exceeds a threshold fraction of a number of round trip times measured.

9. The method of claim 1, further comprising increasing, by the device, the size of the congestion window if the estimate of network congestion does not exceed the congestion threshold.

10. The method of claim 1, further comprising linearly increasing, by the device, the size of the congestion window if the estimate of network congestion does not exceed the congestion threshold.

11. The method of claim 1, further comprising increasing, by the device, the size of the congestion window by a determined number of data packets per determined number of round trip times if the estimate of network congestion does not exceed the congestion threshold.

12. The method of claim 1, further comprising increasing, by the device, the size of the congestion window by a determined number of data packets and by a determined multiplicative factor per determined number of round trip times if the estimate of network congestion does not exceed the congestion threshold.

13. The method of claim 1, wherein said sending, by the device, includes sending the first data packet and a second data packet, wherein a time period between said sending the second data packet and said sending the first data packet is determined based on the size of the congestion window.

14. The method of claim 1, wherein the bottleneck queue size includes a buffer size at a bottleneck router that accounts for round trip delay of a data packet.

15. An article of manufacture, comprising:

a non-transitory computer readable medium; and a plurality of programming instructions stored on the non-transitory computer readable medium and configured to cause a processor to:

determine a time that a first data packet was sent;

determine a time that an acknowledgement of receipt of the first data packet was received;

determine an estimate of network congestion based at least in part on the time the first data packet was sent and the time the acknowledgement of receipt of the first data packet was received; and if the estimate of network congestion exceeds a congestion threshold, then reduce a size of a congestion window to be used for future packet transmission, wherein round trip times are indicative of a bottleneck queue size and wherein the congestion threshold represents a number of round trip times that exceed the bottleneck queue size.

16. The article of manufacture of claim 15, wherein the plurality of programming instructions are further configured to cause the processor to:

determine a number of round trip times received during an interval that exceed a threshold round trip time, wherein a round trip time includes an elapsed time between a time that a data packet is sent and a time that an acknowledgement of receipt of the data packet is received, and wherein the plurality of programming instructions are further configured to cause the processor to determine the estimate of network congestion using at least the number of round trip times received during the interval.

17. The article of manufacture of claim 16, wherein the congestion threshold further represents a percentage of round trip times that exceed the threshold round trip time during the interval.

18. The article of manufacture of claim 15, wherein the plurality of programming instructions are further configured to cause the processor to:

determine a number of round trip times received during an interval that exceed a threshold round trip time, wherein a round trip time includes an elapsed time between a time that a data packet is sent and a time that an acknowledgement of receipt of the data packet is received, and wherein the congestion threshold is determined to be exceeded if the number of round trip times that exceed the threshold round trip time during the interval exceeds a threshold fraction of a number of round trip times measured.

19. The article of manufacture of claim 15, wherein the plurality of programming instructions are further configured to cause the processor to determine a time period to send a second data packet based at least in part on the size of the congestion window.

20. The article of manufacture of claim 15, wherein the bottleneck queue size includes a buffer size at a bottleneck router that accounts for round trip delay of a data packet.

21. An apparatus, comprising:

a network device that includes a memory and that further includes:

a network interface module to couple the network device to a communication network; and a communications module coupled to the network interface module and configured to:

transmit one or more packets over the communication network to one or more receivers in view of a congestion window representative of a congestion state of the communication network;

receive acknowledgements of receipt of the one or more packets;

determine a round trip time using a time that a first packet was sent and a time that a corresponding acknowledgement was received;

determine an estimate of network congestion for the communication network based at least in part on the determined round trip time; and if the estimate of network congestion exceeds a congestion threshold, then reduce a size of a congestion window to be used for future transmission, wherein round trip times are indicative of a bottleneck queue size and wherein the congestion threshold represents a number of round trip times that exceed the bottleneck queue size.

22. The apparatus of claim 21, wherein the congestion threshold further represents a percentage of round trip times that exceed a threshold round trip time during an interval.

23. The apparatus of claim 21, wherein the communications module is further configured to determine the estimate of network congestion based on a number of round trip times received during an interval that exceed a threshold round trip time, wherein a round trip time includes an elapsed time between a time that a packet is sent and a time that an acknowledgement of receipt of the packet is received, and wherein the congestion threshold is determined to be exceeded if the number of round trip times that exceed the threshold round trip time during the interval exceeds a threshold fraction of a number of round trip times measured.

24. The apparatus of claim 21, wherein the bottleneck queue size includes a buffer size at a bottleneck router that accounts for round trip delay of a packet.

25. An apparatus, comprising:

means for sending one or more data packets over a communication network, in view of a congestion window representative of a congestion state of the communication network;

means for determining a time that a first data packet was sent;

means for receiving an acknowledgement of receipt of at least the first data packet;

means for determining a time that the acknowledgement of receipt of the first data packet was received;

means for determining an estimate of network congestion based at least in part on the time the first data packet was sent and the time the acknowledgement of receipt of the first data packet was received; and means for reducing the size of the congestion window if the estimate of network congestion exceeds a congestion threshold, wherein round trip times are indicative of a bottleneck queue size and wherein the congestion threshold represents a number of round trip times that exceed the bottleneck queue size.

26. The apparatus of claim 25, wherein the means for reducing the size of the congestion window reduces the size of the congestion window by at least a multiplicative factor.

27. The apparatus of claim 25, wherein the means for determining the estimate of network congestion determines a number of round trip times received during an interval that exceed a threshold round trip time, wherein a round trip time includes an elapsed time between a time that a data packet is sent and a time that an acknowledgement of receipt of the data packet is received, and wherein the congestion threshold is determined to be exceeded if the number of round trip times that exceed the threshold round trip time during the interval exceeds a threshold fraction of a number of round trip times measured.

28. The apparatus of claim 25, further comprising means for increasing the size of the congestion window if the estimate of network congestion does not exceed the congestion threshold.

29. The apparatus of claim 25, further comprising means for linearly increasing the size of the congestion window if the estimate of network congestion does not exceed the congestion threshold.

*30. A method of controlling data transmission over a communication network, the method comprising:*

*determining, by a device, an estimate of network congestion based at least in part on a time a first data packet was sent and a time an acknowledgement of receipt of the first data packet was received; and*

*if the estimate of network congestion exceeds a congestion threshold, then modifying a sending rate based at least in part on a reduced size of a congestion window,*

*wherein round trip times are indicative of a bottleneck queue size and wherein the congestion threshold represents a number of round trip times that exceed the bottleneck queue size.*

*31. The method of claim 30, wherein said determining, by the device, the estimate of network congestion includes:*

*determining, by the device, a number of round trip times, received during an interval, that exceed a threshold round trip time,*

*wherein a round trip time includes an elapsed time between a time that a data packet is sent and a time that an acknowledgement of receipt of the data packet is received.*

*32. The method of claim 31, wherein the congestion threshold further represents a percentage of round trip times that exceed a threshold round trip time during the interval.*

*33. The method of claim 30, further comprising reducing, by the device, a size of the congestion window by at least a multiplicative factor.*

*34. The method of claim 30, wherein the congestion window determines an amount of prefetch data to be in transit at any one time.*

*35. The method of claim 30, further comprising sending, by the device, the first data packet over a communication network in view of the congestion window, wherein the sending includes sending one or more requested data packets or one or more pointers to the one or more requested data.*

*36. An article of manufacture, comprising:*

*a non-transitory computer readable medium; and*

*a plurality of programming instructions stored on the non-transitory computer readable medium and configured to cause an apparatus, in response to execution of the instructions by a processor of the apparatus, to:*

*determine an estimate of network congestion of a communication network based at least in part on a time a data packet was sent and a time an acknowledgement of receipt of the data packet was received; and*

*if the estimate of network congestion exceeds a congestion threshold, then modify a send rate based at least in part on a reduced size of a congestion window,*

*wherein round trip times are indicative of a bottleneck queue size and wherein the congestion threshold represents a number of round trip times that exceed the bottleneck queue size;*

*wherein the congestion threshold is exceeded if a number of round trip times that exceed a threshold round trip time exceeds a threshold number,*

*wherein a round trip time includes an elapsed time between the time that the data packet is sent and the time that the acknowledgement is received;*

*wherein the threshold round trip time is a fraction of a difference between an estimated congested round trip time and an estimated uncongested round trip time; and*

*wherein the reduced size of the congestion window is less than one data packet if the congestion threshold is exceeded.*

*37. The article of manufacture of claim 36, wherein the plurality of programming instructions are further configured to cause the apparatus, in response to execution of the instructions by the processor, to:*

*determine a number of round trip times received during an interval that exceed a threshold round trip time,*

*wherein said determine an estimate of network congestion comprises determine the estimate of network congestion using at least the number of round trip times received during the interval.*

*38. An apparatus, comprising:*

*a network device that includes a memory and that further includes:*

*a network interface module to couple the network device to a communication network; and*

*a communications module coupled to the network interface module and configured to:*

*determine an estimate of network congestion for the communication network based at least in part on a round trip time determined using a time that a data packet was sent and a time that a corresponding acknowledgement was received; and*

*if the estimate of network congestion exceeds a congestion threshold, then modify a send rate based at least in part on a reduced size of a congestion window,*

*wherein round trip times are indicative of a bottleneck queue size and wherein the congestion threshold represents a number of round trip times that exceed the bottleneck queue size.*

* * * * *